(12) United States Patent
Campbell

(10) Patent No.: US 10,591,249 B2
(45) Date of Patent: Mar. 17, 2020

(54) CAMERA SIGHT DEVICE FOR A WEAPON

(71) Applicant: HOOKSHOTTACTICAL, LLC, Miami, FL (US)

(72) Inventor: Robert Marshall Campbell, Miami, FL (US)

( * ) Notice: Subject to any disclaimer, the term of this patent is extended or adjusted under 35 U.S.C. 154(b) by 352 days.

(21) Appl. No.: 15/353,706

(22) Filed: Nov. 16, 2016

(65) Prior Publication Data

US 2019/0301833 A1    Oct. 3, 2019

Related U.S. Application Data

(60) Provisional application No. 62/398,509, filed on Sep. 22, 2016, provisional application No. 62/330,199, filed on May 1, 2016, provisional application No. 62/388,110, filed on Dec. 12, 2015, provisional application No. 62/388,109, filed on Dec. 12, 2015, provisional application No. 62/386,054, filed on Nov. 16, 2015, provisional application No. 62/386,055, filed on Nov. 16, 2015.

(51) Int. Cl.
*F41G 1/30* (2006.01)
*F41G 11/00* (2006.01)

(52) U.S. Cl.
CPC .............. *F41G 1/30* (2013.01); *F41G 11/003* (2013.01)

(58) Field of Classification Search
CPC ......... F41G 1/00; F41G 1/38; H04N 5/22525; H04N 5/23203; H04N 5/33
See application file for complete search history.

(56) References Cited

U.S. PATENT DOCUMENTS

| | | |
|---|---|---|
| 3,709,124 A | 1/1973 | Hunt |
| 3,911,451 A | 10/1975 | Vockenhuber |
| 5,020,262 A | 6/1991 | Pena |
| 5,200,827 A | 4/1993 | Hanson et al. |
| 6,539,661 B2 | 4/2003 | Hope |
| 7,180,587 B1 | 2/2007 | Matijczyk |
| 7,255,035 B2 | 8/2007 | Mowers |
| 7,891,131 B2 | 2/2011 | Holmberg |
| 7,911,690 B2 | 3/2011 | Chapman |
| 8,046,950 B2 | 11/2011 | Holmberg |
| 8,091,265 B1 | 1/2012 | Teetzel et al. |
| 8,093,992 B2 | 1/2012 | Jancic et al. |
| 8,297,173 B1 | 10/2012 | Teetzel et al. |
| 8,336,776 B2 | 12/2012 | Horvath et al. |
| 8,978,539 B2 | 3/2015 | Teetzel et al. |
| 9,010,002 B2 | 4/2015 | Popa-Simil |
| 9,702,661 B2 | 7/2017 | Kremer et al. |
| 2005/0179799 A1 | 8/2005 | Umanskiy et al. |
| 2005/0252063 A1 | 11/2005 | Flannigan |
| 2005/0268521 A1* | 12/2005 | Cox .......................... F41G 1/38 42/130 |
| 2010/0302282 A1 | 12/2010 | Dobbie et al. |
| 2011/0035984 A1 | 2/2011 | Liu |
| 2012/0097741 A1 | 4/2012 | Karcher |
| 2013/0344461 A1 | 12/2013 | Tello |
| 2015/0040409 A1 | 2/2015 | Morrison |
| 2016/0047626 A1 | 2/2016 | Kremer et al. |

(Continued)

*Primary Examiner* — J. Woodrow Eldred
(74) *Attorney, Agent, or Firm* — Cozen O'Connor

(57) ABSTRACT

A camera system having a sight device, with a housing configurable for securing about a weapon, the camera connects with a smart phone device for displaying an image from the sight device for accurately targeting with a weapon.

20 Claims, 48 Drawing Sheets

(56) References Cited

U.S. PATENT DOCUMENTS

2016/0316128 A1   10/2016  Teich et al.
2017/0115096 A1*  4/2017  Zhang .................... F41G 3/165
2019/0145733 A1*  5/2019  Chung .................... F41G 1/30
                                                   42/113

\* cited by examiner

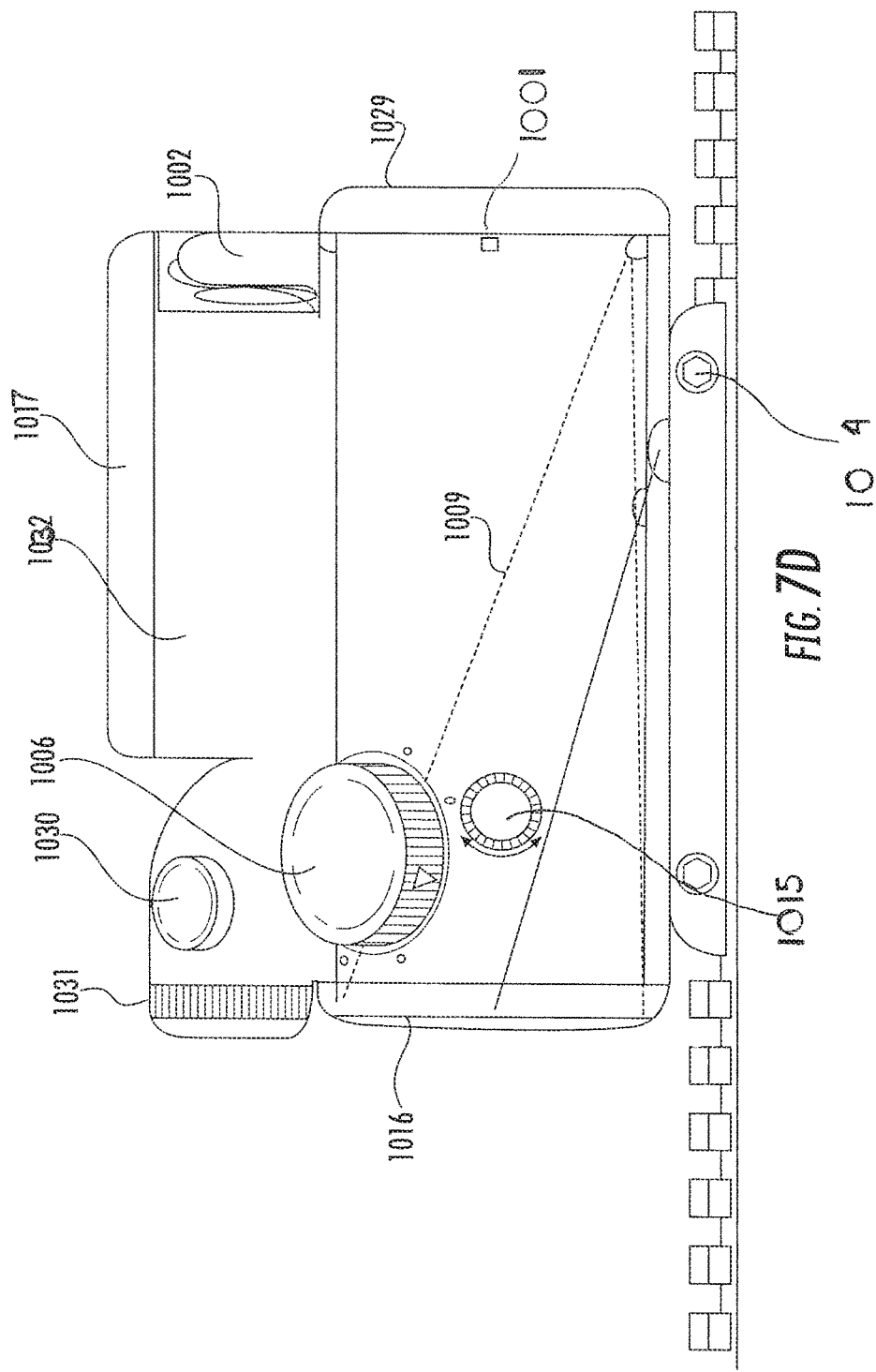

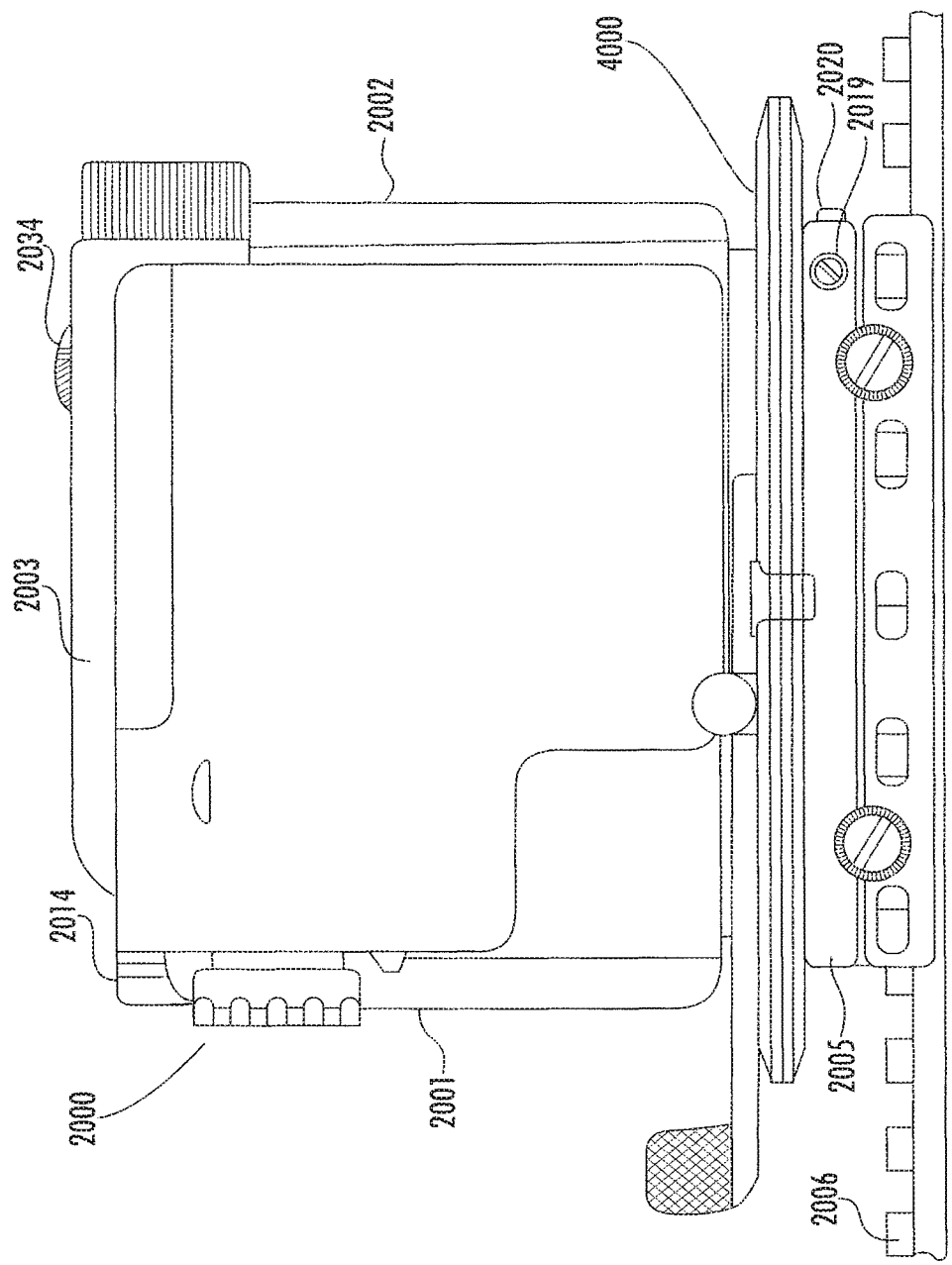

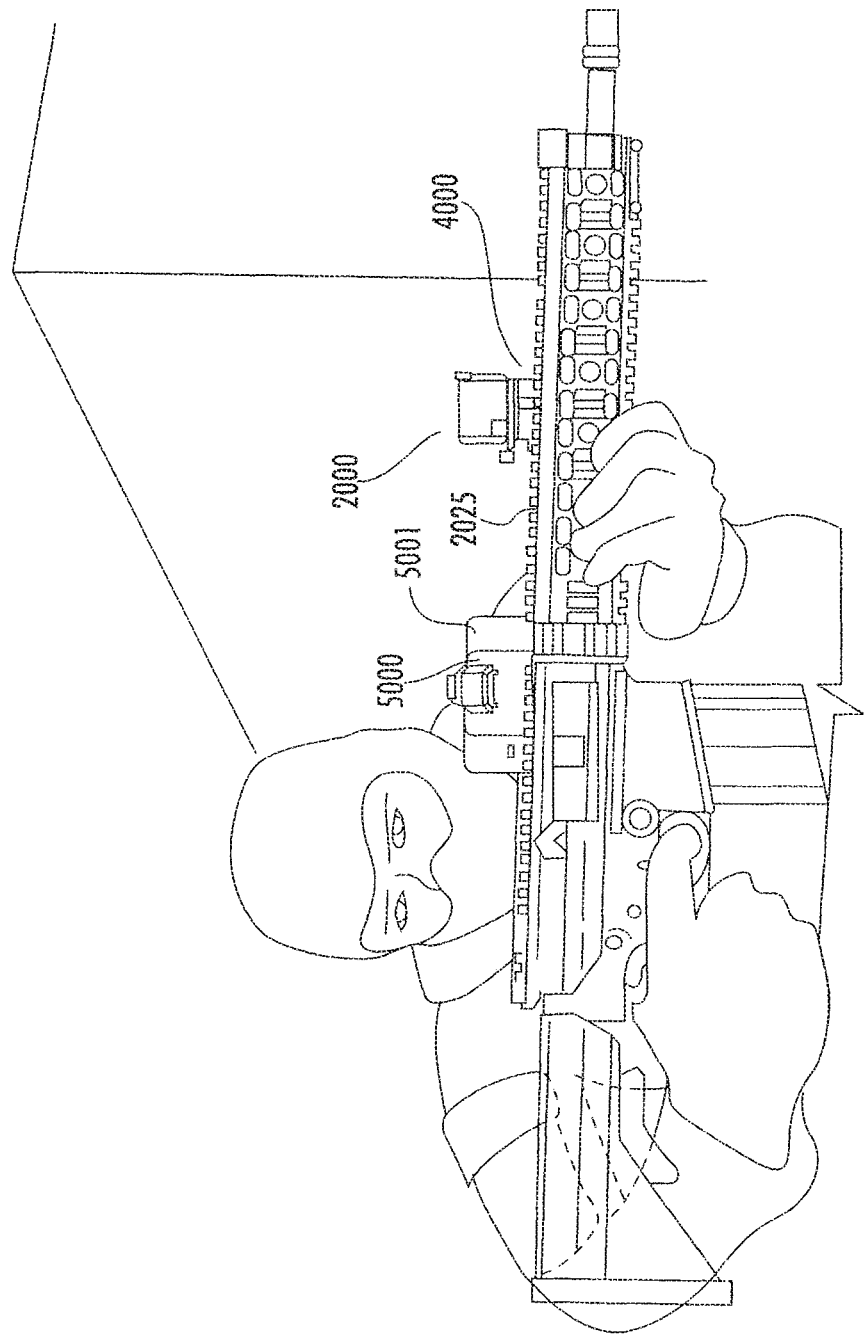

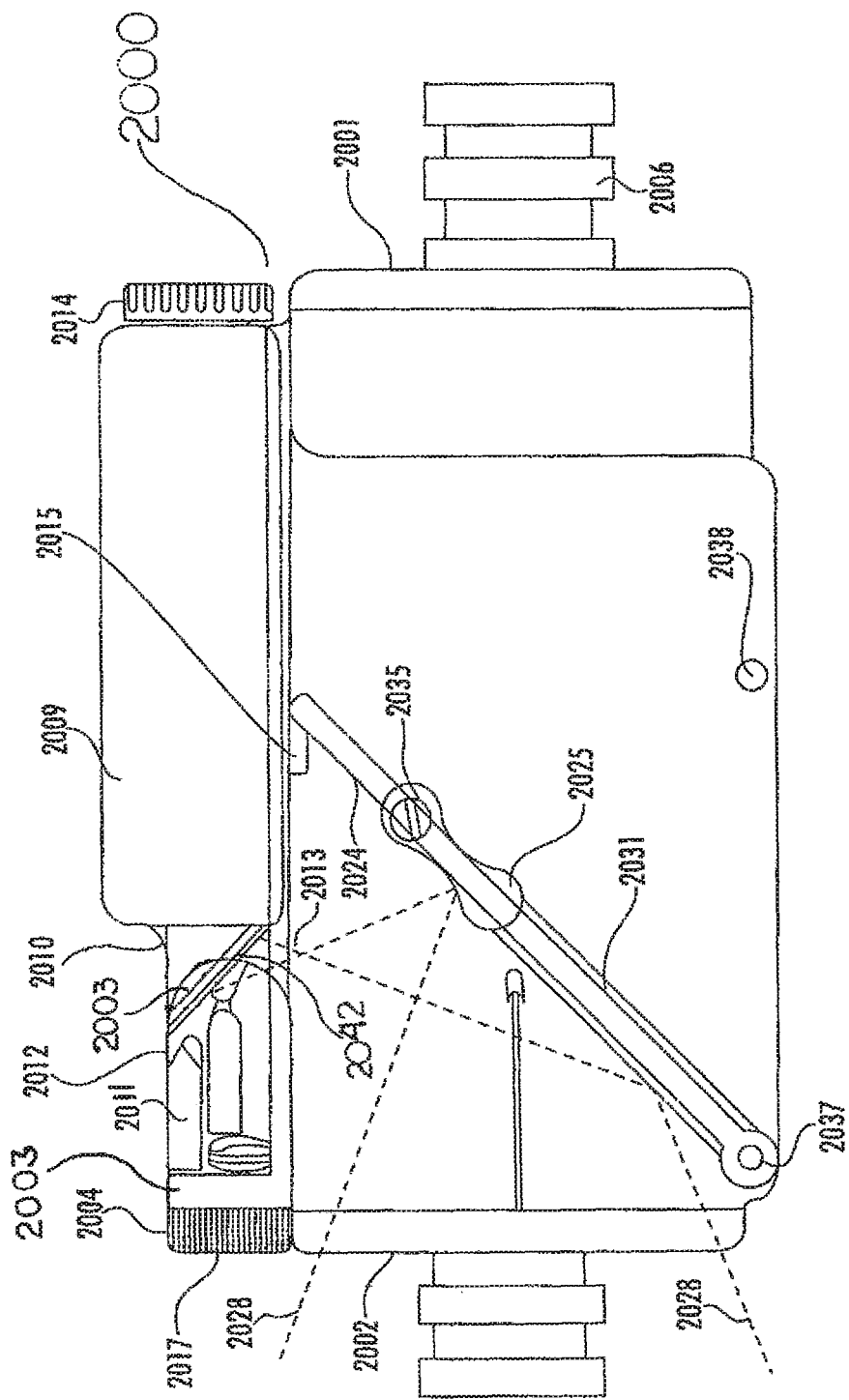

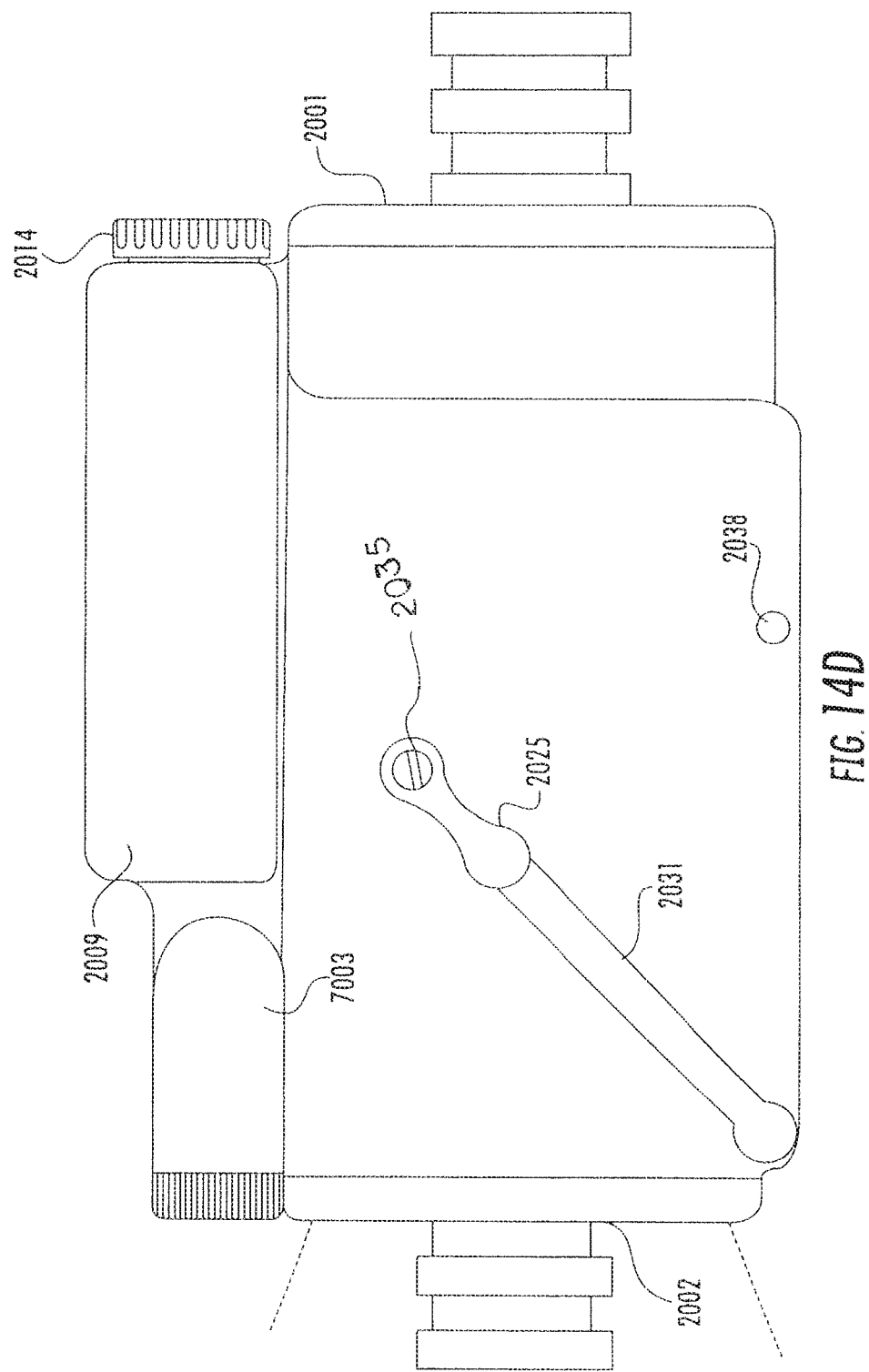

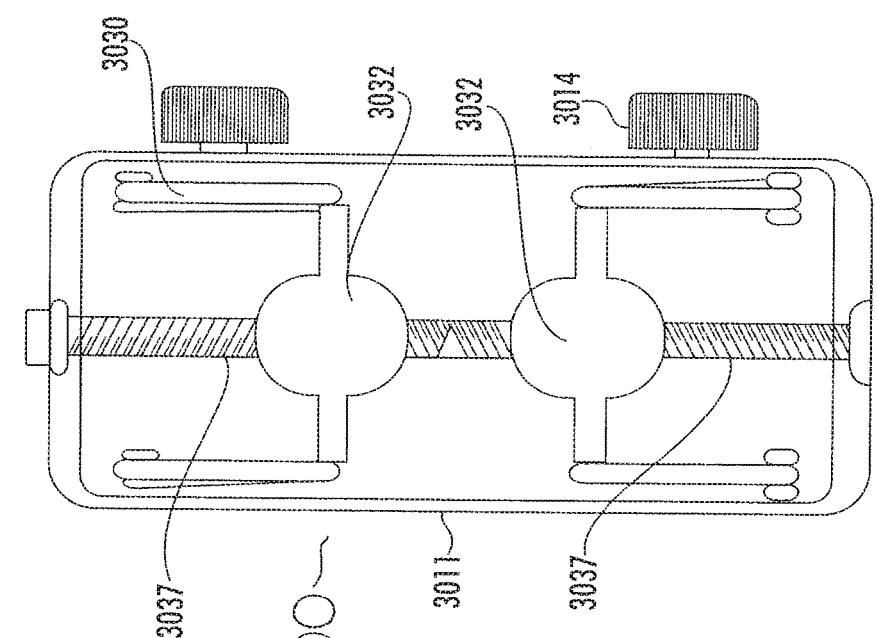
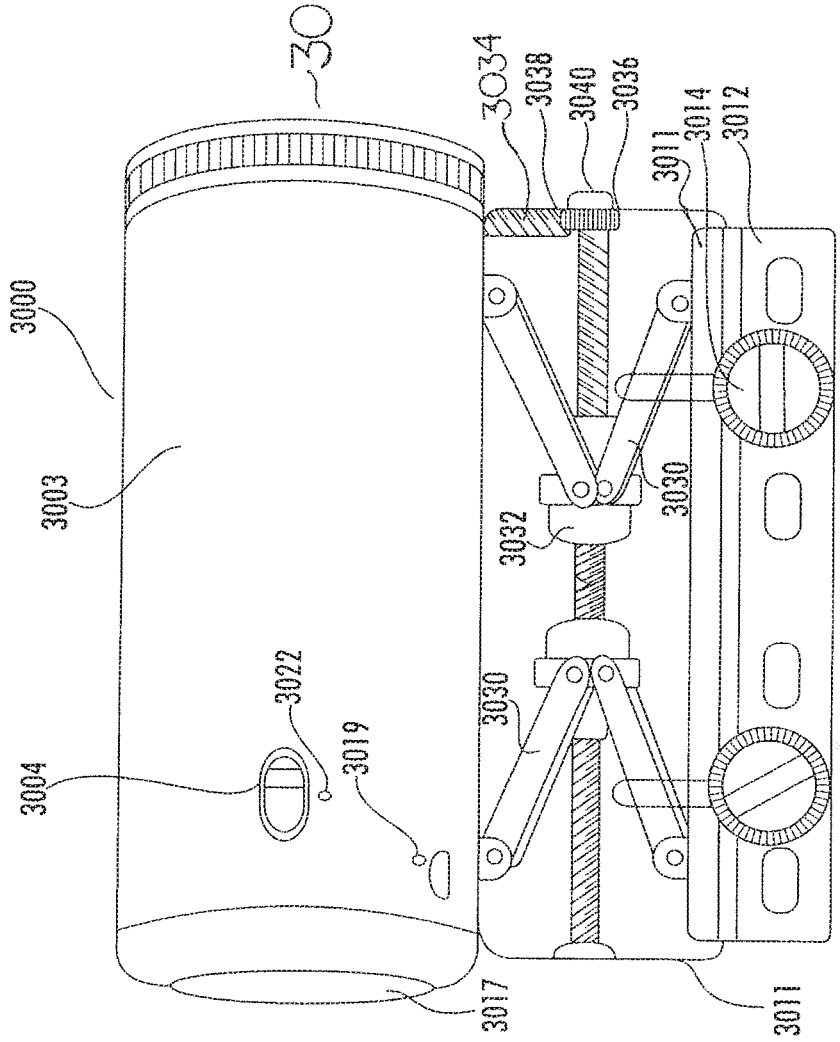

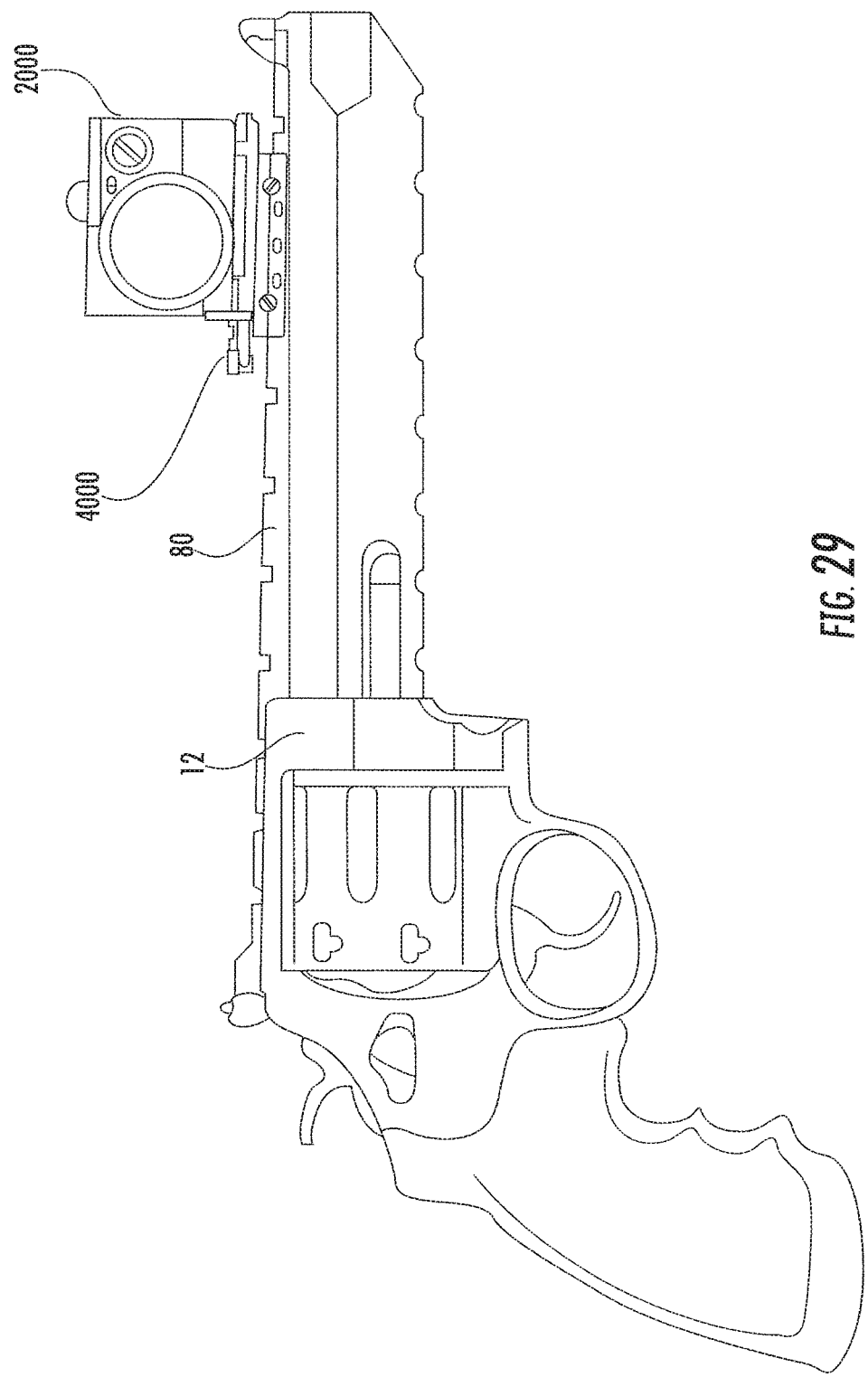

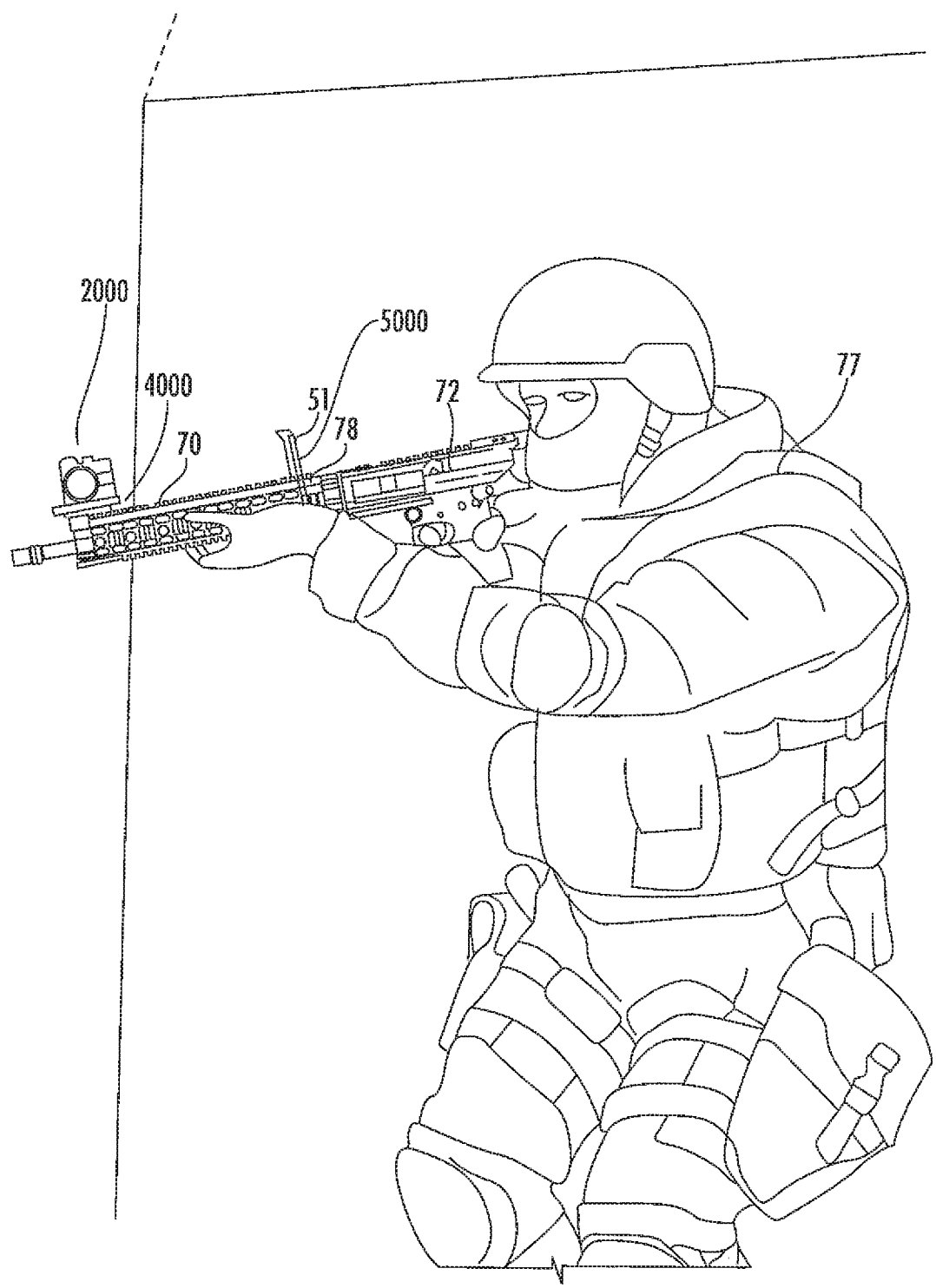
FIG. 30-A

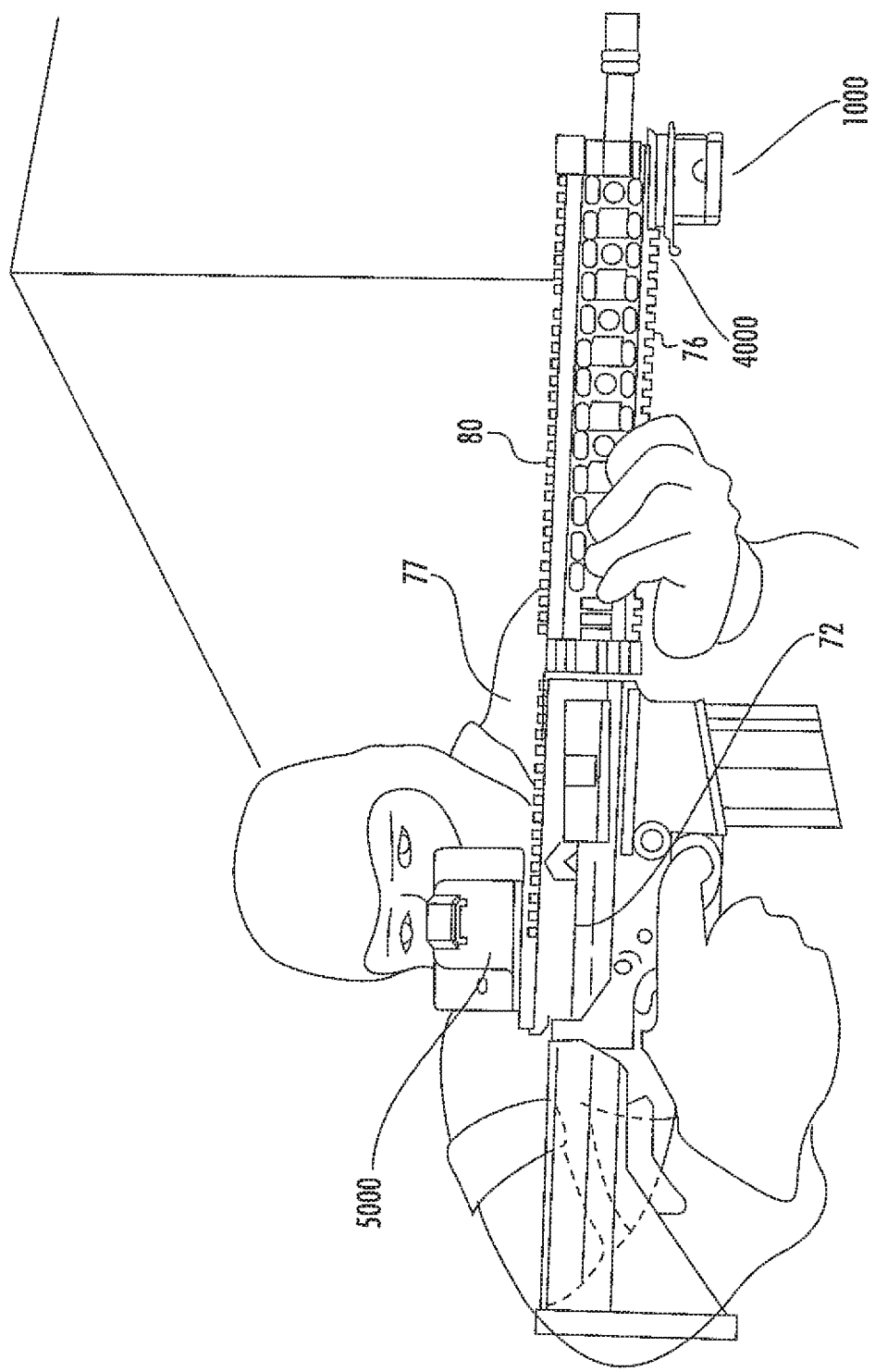

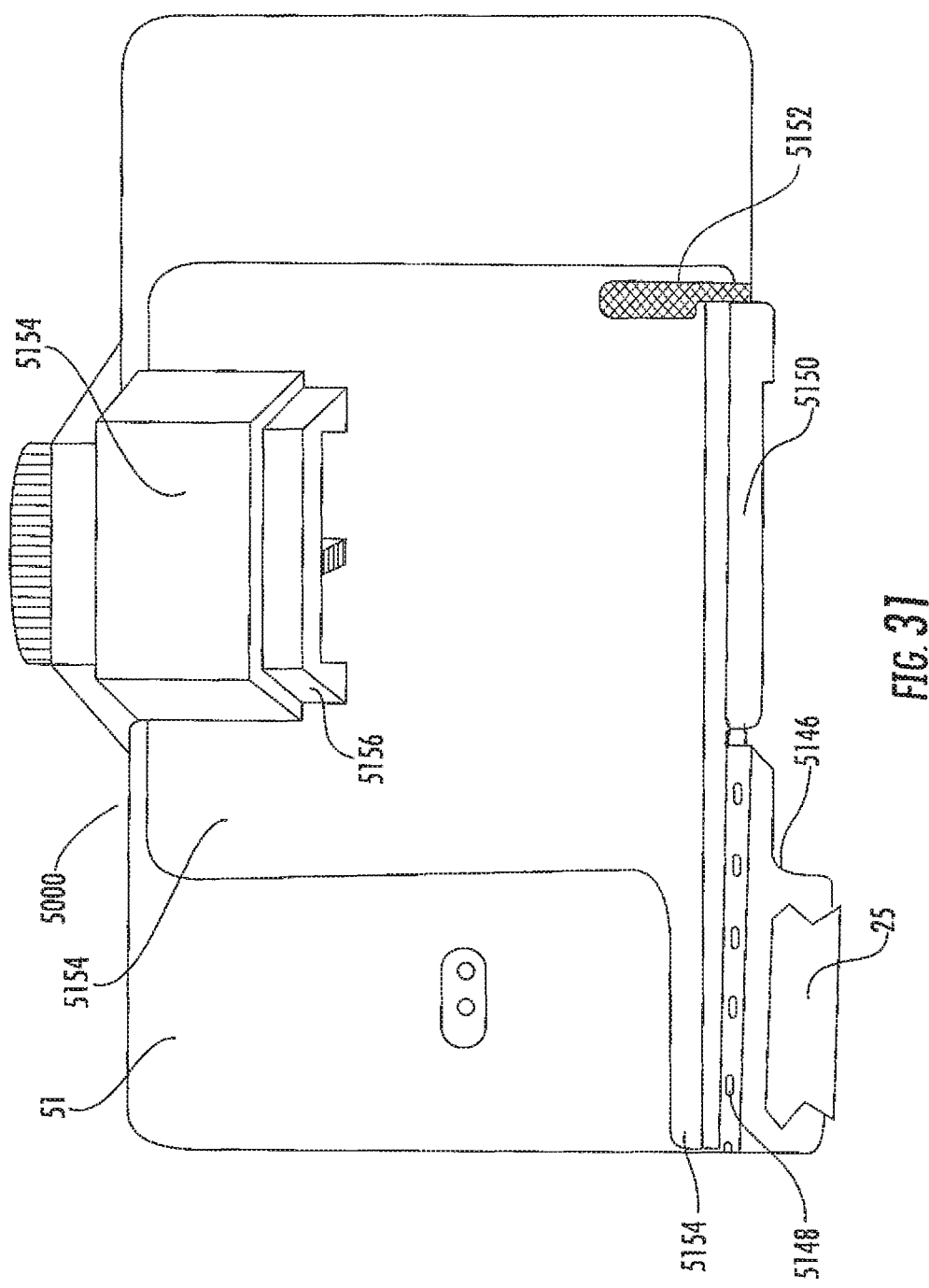

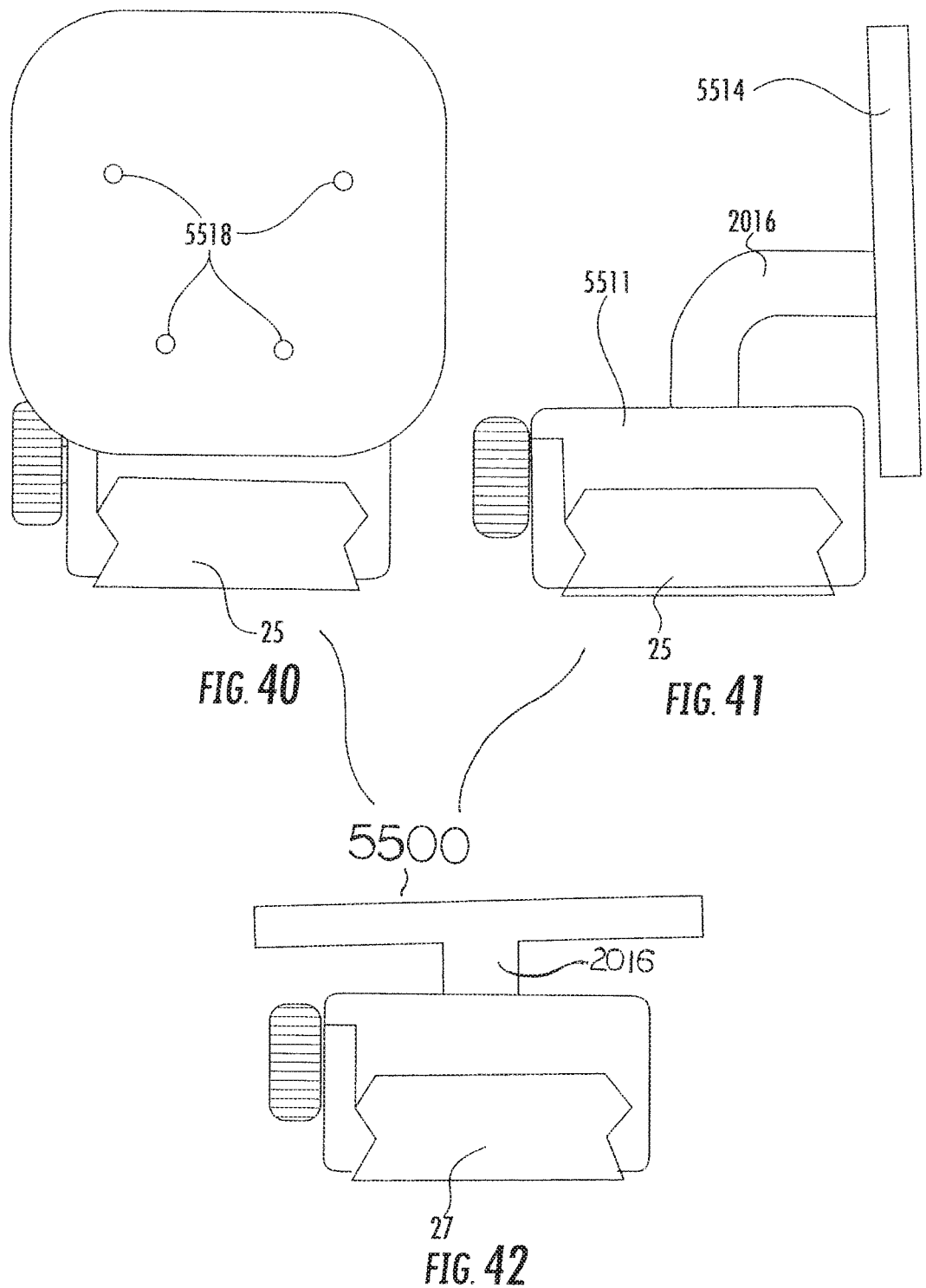

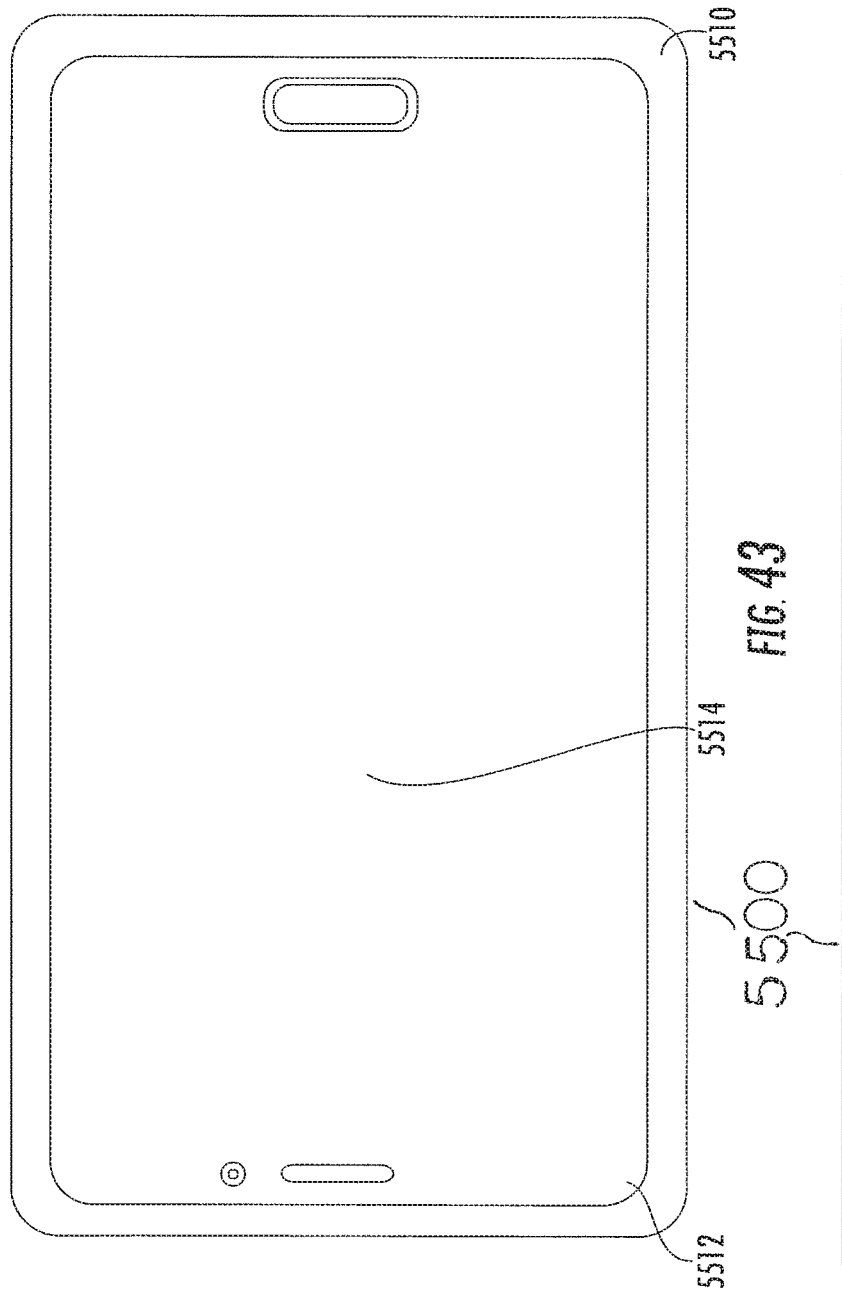
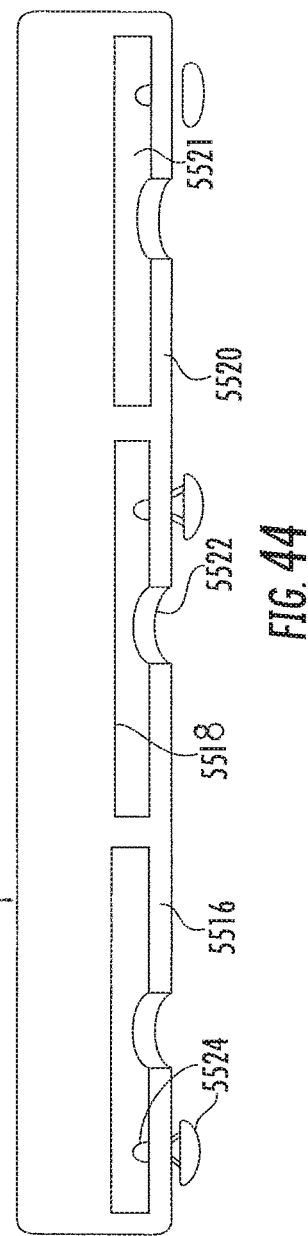
FIG. 43
FIG. 44

CAMERA SIGHT DEVICE FOR A WEAPON

CROSS-REFERENCE TO RELATED APPLICATION

This application is related to and claims benefit to U.S. Provisional Patent Application Ser. No. 62/386,055, filed Nov. 16, 2015, entitled DEVICE THAT IS MOUNTED ON RAIL SYSTEMS OF FIREARMS CONSISTING OF A MINIATURE CAMERA THAT TRANSMITS ITS OWN WIFI SIGNAL AND IS MOUNTED IN A HOUSING THAT IS INTEGRAL TO A SIGHT ADJUSTABLE RAIL MOUNT AND IS USED TO VIEW TARGETS FROM AROUND CORNERS OR FROM BEHIND EMBANKMENTS OR ANY OTHER BULLET PROOF POSITION WITHOUT EXPOSING YOURSELF OR YOUR POSITION WHILE DOING SO WITH TARGET VIEWED IN CROSSHAIRS OR RED DOT ON SMART PHONE SCREEN, the entirety of which is incorporated herein by reference; this application is related to and claims benefit to U.S. Provisional Patent Application Ser. No. 62/386,054, filed Nov. 16, 2015, entitled DEVICE THAT IS PRIMARILY MOUNTED ON RAIL SYSTEMS OF FIREARMS CONSISTING OF A MINIATURE CAMERA THAT IS HOUSED IN ITS OWN HOUSING THAT IS INTEGRAL TO A SIGHT ADJUSTABLE RAIL MOUNT AND TRANSMITS ITS OWN SIGNAL BY WIRE TO ITS OWN MONITOR AND IS USED TO LOCATE AND SIGHT IN POTENTIAL TARGETS FROM AROUND CORNERS OR ANY OTHER BULLET PROOF STRUCTURE WITHOUT HAVING TO EXPOSE YOURSELF AS A TARGET, the entirety of which is incorporated herein by reference; DEVICE THAT IS PRIMARILY MOUNTED ON RAIL SYSTEMS OF FIREARMS CONSISTING OF A MINIATURE CAMERA THAT IS HOUSED IN ITS OWN HOUSING THAT IS INTEGRAL TO A SIGHT ADJUSTABLE RAIL MOUNT AND TRANSMITS ITS OWN SIGNAL BY WIRE TO ITS OWN MONITOR AND IS USED TO LOCATE AND SIGHT IN POTENTIAL TARGETS FROM AROUND CORNERS OR ANY OTHER BULLET PROOF STRUCTURE WITHOUT HAVING TO EXPOSE YOURSELF AS A TARGET; this application is related to and claims benefit to U.S. Provisional Patent Application Ser. No. 62/388,110, filed Dec. 12, 2015, entitled DEVICE THAT IS MOUNTED ON RAIL SYSTEMS OF FIREARMS CONSISTING OF A MINIATURE HD CAMERA THAT TRANSMITS ITS OWN WIFI SIGNAL AND IS MOUNTED IN A HOUSING THAT IS EITHER INTEGRAL TO A WEAPONS RAIL MOUNT OR MOUNTS DIRECTLY TO THE BACK OF SIGHTS OR SCOPES AND IS PRIMARILY USED TO VIEW TARGETS THROUGH EXISTING SIGHTS ON WEAPON, the entirety of which is incorporated herein by reference; this application is related to and claims benefit to U.S. Provisional Patent Application Ser. No. 62/388,109, filed Dec. 12, 2015, entitled DEVICE THAT IS MOUNTED ON RAIL SYSTEMS OF FIREARMS CONSISTING OF A MINIATURE HD CAMERA WITH OR WITHOUT INFRARED VIEWING CAPABILITIES THAT IS MOUNTED IN A HOUSING THAT IS INTEGRAL TO A WEAPONS RAIL MOUNT AND TRANSMITS ITS OWN SIGNAL BY WIRE TO ITS OWN MINITOR AND IS PRIMARILY USED TO VIEW TARGETS THROUGH EXISTING SIGHTS ON WEAPON, the entirety of which is incorporated herein by reference; this application is related to and claims benefit to U.S. Provisional Patent Application Ser. No. 62/330,199, filed May 1, 2016, entitled RED DOT TYPE SIGHT WITH INTERNAL CAMERA THAT VIEWS TARGETS USING SIGHT BOTH IN CONVENTIONAL MANNER OR WITH IMAGE REFLECTED OFF INTERNAL MIRROR TO WIFI TRANSMITTING CAMERA, the entirety of which is incorporated herein by reference; this application is related to and claims benefit to U.S. Provisional Patent Application Ser. No. 62/398,509, filed Sep. 22, 2016, entitled FIREARM RAIL MOUNT FOR CAMERA SIGHT THAT ROTATES 360 DEGREES AND LOCKS INTO VARIOUS POSITIONS TO ALLOW USER TO LOCATE AND FIRE ON HOSTILE TARGETS WITHOUT EVER HAVING TO EXPOSE SELF AS TARGET, the entirety of which is incorporated herein by reference.

FIELD OF THE INVENTION

The present invention relates to a camera device mountable about a rail of a weapon, and more particularly to a camera device mountable about a rail of a weapon for providing a sight about a digital display.

BACKGROUND OF THE INVENTION

In general, weapon accessories have long been established for mounting on pistols and rifles. Such accessories include red dot sights, high powered lights, night vision, laser sights, and the like. All the aforementioned weapon accessories help locate and pinpoint a target. However, the prior art fails to allow a user to effectively pinpoint a target from off to the side or from any other position that could be in relation to the weapon. Presently, a firearms user must be directly behind the weapon to sight a target, which exposes the firearms user in harm's way to the accurate use of the weapon.

In other words, in order to accurately locate, pinpoint, and fire on a target, the user of the firearm must become a target thereby presenting a problem in that first responders, soldiers, and law enforcement personnel often encounter hostile combatants, violent actors, or offenders who carry pistols, rifles, or other weapons. In military scenarios, battles and other military operations, often occur in urban theaters requiring armed forces to patrol and engage in battle in towns and cities. Personnel on patrol in dangerous areas must regularly take cover behind obstacles such as buildings, vehicles, trees, homes, etc., and have to locate and fire on hostile combatants from protective cover. The problem is that with friendly combatants' entire body being behind cover, a clear lineal view to be able to locate and accurately fire on advancing hostile forces cannot be accomplished without looking over or around these fortified structures to both locate and fire on hostiles, exposing himself as a target while doing so. In fact, statistics tell that as much as 50 percent of American casualties occur on the battlefield while doing so. Various solutions to this problem have been proposed in the literature of this patent application.

The current available solutions to the problem identified herein lacks in overall range of function, in that, the current solutions provide components that are exclusive to itself and function as a complete units, so they are restricted to being used with either the type of firearm designed to be used with or the type of firearm that they become an integral part of, which means there are no real options as far as whether they are being used with a rifle or pistol, or what caliber or type of firearm that can be used with these other current solutions. For this reason, that there are no options as far as the types of target viewing devices that they are being used in conjunction with such as red dot sights, night vision, scopes, etc., nor do they have any options as far as the type of viewing device or screen that target is viewed in, other than the one kind that its designed to work with. The present solutions to the identified problem consist of other solutions that do not overcome the problems identified herein, including folding rifle stocks that are added to a pistol or consist of multiple bulky components and electronic devices that all take up space as well as add additional weight to a soldier's already heavy load. Another problem with the present solutions is the lack of versatility and exclusivity in that present device employ very expensive high-tech components that are exclusive to their solution and many high tech electronic components employed in them cannot be supplemented, which not only limits versatility and range of application and use but also creates additional problems in the cost of repair, service, and maintenance of prior solutions which quite often make the prior solutions unaffordable for most small entities such as militias, micro-states, police departments, and etc. or to even supply all of the soldiers in our own military with these currently available solutions.

Therefore, a need exists for improvements over the prior art and more particularly for the methods and systems that provide combatants the ability to remain fully behind protective cover while having the ability to locate targets of potential danger, as well as accurately fire around a wall, vehicle, or any other bullet proof structure the combatant is taking protective cover behind without having to expose himself as a target while doing so.

SUMMARY OF THE INVENTION

The present invention advantageously provides a firearm sighting device, including without limitation a sighting device capable of sighting from an LCD screen.

According to an embodiment of the present invention, a principal object is to provide a sighting device that has a mounted LCD screen configured for use with either of pistols and rifles, a rechargeable battery unit, and a camera housing centered behind cross hairs and/or red dot(s), the housing selectably mounted on a platform that attaches to a rail system of a weapon. The camera housing having an attachment to the platform to at least three places.

According to an embodiment, an object of the instant embodiment is to provide a firearm sight system that includes a new type of camera sight, as well as several accessories, that have been designed to work as an integral part of or to work in conjunction with the instant camera sight in different forms and applications to expand and enhance overall range of use. The firearm sight is designed to be adapted to, or incorporated into, any type of reflex or holographic type firearm sight, but also the same camera sight can be incorporated, or adapted to, tactical prism sights, as well as scopes. The camera sight in one design includes a tiny HD camera with infrared viewing capabilities and its own Wi-Fi transmitting module. The camera is mounted in a position where the camera can receive an image from behind a front window or lends of the sight where the image of the target or surrounding area first enters the sight and the camera would be mounted in a particular vantage point where the image of the reticle provided by the sight can be viewed as true to the target. This camera would have infrared capabilities as well as its own Wi-Fi transmitting module with this Wi-Fi transmitting module being either part of this camera or this Wi-Fi transmitting module being a separate unit that is hard wired to the camera and mounted separately. The Wi-Fi transmitting module would transmit the image and sound received from the front window of the sight or lens of the sight to a smart device or any other device that can receive and display a transmitted Wi-Fi image such as a smart phone, computer, glasses, or goggles, computer watch such as an iWatch, or any computer or tablet. The screen on the smart device may be used in connection with the sight, the screen would become the sight screen for the sight and in turn the sight screen for the firearm that the camera sight is mounted to. The overall range of adaptation and application of tiny HD cameras with infrared viewing capabilities and Wi-Fi transmitters that are either attached to or incorporated into a design of these various types of tactical sights and scopes. The small size of the HD cameras expand camera sights range of adaptation and application, particularly when incorporated into the design of a parallax free type reflex sight, including red dot type sights, or parallax free holographic type sights. The advantage of a parallax free is that a parallax free sight keeps the image of the reticle provided by the sight as well as the image of the target and surrounding area true to matter the angle the user would be viewing the image displayed by the sight's window. For this reason, the camera incorporated into a parallax free type sight can be mounted anywhere about the firearm as long as the camera can acquire a clear view of the sight's window where the image of target and surrounding area, as well as the image of the reticle, that is provided by the sight and their placement to each other, remain the same whether the user is viewing the image in the sight while using the sight in a regular or conventional manner or whether the user is viewing the image of the target behind the reticle and surrounding area that is transmitted by Wi-Fi from the camera sight to a smart phone or any other device that can receive and display a Wi-Fi signal. These two images would remain identical with the reticle remaining true to the target, both in the sight so the user can view the target in either manner or both at the same time and with target always being viewable in the perfect center of the smart phone screen behind the reticle.

According to an embodiment, an object of the instant embodiment is to provide several accessories designed to enhance the camera sight's overall range of use that will be fully explained and better understood in the description and illustrations that follow as well as several other optional designs and applications of the camera sight described and illustrated in this application to better illustrate the versatility and range of use of the camera sight which can will be fully understood in the description and illustrations that follow.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein:

FIG. 7D is a side view of a camera sight in parallax free design with infrared illuminator in accordance with the principles of the present embodiment;

FIG. 13 is a side view of a camera sight in accordance with the principles of the present embodiment;

FIG. 14A is a side view of a camera sight in accordance with the principles of the present embodiment;

FIG. 14B is an overhead view of a camera sight in accordance with the principles of the present embodiment;

FIG. 14D is an overhead view of a camera sight in accordance with the principles of the present embodiment;

FIG. 16A is an illustration of a camera sight in accordance with the principles of the present embodiment;

FIG. 16B is an illustration of a camera sight in accordance with the principles of the present embodiment;

FIG. 29 is an illustration of a rail mount in accordance with the principles of the present embodiment;

FIG. 30A is an illustration of a rail mount in accordance with the principles of the present embodiment FIG. 30B is a camera sight system in accordance with the principles of the present embodiment;

FIG. 31 is a rotatable smart phone mount in accordance with the principles of the present embodiment;

FIG. 40 is a front view of a device mount with a holding plate for a rail mount in accordance with the principles of the present embodiment;

FIG. 41 is a side view of a device mount with a holding plate for a rail mount in accordance with the principles of the present embodiment;

FIG. 42 is a device mount with a holding plate in accordance with the principles of the present embodiment; and FIG. 43-45 is a smartphone case in accordance with the principles of the present embodiment.

DETAILED DESCRIPTION OF THE INVENTION

Figure 1:
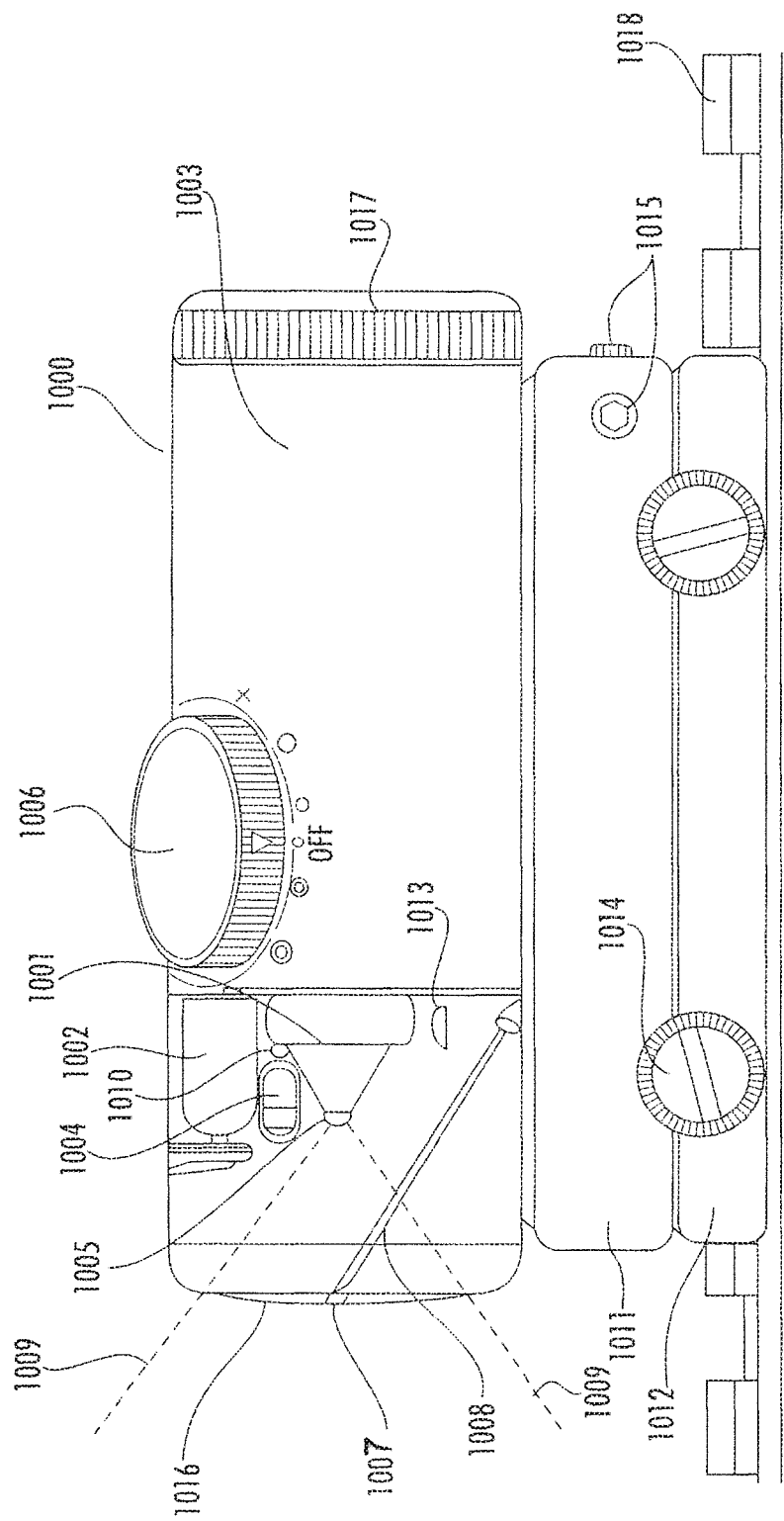
FIG. 1 is a side view of one embodiment of a sighting device mounted in accordance with the principles of the present embodiment.

The present invention advantageously provides a sighting device for attachment to a weapon for providing a digital scope. The present invention contemplates various types of mounts and configurations of digitally displaying an accurate sight.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawings figures in which like reference designators refer to like elements. FIG. 1 shows an exemplary camera sight constructed in accordance with the principles of the present embodiment and designated generally as camera sight 1000. A HD infrared viewing camera 1001 is hard mounted in a sight housing 1003 in a position such that a camera lens 1005 is centered behind the reticle 1009. The reticle 1009 is reflected off the inside surface of the lens 1016 such that an image of a target behind the reticle 1009 and the surrounding area is transmitted from the camera sight 1000 to a smart phone or other viewing device that works in conjunction with camera sight 1000. In one non-limiting embodiment. In one non-limiting embodiment, the reticle 1009 that is reflected off the inside surface is perfectly centered on the screen of the viewing device.

The sight housing maintains a Wi-Fi transmitting module 1002. In one embodiment, the Wi-Fi transmitting module is separate from the camera 1001 wired to the transmitting module 1002. In another alternative and non-limiting embodiment, the HD infrared viewing camera 1001 is available with a combined Wi-Fi transmitting modules existing as a combined component of the camera sight 1000.

Housing 1003 is integral with a top section of an upper rail mount 1011, the housing 1003 houses the working components of the camera sight 1000, including the camera Wi-Fi transmitting module 1002, batteries, and the like. On the outer surface of the housing 1003 is an on/off switch 1004 for turning the camera sight 1000 on and off.

Within the housing 1003 is a camera lens 1005, the camera lens 1005 is centered behind projected reticle 1007 whereby the reticle is reflected off of the inside of a window or lens such that as the user sights in the camera sight 1000 off the rail mount, the rail mount being integral to the camera sight, the user is sighting in the camera 1001.

Secured about the housing 1003 is a reticle selector 1006, the reticles selector 1006 functions as an on/off switch for sight reticle, as well as selects different types of reticles that are projected to inside of window or lens of the camera sight such as different types of dots, cross hairs in different sizes, and brightness intensities. The reticle selector is optionally be powered by the batteries that are maintained within housing 1003.

Projected reticle 1007 is reflected off the center of the inside window or lens. The projected reticle beam 1008 being projected onto the inside window and/or lens causing a projected reticle 1007 to be projected thereof.

The HD infrared viewing camera 1001 has a viewing angle, as exemplified by the dotted lines 1009 identifying an exemplary viewing angle of the camera 1001. The camera 1001 may be positioned for increasing or decreasing the viewing angle 1009 up to a maximum and minimum viewing angle, the viewing angle allows for displaying on a screen both the target and the surrounding area, such that increasing the viewing angle will increase the view of the surrounding area but decrease the target size on a display and decreasing the viewing angle will decrease the view of the surrounding area but increase the target size on a display.

The housing 1003 includes an indicator light for the on/off switch 1004 for indicating whether power is on or off for the camera sight.

The upper portion 1011 of the rail mount is part of or otherwise coupled with the housing 1003. The upper portion 1011 enables sight adjustment off of a lower section 1012 of the rail mount. The lower section 1012 of the rail mount attaches to camera sight 1000 to a rail 1018 of a weapon.

A charging port 1013 is further provided about the housing for charging the camera sight 1000. A thumb screw 1014 positioned about the rail mount is operable to secure attachment of and removal of the camera sight from the rail 1018. One or more adjustment members 1015 ad positioned about the upper portion 1011 for causing vertical and lateral sight adjustment, such that sight adjustments are made by rotating or otherwise interacting with the adjustment members 1015. When the adjustment members 1015 are twistable members, the adjustment members are turned clockwise or counter clockwise wither with an Allan wrench, screwdriver, or a person's fingers.

The camera sight 1000 includes a viewing window 1016 or lens that the camera positioned within the housing 1003 receives image therethrough. The window 1016 may be with no magnification or may alternatively may magnify imagery.

The housing further includes door 1017 or lid to a battery compartment for storing batteries capable of powering the camera sight 1000.

The rail 1018 is configured to mount to a rail of a weapon, including a handgun, shotgun, assault weapon, or other like projectile based weapons.

Figure 2:
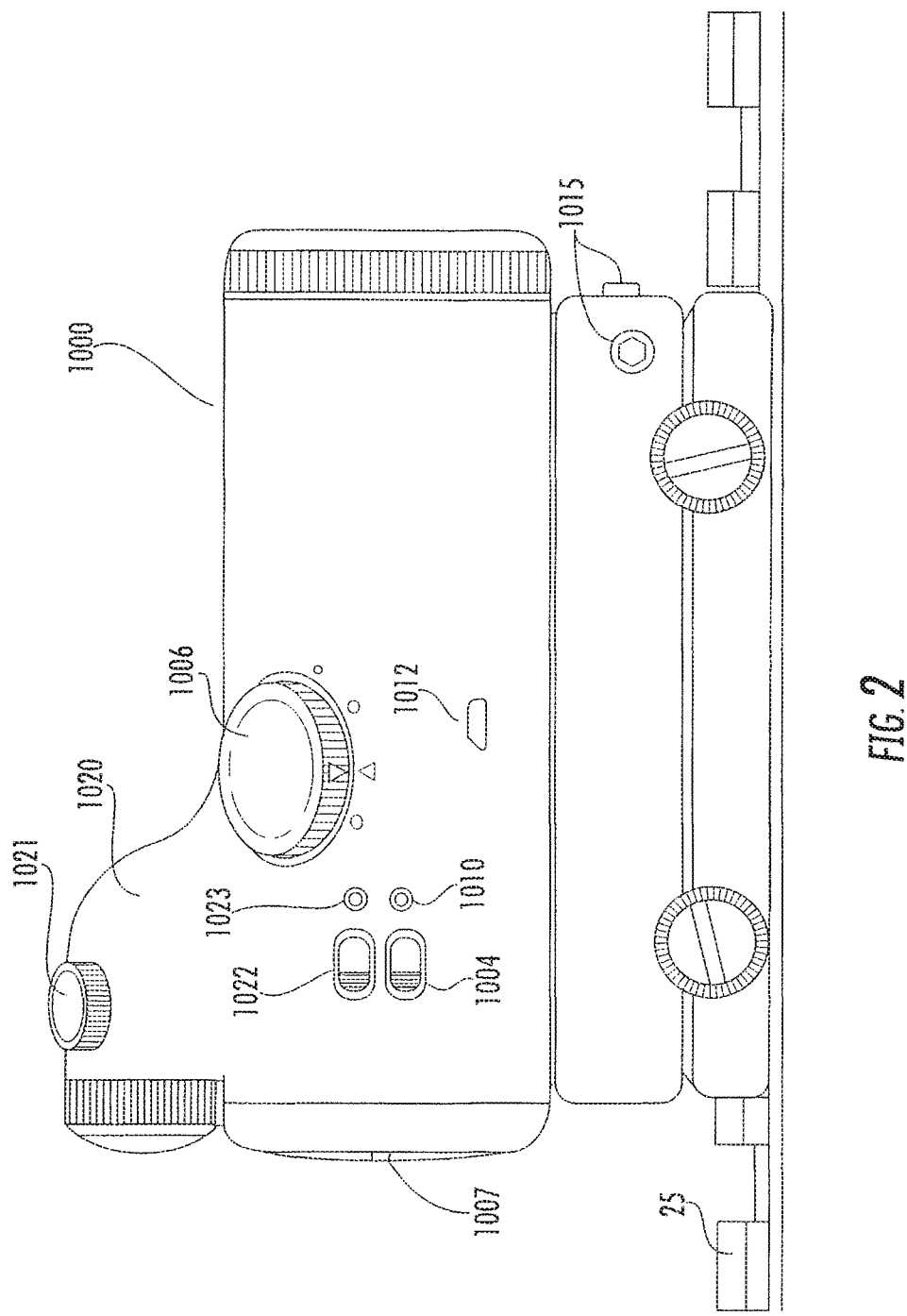
FIG. 2 is a side view of one embodiment of a sighting device mounted in accordance with the principles of the present embodiment.

FIG. 2 is a side view of an alternative embodiment of the sight adjustable camera sight 1000 with infrared viewing capabilities, LED, and/or laser illuminator built into the design of this camera sight 1000. Camera sight 1000 includes a built in infrared illuminators incorporated into the design such that the camera 1001 would be able to utilize, or otherwise have infrared viewing capabilities capable of using the camera sight 1000 in both day and night conditions. The camera sight 1000 includes a one or more reticle control member 1006. An infrared (either LED or laser) illuminator is incorporated into the designs of these camera sights 1000 in that the camera has infrared viewing capabilities so that build in infrared illuminators allow the camera sight 1000 to work both during the day and night. The beam controller 1021 may be rotated to control the beam angle and/or the beam intensity. The camera sight 1000 includes an on/off switch 1004, an indicator light 1010, a vertical and horizontal sight adjustment members 1015 and a battery charging port 1012. The camera sight 1000 of FIG. 2 is mounted about a rail 25 of a weapon.

Figure 3:
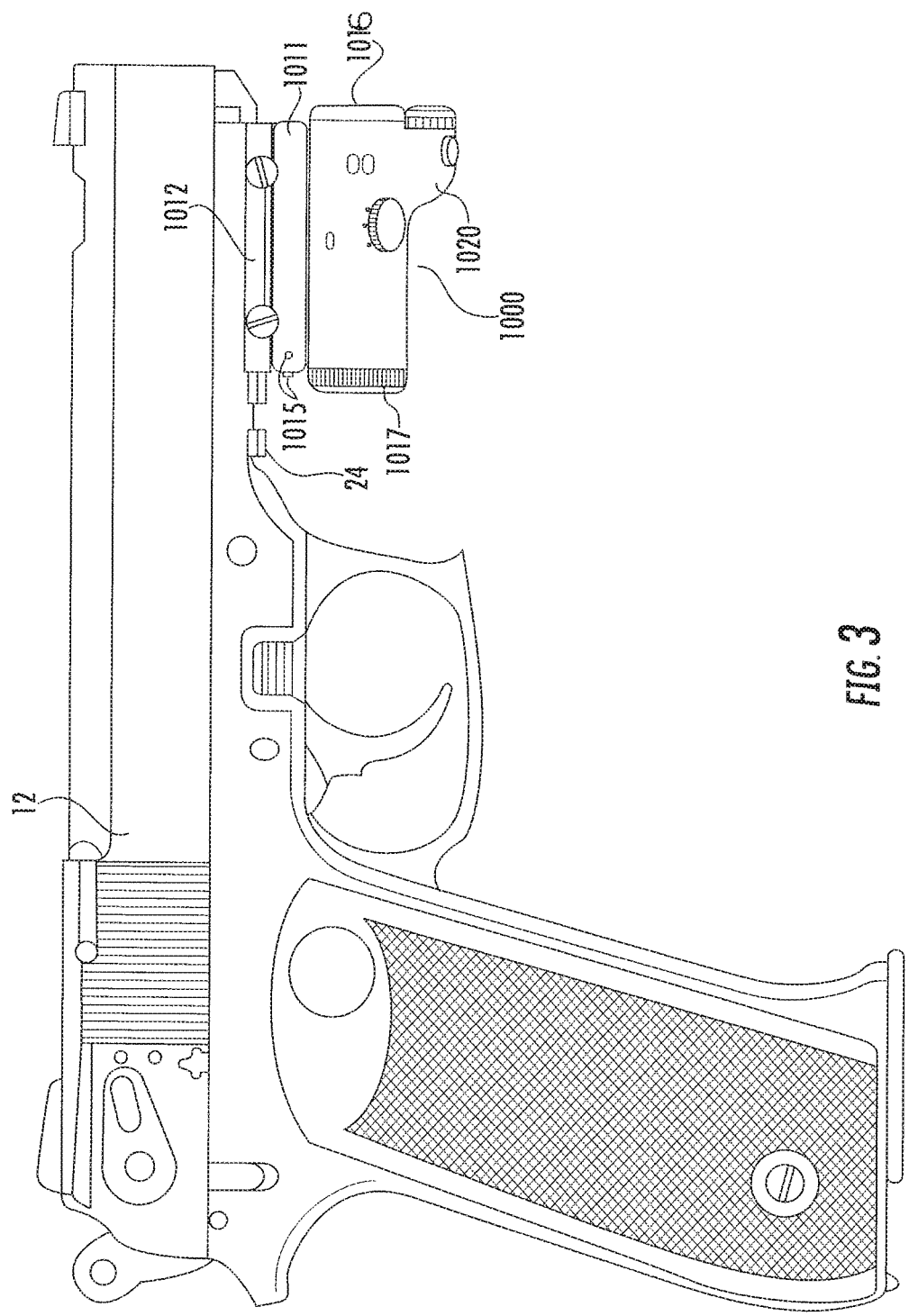
FIG. 3 is a side view of a sighting device mounted in accordance with the principles of the present embodiment.

FIG. 3 is an illustration of a camera sight 1000 with integral infrared illuminator 1020 mounted on lower rail 24 of a pistol 12. The user would incorporate a smart phone (not shown) to view an image entering the window 1016 of the camera sight 1000, such that the user would receive and view the target and surrounding area either on a smart device or a computer watch, or other viewing device.

Figure 4:
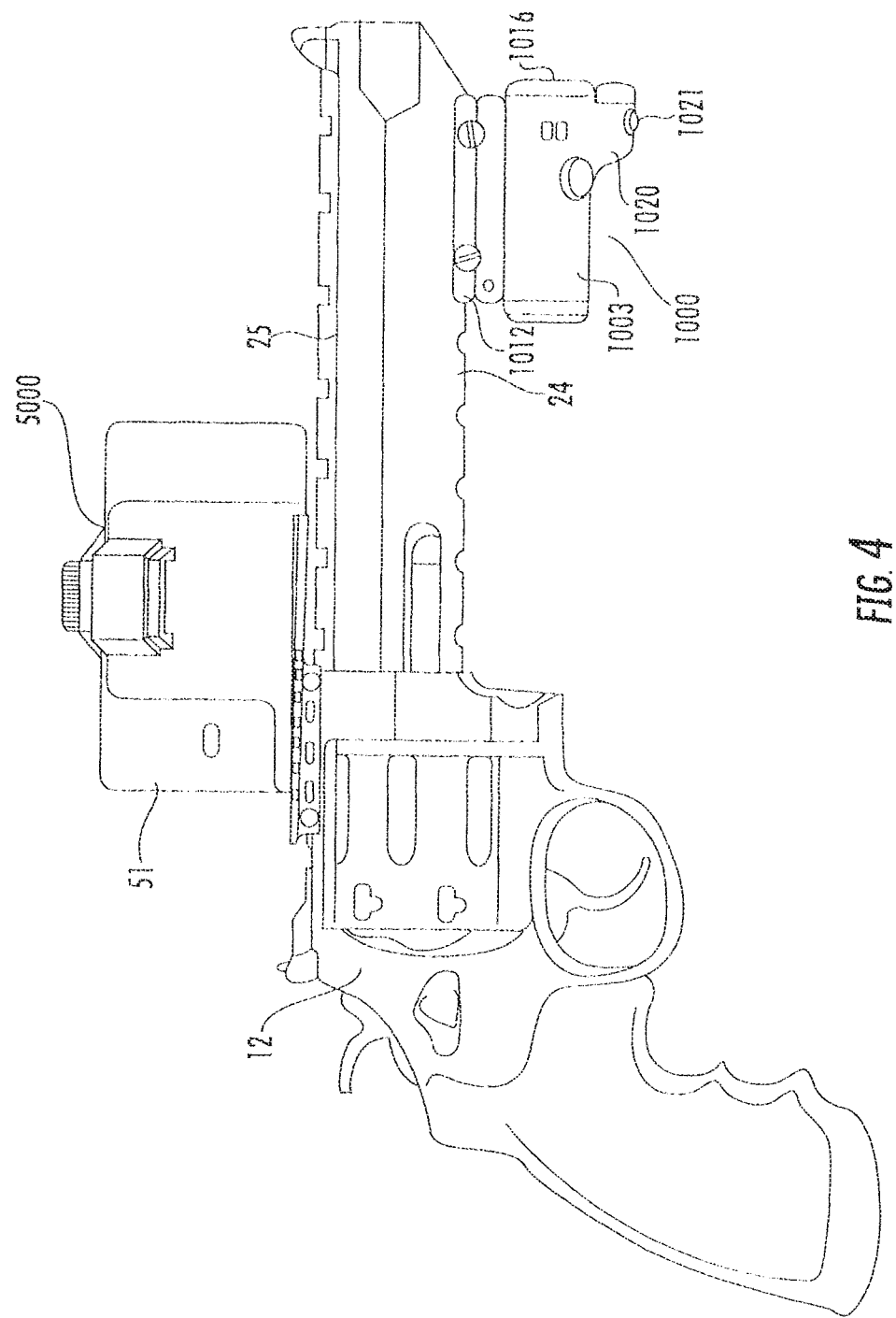
FIG. 4 is a side view of a sighting device mounted with a hand gun further illustrating wireless connection between a smartphone and the sighting device in accordance with the principles of the present embodiment.

FIG. 4 is an illustration of one of the embodiments of camera sight 1000 secured with a lower rail 24 of a weapon 12, the weapon taking the form of a pistol, an rotatable smartphone device holder 5000 securable about an upper rail 25 of the weapon 12, the rotatable smart device holder 5000 holding a smart phone 51 (e.g., an iphone). The rotatable smartphone device holder 5000 is capable of rotating and locking into a viewable position at least 90 degrees to the left of the rear of the weapon 12 and at least 90 degrees to the right of the rear of the weapon 12, such that the rotatable smartphone device holder 5000 is capable of rotating at least 180 degrees, although it may be capable of 360 full rotation for providing the user with safety from a structure when operating the weapon.

Figure 5:
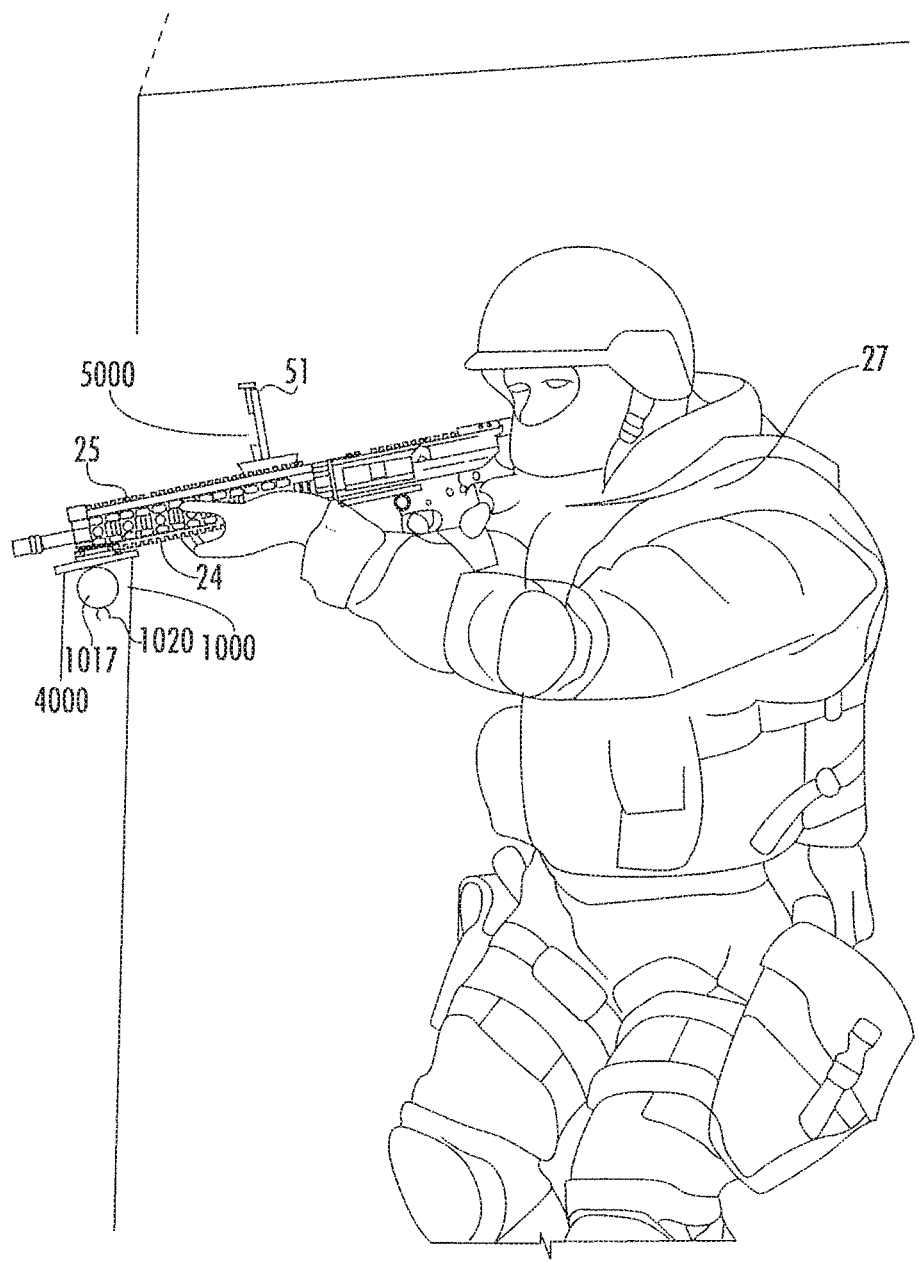
FIG. 5 is a perspective view of a sighting device mounted rotated about a weapon about a rail underneath of a barrel of a riffle and having a wireless connection with a smart device in accordance with the principles of the present embodiment.

FIG. 5 is an illustration of camera sight 1000, which is an integral part of a rotating sight adjustable rail mount 4000 with camera sight 1000 rotated around and locked into a desired angle of use, providing a user 27 thereof, the viewable image is transmitted from the camera sight 1000 to a smart phone 51, the smart phone mounted on a rotatable smart device holder 5000, such that a user can sight and/or surveil or to locate oncoming hostile forces or targets without exposing the user 27 to danger such that the user can remain hidden behind a wall or other structure while the camera sight 1000 rotated to be side facing in FIG. 5 allows the user to see around corners without exposing any portion of the body of the user 27. In this example, the rear and/or battery compartment is facing towards the left of the weapon 12 and the window 1016 is facing towards the right.

Figure 6:
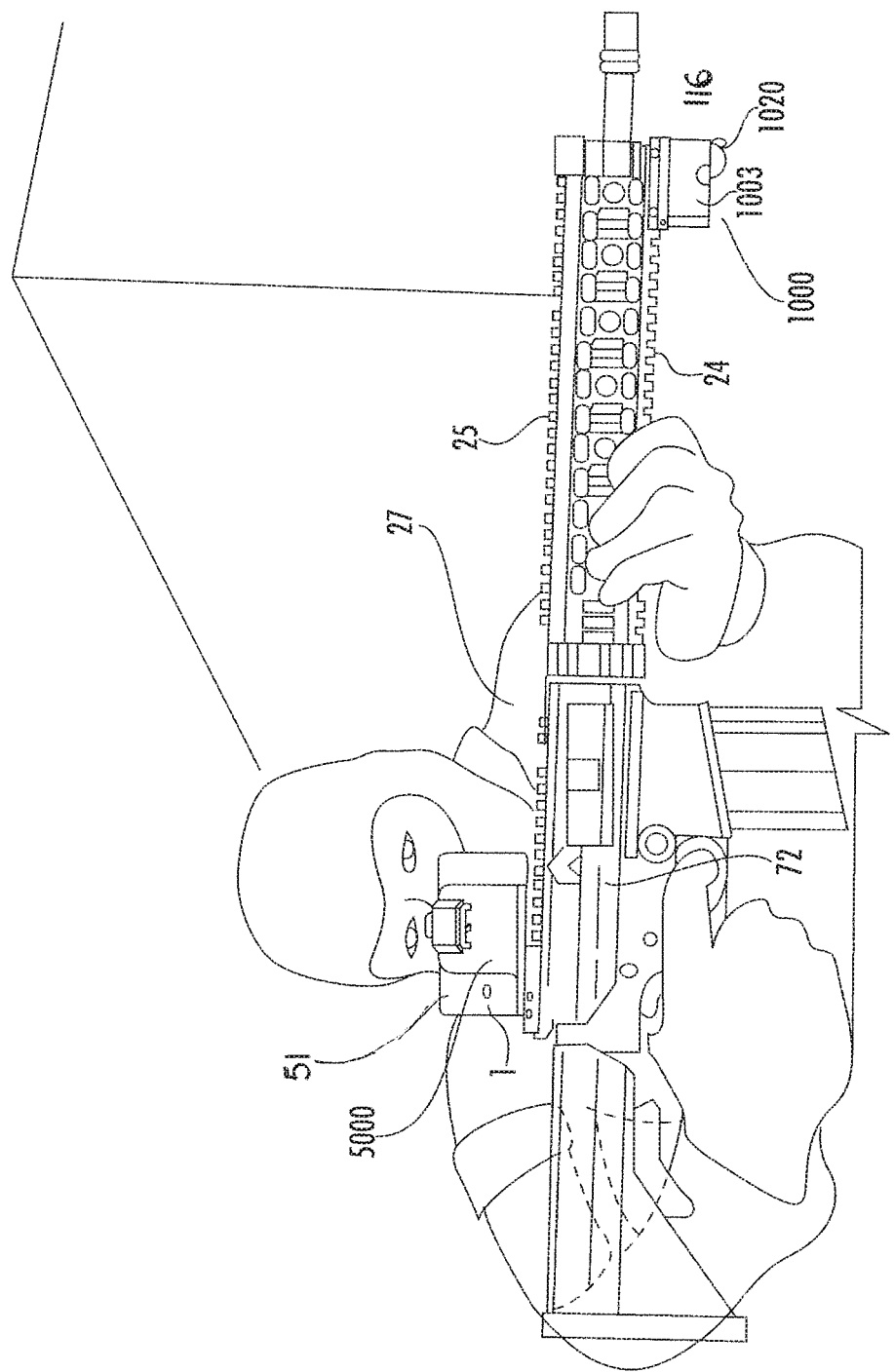
FIG. 6 is a perspective view of a sighting device in accordance with the principles of the present embodiment.

FIG. 6 is an illustration of an exemplary use of the system, and particularly shows user 27 positioned behind a structure for safety, the camera sight 1000 is configured to accurately pin point and fire on targets from safety, such as behind a wall. The display of the smartphone 51 is rotated left of the rear of the weapon 12 and the camera sight 1000 is positioned forward with the window 1016 pointed towards the exit portion of the barrel of the weapon 72, in this example the weapon is a riffle. The rotatable smart device mount is mounted with the upper rail 25 and the camera sight 1000 is mounted to the lower rail 24.

Figure 7A:
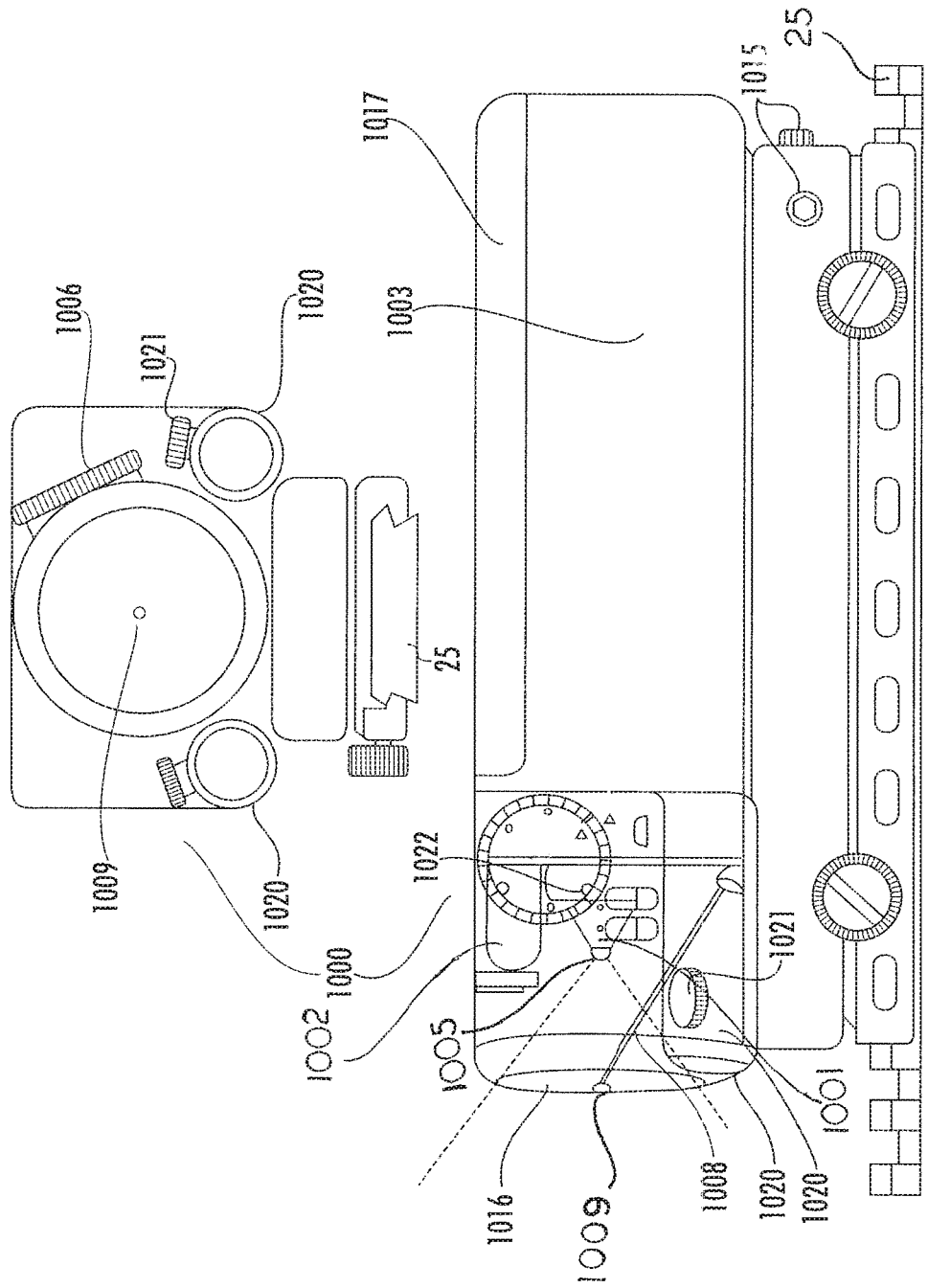
FIG. 7A is a combination of two views of a camera sight in accordance with the principles of the present embodiment.

FIG. 7A is an illustration depicting an alternative camera sight 1000, the front and side of the camera sight 1000 with two infrared illuminators 1020, an extra battery capacity incorporated into the sight housing 1003. The camera sight 1000 can be formed having one or more infrared illuminators capable of enhancing night viewing capabilities. The front section of the camera housing 1003 is illustrated as a forward part of the house's internal components of the camera sight 1000. A HD infrared viewing camera 1001 is hard mounted in a sight housing 1003 in a position such that a camera lens 1005 is centered behind the reticle 1009. The reticle 1009 is reflected off the inside surface of the lens 1016 such that an image of a target behind the reticle 1009 and the surrounding area is transmitted from the camera sight 1000 to a smart phone or other viewing device that works in conjunction with camera sight 1000. In one non-limiting embodiment. In one non-limiting embodiment, the reticle 1009 that is reflected off the inside surface is perfectly centered on the screen of the viewing device. The sight housing maintains a Wi-Fi transmitting module 1002. In one embodiment, the Wi-Fi transmitting module is separate from the camera 1001 wired to the transmitting module 1002. In another alternative and non-limiting embodiment, the HD infrared viewing camera 1001 is available with a combined Wi-Fi transmitting modules existing as a combined component of the camera sight 1000. The beam controller 1021 may be rotated to control the beam angle and/or the beam intensity.

Figure 7B:
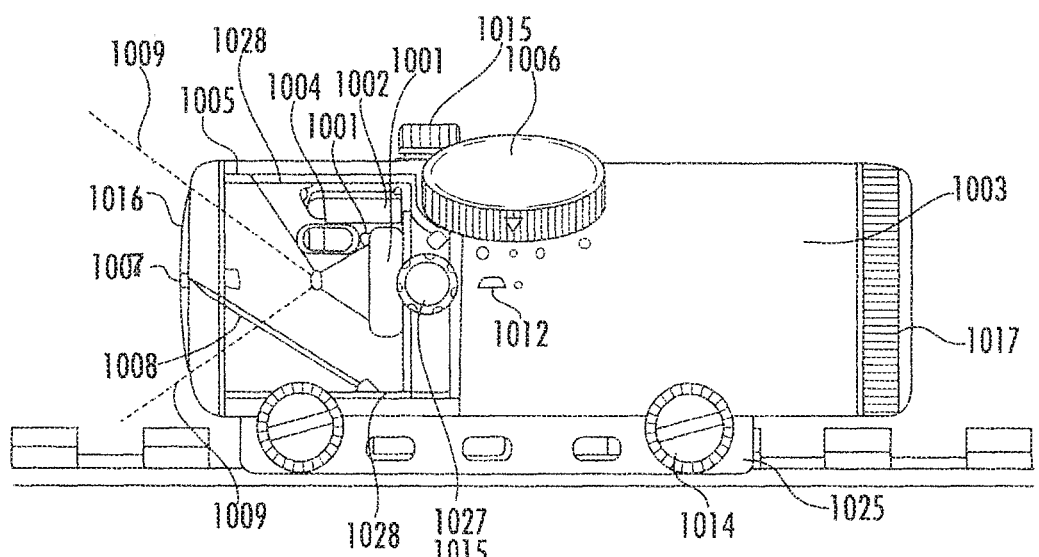
FIG. 7B is a side view of a camera sight in accordance with the principles of the present embodiment.

FIG. 7B is an illustration of a unique embodiment of camera sight 1000, the sight adjustments 1027 to sight adjust the camera sight 1000 to target by positioning the tube inside of the housing. A sight tube 1028 inside the housing houses the camera sight, Wi-Fi transmitting module, and reticle projection.

Figure 7C:
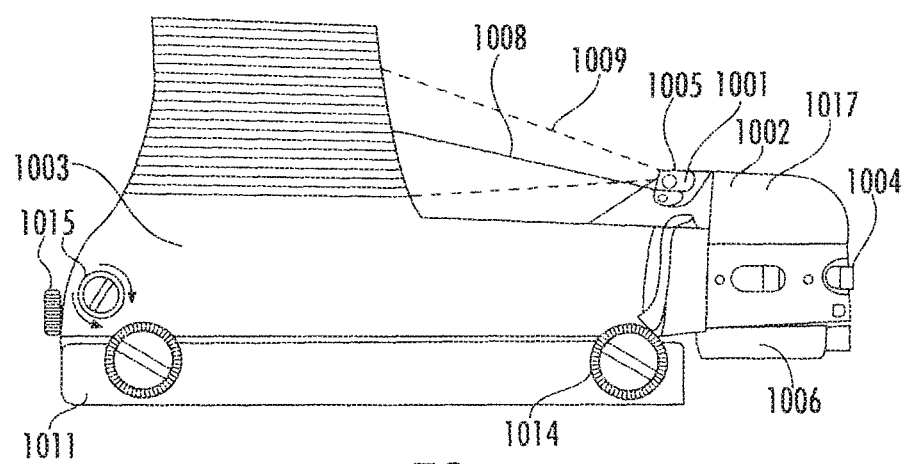
FIG. 7C is a side view of a camera sight in parallax free design in accordance with the principles of the present embodiment.
Figure 8:
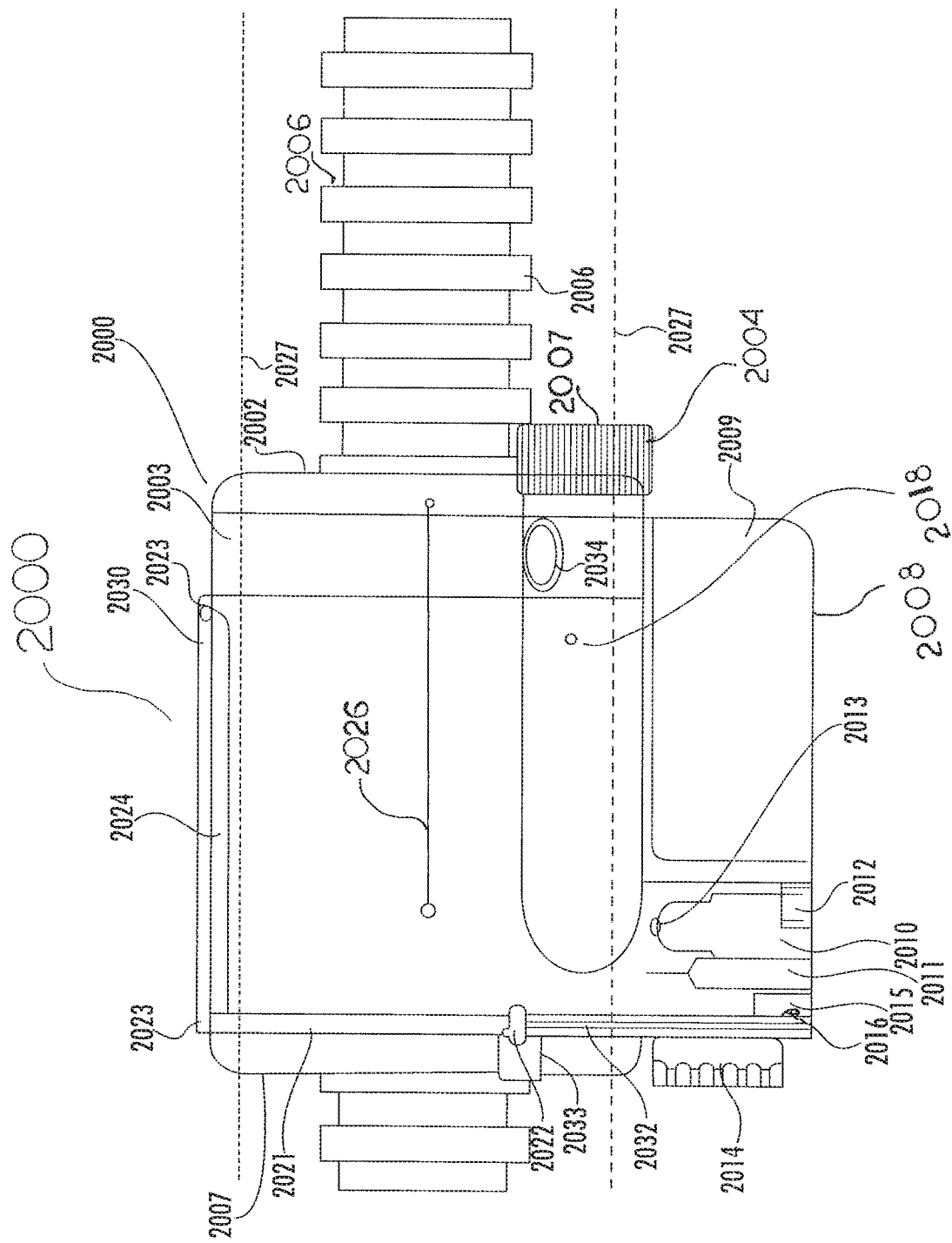
FIG. 8 is an overhead view of camera sight in accordance with the principles of the present embodiment.
Figure 9:
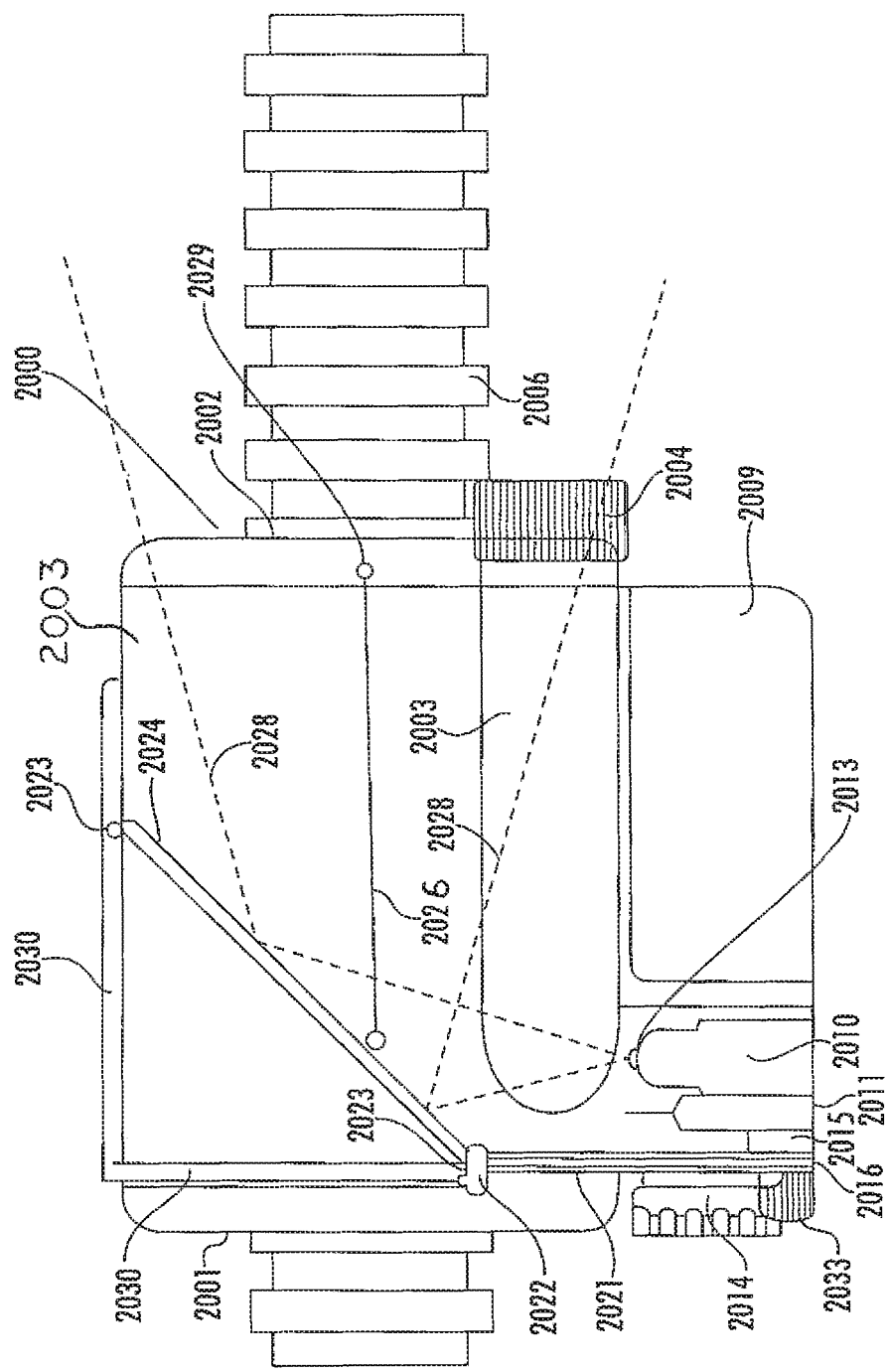
FIG. 9 is an overhead view of a camera sight in accordance with the principles of the present embodiment.
Figure 10:
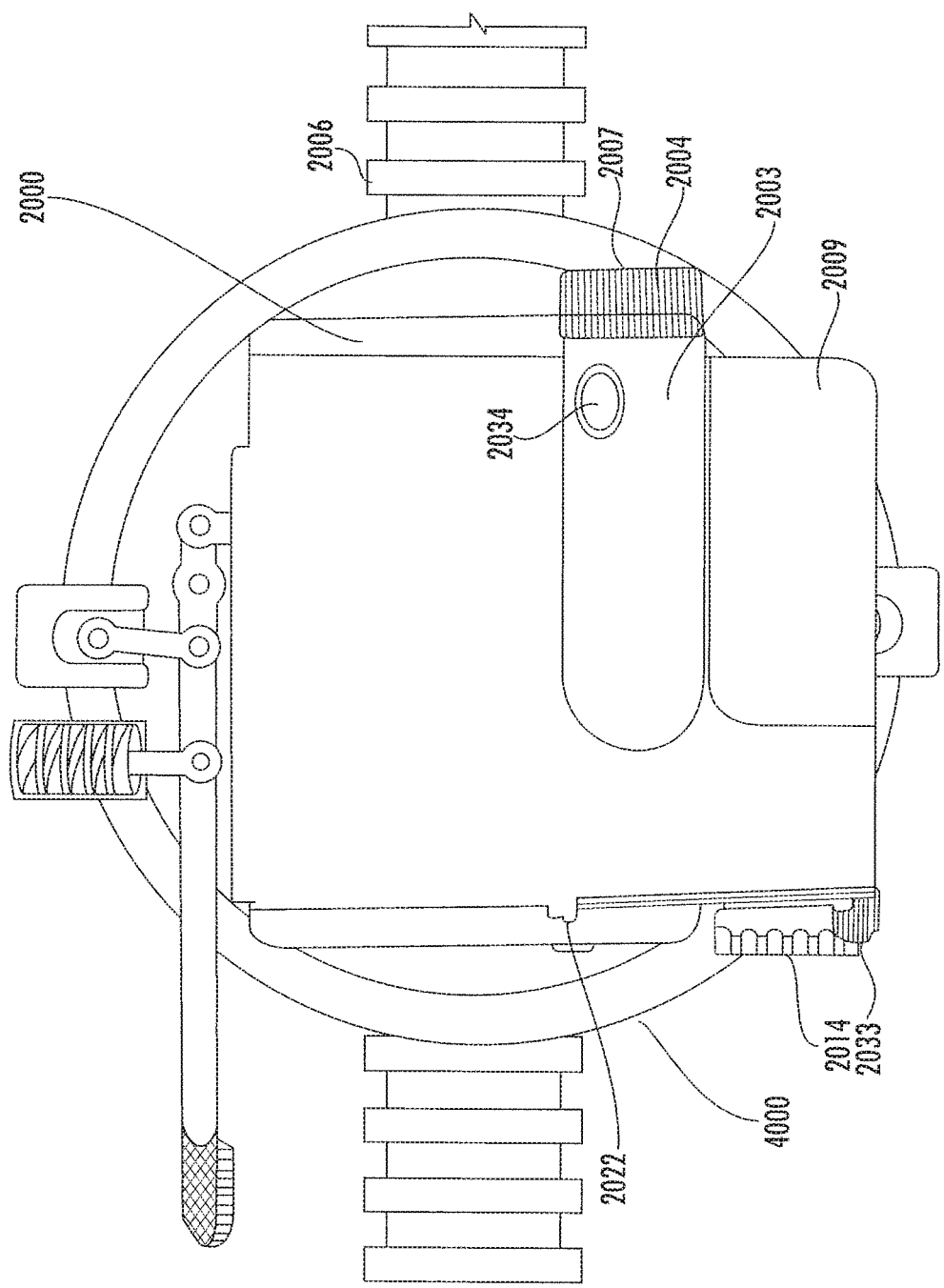
FIG. 10 is an overhead view of a camera sight in accordance with the principles of the present embodiment.
Figure 11:
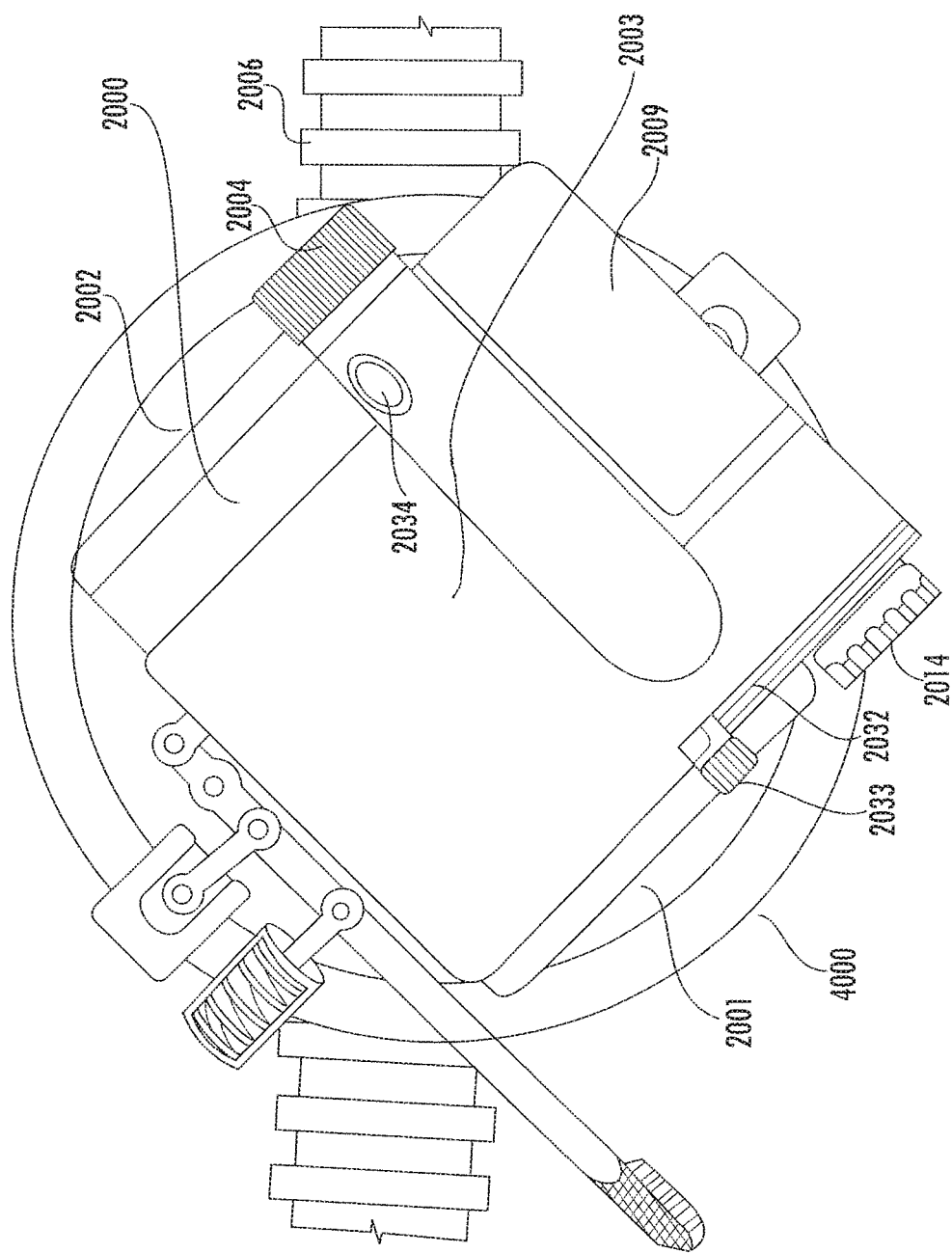
FIG. 11 is an overhead view of a camera sight in accordance with the principles of the present embodiment.
Figure 12:
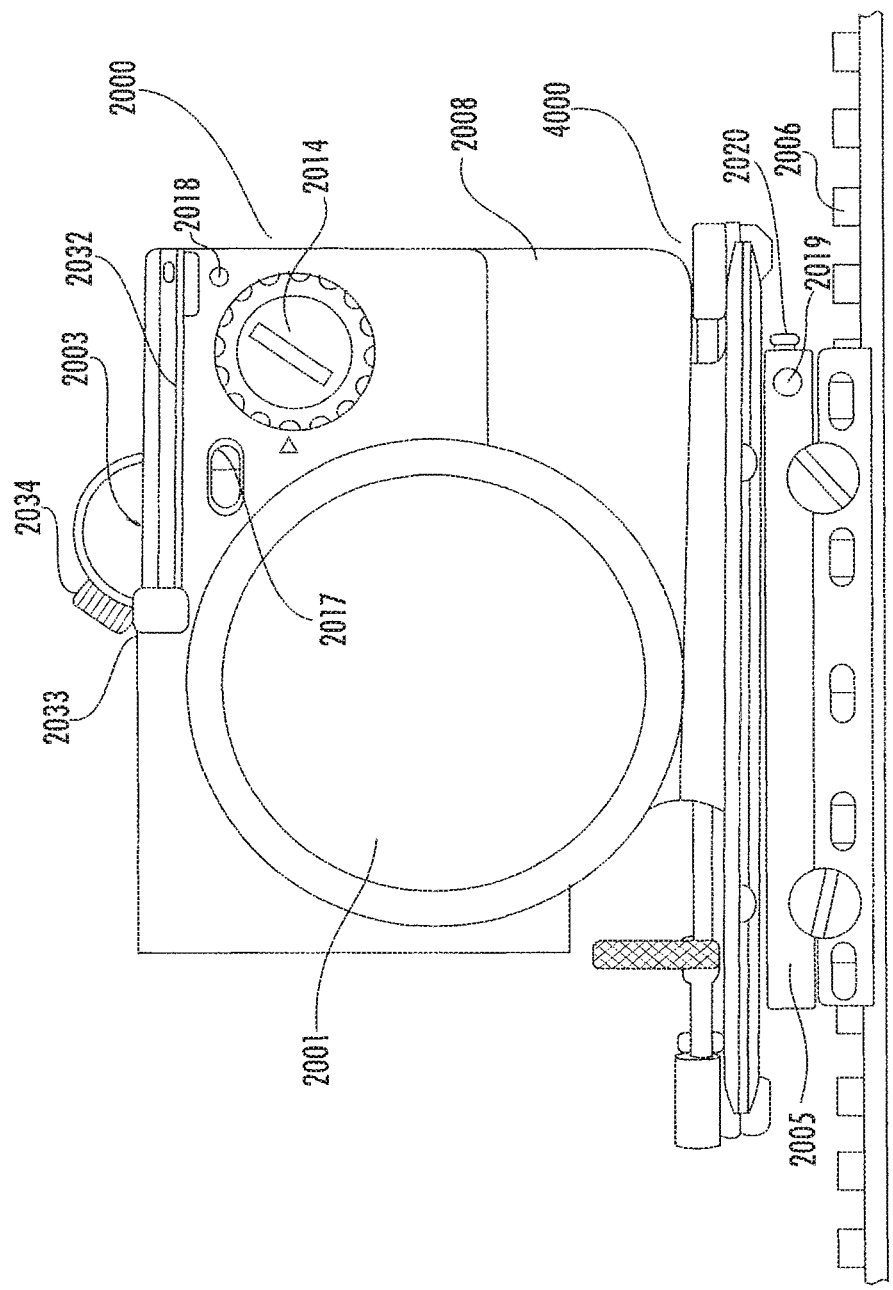
FIG. 12 is a rear view of a camera sight in accordance with the principles of the present embodiment.

FIG. 7C is an illustration of an embodiment of camera sight 1000 having a parallax free type camera sight, the camera 1001 does not have to be mounted directly behind the reticle and can be positioned anywhere where it can attain a clear view of the sight window without obstructing the view to the user when the sight is used in a conventional manner in that the reticle provided by the sight stays true to the target because of the parallax free sight design allowing for accurate targeting regardless of the angle or line of the sight that the target is being viewed in the sight window. The camera sight 1000 includes the housing 1003, vertical sight adjustments 1015, rail mount 1011, projected reticle beam 1008, lens 1005, and small bodied camera 1001 with infrared capabilities, a water tight lid 1017 to the battery component, an on/off switch for camera sight 1004, reticle selector 1006, and Wi-Fi transmitting module 1002. The viewing angle is depicted by dotted lines 1009.

FIG. 7D is an illustration of an embodiment of camera sight 1000 having a design of a low profile parallax free tube type reflex sight and works similar to the embodiment shown in FIG. 7C, however, this design has an infrared or LED illuminator that has been incorporated into the design of this sight, which means that this sight would not have to work in conjunction with other infrared illuminators to have night viewing abilities but rather would work as a complete unit that works during both day and night conditions, the extra battery capacity located behind the infrared illuminator would be used mainly to supply power to the infrared in that the camera 1001 and Wi-Fi transmitting module are low power devices. The embodiment of FIG. 7D includes a beam intensity control knob 1030, a projected beam angle of infrared illuminator 1031, water tight lid 1017, a battery compartment 1032, reticle selector 1006, camera 1001, and Wi-Fi transmitting module 1002, adjustment members 1015 capable of horizontal and vertical adjustment, machine screws 1014 for fastening the camera sight 1000 to a rail of a weapon.

Referring now to FIGS. 8-14A, an embodiment of a sight device 2000 is shown with an internal mirror of the camera sight system with a sight adjustable camera, which operates in a conventional manner with a front window and lens for capturing a target therein and a rear window and/or lens such that a user and look through the sight device 2000 to locate and aim at a target, as well as a sight adjustable camera positionable behind reticle or cross hairs, the sight device 2000 includes a mirror with a finger pull type switch between front camera lens or window where image initially enters though the window. In operation, this camera is a dual function device to operate between two modes, including a red dot type sight and a digital camera sight. The sight device 2000 is constructed to mounting about a weapons rail 2006, the sight device 2000 includes Wi-Fi transmission abilities that transmits image and sound to either a smart phone, tablet, computer, google eye-type glasses, smart watch, or the like, or alternatively to a separate monitor about the housing 2003 of the sight device 2000. The sight device 2000 includes a viewing window and/or lens 2001 that a user looks through to view the target and surrounding area when the sigh is used in a conventional manner. The front lens 2002 located on the forward looking portion of the sight device 2000 is provided such that the reticle is reflected off of and portion by which the light of image of the target and surrounding area enters through.

The sight device 2000 includes a housing 2003 for containing the components of the sight device 2000, including infrared laser illuminator(s) and/or regular LED infrared illuminator(s). The sight device 2000 includes lens housing 2004 on the front of the infrared laser illuminator(s) and/or regular LED infrared illuminator(s), the lens housing 2004 is rotatable for adjusting the beam projection angle.

The sight device 2000 includes a sight adjustable rail mount 2005 that is configured to secure with a weapons rail 2006 on a weapon. The sight device 2000 includes a lens 2007 on the infrared laser illuminator(s) and/or regular LED infrared illuminator. The sight device 2000 further includes a battery compartment 2008, the battery compartment in communication with a batter lid 2009 for maintaining batteries thereof. The sight device 2000 includes a miniature HD infrared viewing camera 2010 that is either integral to or wired to Wi-Fi transmitting module that transmits both sound and/or image to a smartphone, tablet, computer, google eye type glasses, iWatch, etc. or its own monitor.

The sight device 2000 includes a Wi-Fi transmitting 2011 module being either wired to or integral with a miniature HD infrared viewing camera 2010, the Wi-Fi transmitting module transmits sound and/or image to a smartphone, tablet, computer, computer glasses or watch, etc., or to its stand-alone monitor.

The sight device 2000 includes a battery charging port 2012 for charging the battery of the sight device 2000. The sight device includes a camera lens 2013, the camera lens 2013 is provided with a proper viewing angle to view reflected imagery through the camera lens 2002 at a desired and/or maximum viewing angle.

The sight device 2000 includes reticle control 2014 that doubles to provide a housing for a button battery for reticle control. An on/off switch 2015 is provided about the sight device 2000 for controlling on/off power to the sight device 2000. A button on/off switch 2016 is provided about the sight device 2000 for turning on the camera when compressed by a finger pull 2033, that pulls internal mirror and locks in place at a 45 degree angle to view objects through front window/lens 2002, the button 2016 turns on the device automatically when a mirror 2024 located inside the sight device 2000 is popped or otherwise positioned into place at an angle of 45 degrees in front of camera lens 2013, the button 2016 also automatically turns the sight device 2000 effectively off when the mirror is returned and/or positioned into a position of non-use. When the sight device 2000 is in an off position, the sight device 2000 still operates in a conventional manner when a user looks through the lens thereof. The sight device 2000 includes a switch 2017 that turns the infrared laser illuniator(s) and/or regular LED infrared illuminator between a state of on and off. The sight device 2000 includes an indicator light 2018 that comes on when the internal camera of the sight device 2000 is powered up or turned on. The sight device 2000 includes a lateral sight adjustment 2019, the lateral sight adjustment 2019 located about the rail mount 2005 and housing 2003 would be integral to or part of the rail mount 2005. The sight device 2000 includes a vertical sight adjustment 2020 used to adjust the vertical adjustment of the sight device 2000. Slide 2021 right in a track that is connected to the mirror assembly just in front of mirror 2024, the connection of the slide 2021 with the mirror assembly includes a pivoting joint at a point of connection thereof, and the other side of the slide is connected to or part of the finger pull 2033 that pulls the mirror assembly in and out, popping the mirror assembly into positions of 45 degrees when in use and back to zero degrees in a stored position when the mirror 2024 is not in use. The sight device 2000 includes a seal 2022 located at the point where slide 2021 comes out of part of the slide track inside of the sight housing 2003. The seal 2022 seals moisture from entering the sight housing as well as being integral to the finger pull such that the finger pull is positioned therein for locking mirror 2024 into a position of non-use. Rollers 2023 and/or slides located on all four corners of the mirror ride an internal track inside the housing 2003. The projected reticle beam 2026 shines an image of reticle on the back surface of the front window or lens 2002. The sight device 2000 includes a dotted line 2027 that indicates viewing lines of sight when using the sight device 2000 in conventional manner or as one would use a regular rod dot sight viewing image of a target and surrounding area thorough the rear windows/lens 2001. The lower section of rail mount 2005 that attaches to weapons rail 2006 and acts as a platform that an upper rail mount and rest of sight is sight-adjusted off of. The sight device includes track 2032 that slides/rides in that it operates to facilitate pulling the mirror 2024 between a position of use and non-use as well as turning camera on with button 2016, for switch 2015, when pulled all the way to the right and mirror 2024 is popped into position of service and then turns the camera off when finger pull is pulled in a direction, such as left, and the mirror 2024 is popped into place of non-use inside the housing 2003. A beam intensity control knob 2034 is provided for controlling the beam intensity thereof.

Figure 14C:
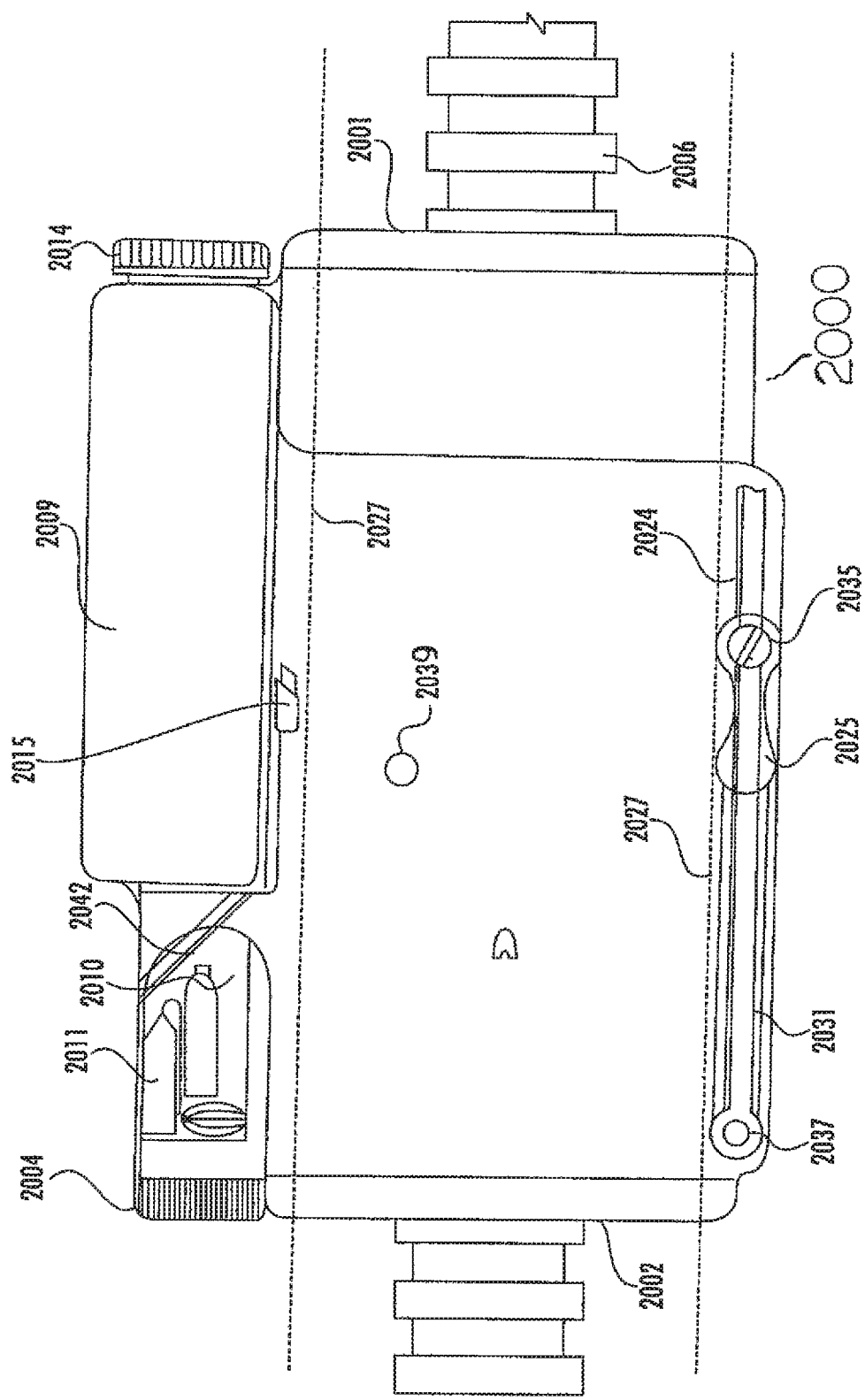
FIG. 14C is an overhead view of camera sight in accordance with the principles of the present embodiment.
Figure 14E:
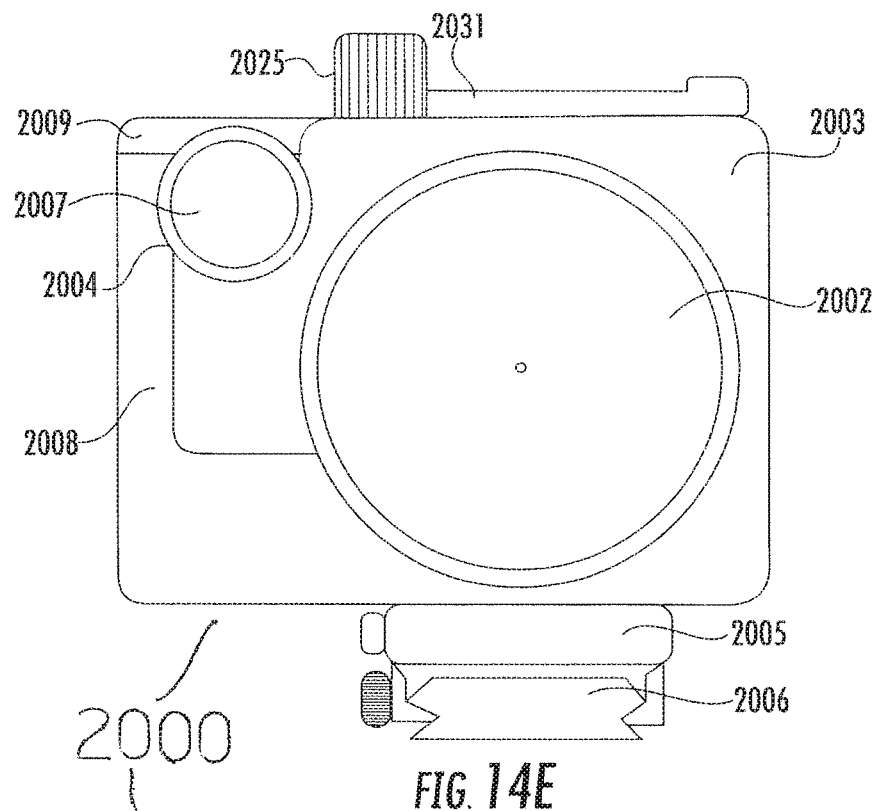
FIG. 14E is a front view of a camera sight in accordance with the principles of the present embodiment.
Figure 14F:
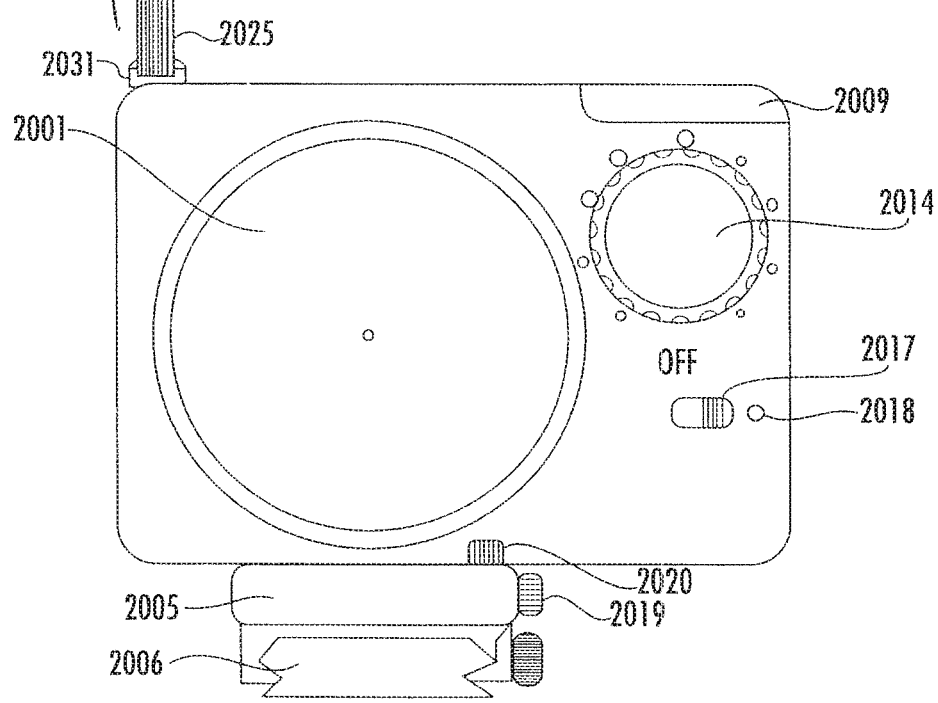
FIG. 14F is a rear view of a camera sight in accordance with the principles of the present embodiment.

Now referring to FIGS. 14B-F an embodiment of a sight device 2000 is shown as if housing of camera sight 2000 was transparent in order to view internal components. With two internal mirrors of the camera sight system. That includes a camera 2010 mounted parallel to sight housing which operates in a conventional manor. With a front window and lens for capturing a target therein, and a rear window such that user can look through the sight device 2000 to locate and aim at target. As well as a sight adjustable camera position able behind reticle or crosshairs, this design of camera sight 2000 has all the basic components and work in the same manner as camera sight 2000 seen in FIGS. 8-14A with one difference. Camera sight 2000 seen in FIGS. 14B-F has two internal mirrors that image entering front window 2002 as indicated by dotted lines 2028, reflects off of to be captured by camera, and in so doing, the image is first reflected off of mirror 2024 the image is reversed. But when the image is reflected off the second mirror 2042 the image is reversed once again back to its original state, or as it would be normally viewed. So that the image wirelessly transmitted to sight screen is viewed as a non-reversed image. Large mirror 2024 in main body of camera sight 2000 that initially capture image received entering into front window 2002 and reflects image to smaller mirror 2042 turns camera sight on much like camera sight 2000 seen in FIGS. 8-14A. By engaging switch 2015, which is simply a momentary switch that is engaged by mirror 2024, when mirror 2024 is clicked into position of use. This is achieved with a spring-loaded ball located in housing of finger pull 2025. Which pops into an indent 2039 located in the proper position of upper housing of camera sight 2000. Mirror assembly pivots on main axle or pin 2037 which is connected to main mirror 2024, which is also an integral part of lever arm 2031. Now referring to FIG. 14c is the overhead view of camera sight 2000 seen as if camera sight housing was transparent. This drawing shows mirror 2024 pulled back over and locked into position of nonuse. With mirror arm 2031 and mirror popped into second indent on top of mirror housing 2038. And in so doing, momentary switch 2015 turns off camera unit, Wi-Fi transmitting module, and camera sight 2000. Camera sight 2000 is used as regular red dot type sight by viewing image of target and surrounding area entering through front window 2002, from rear window 2001, indicated by dotted lines 2027. Now referring to FIG. 14D is and overhead view on camera sight 2000 as if internal mirror 2024 was engaged with arm 2031 and popped into position with spring loaded ball 2035 engaging switch 2015. Seen in FIG. 14B, 7003 is infra-red illuminator. Now referring to FIG. 14E is front view of camera sight 2000, 2025 is the handle that houses spring loaded ball 2015, not seen in FIG. 14E, which engages large mirror 2024 and camera 2010, not seen in FIG. 14E, in camera sight 2000 into positions of use and nonuse. Now referring to FIG. 14F is rear view of camera sight 2000, 2001 is window where target image is received by user when large mirror 2024, seen in FIG. 14C, is locked into position of nonuse and camera sight is being used in conventional manner. Handle 2025 on mirror arm 2031 is popped into position of nonuse.

Referring now to FIGS. 15-20, an embodiment of a scope 3000 works in conjunction with an existing target viewing device, including high powered scopes, red dot sights, holographic sights, or even iron sights.

Figure 15:
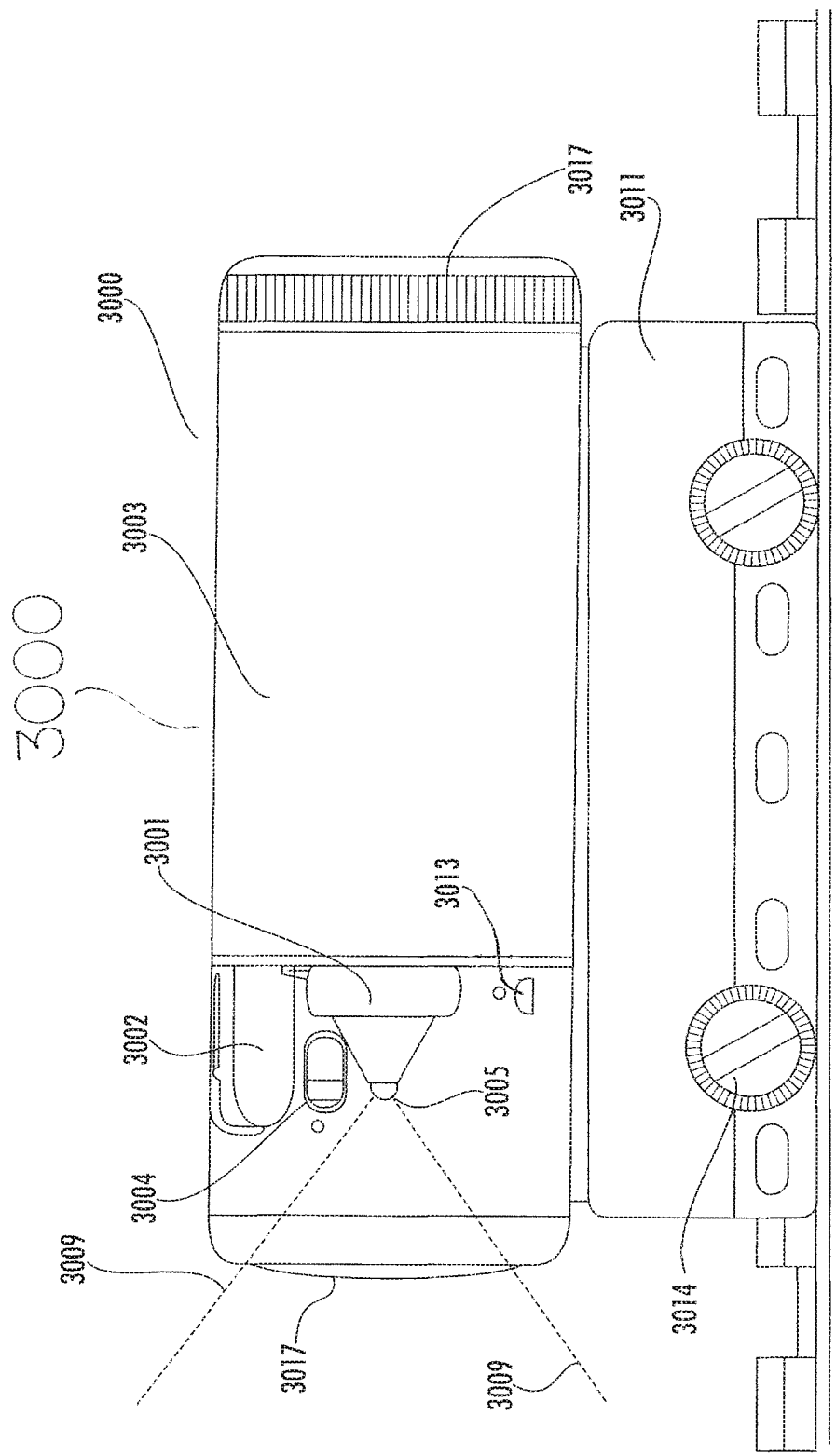
FIG. 15 is a drawing of a sight for capturing imagery in accordance with the principles of the present embodiment.

FIG. 15 includes a sight 3000 with an HD infrared viewing camera 3001, a lens 3005 for the infrared viewing camera 3001, a separate Wi-Fi transmitting module, a front window 3007 where an image is received to the camera 3001 from target viewing device, a charging port 3013 for recharging batteries, lid 3017 to remove and recharge separately or replace spent batteries, non-sight adjustable rail mount 3011, and thumb screws 3014 used to fasten sight 3000 to a rail of a weapon. Other rail fastening systems are within the spirit and scope of the instant invention.

Referring to FIG. 16, an embodiment of the sighting 3000 is shown with a base assembly having an adjustable height for adjusting to different heights to set the sighting device at a particular vantage point. In operation, the embodiment shown in FIG. 16 is beneficial for adjusting to different heights behind an existing sight, such as a hard sight, red dot sight, scope, laser sight, or the like. The base 3012 mounts to a rail system of a weapon. The base 3012 includes an upper platform 3011. The upper platform made optionally be formed at any starting height at or above the base 3012. A plurality of lifting arms 3030 are secured in pivoting and/or scissor like relation between the sighting device 3000 and/or the upper platform 3011 and one or more rod receiving members 3032 for facilitating the lifting and lowering of the sighting device 3000 about the base 3012. A threaded rod 3037 is disposed having a combination of right and left handed threads such that when the rod is caused to turn clockwise, the sighting device 3000 moves in a first direction and when the rod is turned counter clockwise, the sighting device 3000 moves in a second direction. A ribbed disc 3036 is provided that in one non-limiting embodiment is integral to the threaded rod 3037. A small chamber 3036 is further provided having a small steel ball with a spring that is tensioned behind it such that it forces the spring 3034 into the ribbed disc 3036 for maintaining tight adjustments. The threaded rod 3037 includes a head 3040 that may be turned via a user's fingers or alternatively via a tool such as a screwdriver or Allen wrench.

Referring now to FIG. 16B is a cross-sectional view taken along the line B-B of FIG. 16A, the embodiment depicting the plurality of lifting arms 3030 being secured between the upper platform 3011 and the rod receiving members 3032.

Figure 17:
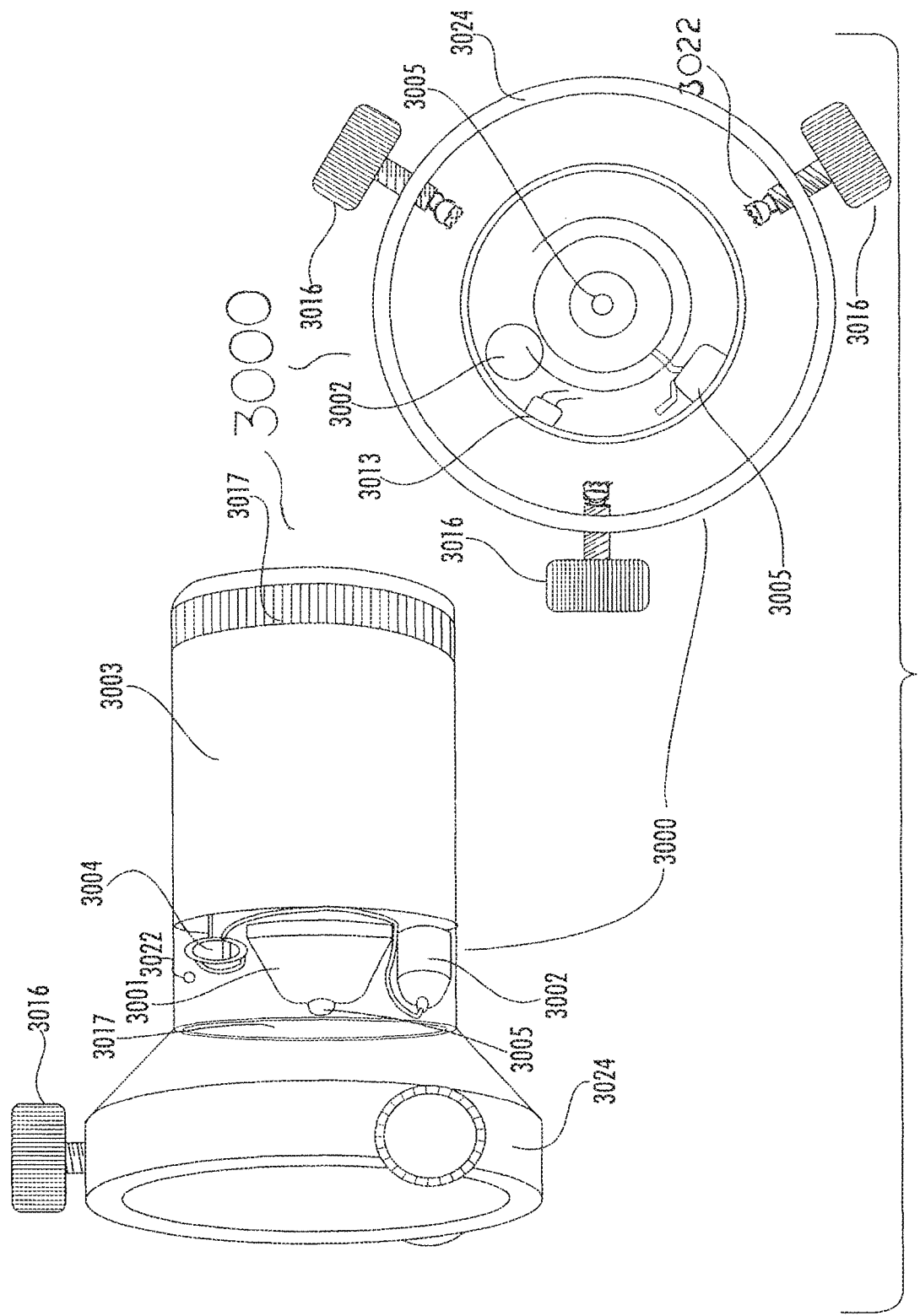
FIG. 17 is an illustration of a camera sight in accordance with the principles of the present embodiment.
Figure 18:
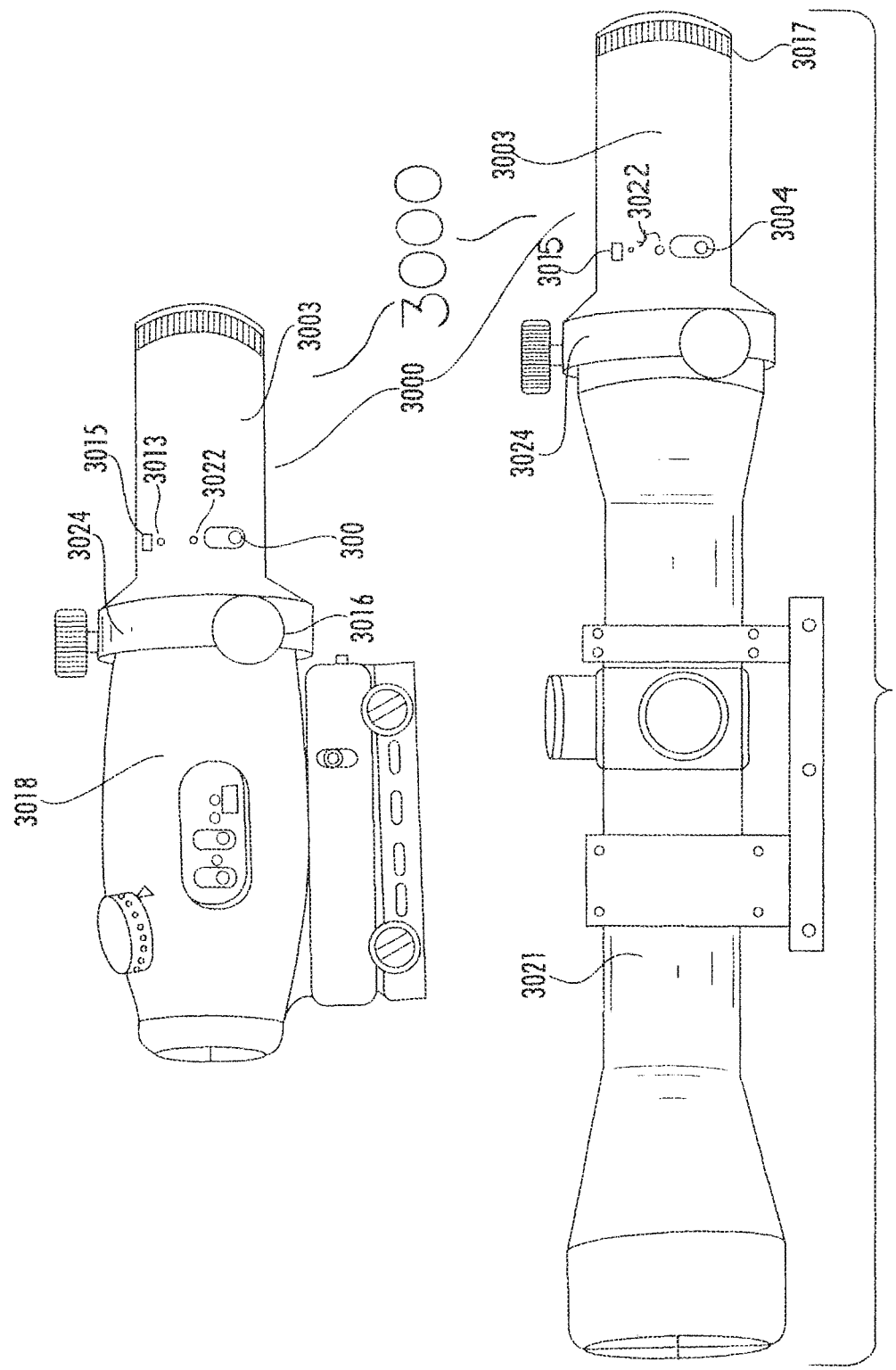
FIG. 18 is an illustration of a camera sight in accordance with the principles of the present embodiment.

Referring now to FIGS. 17-18, a scope attachment 3000 is shown. In FIG. 17, the scope attachment 3000 includes a body 3003, the body 3003 includes a front portion 3024, and the front portion 3024 includes a plurality of securement members 3016, such as thumbscrews. The thumbscrews 3016 are adjustably screwed for clamping with a scope, as illustrated by FIG. 18.

Referring to FIG. 18, the body 3003 (otherwise the housing) is provided with a plurality of thumbscrews 3016 passing through the body 3003 for clamping down against the viewing side of a target viewing device 3021 and 3018. These thumb screws 3016 include a small pad with rotatable joint 3022 to aid in securing target viewing device attachment 3000 to sight, scope or the like.

Now referring to FIG. 17, the body 3003 maintains a central camera lens 3005 constructed and arranged to provide video feedback with wireless transmission to a smart device, the wireless transmission may include Wi-Fi transmission via a Wi-Fi module either built inside the camera or mounted separately inside the body 3003.

Referring to FIG. a target viewing device attachment 3000 has an internal small HD infrared viewing camera with Wi-Fi transmitting module provided for attachment about a scope 3021, red dot sight 3018, or other target viewing device is provided, the target viewing device attachment 3000 optionally used in conjunction with infrared illuminators mounted separately on firearm rail system to provide night vision abilities to target viewing device, such as red dot sights and scopes, that target viewing device attachment 3000 is secured to and receiving image from and is removed from target viewing device via tightening or loosening the thumb screws 3016.

Referring now to FIG. 18, an embodiment of the scope attachment 3000 is shown secured about a hunting scope 3012 and a red dot sight 3018. The red dot sight or scope attachment 3000 in this embodiment includes a battery door 3017 access point for replacing the units batteries, thumbscrews for mounting 3016, and switch indication light 3022, and an on/off switch 3004 for controlling power to the unit, a charging indication light 3013, and a charging port 3015. Other shapes and physical configurations of the housing 3003 and attachment may be implemented within the spirit and scope of the instant invention.

Figure 19:
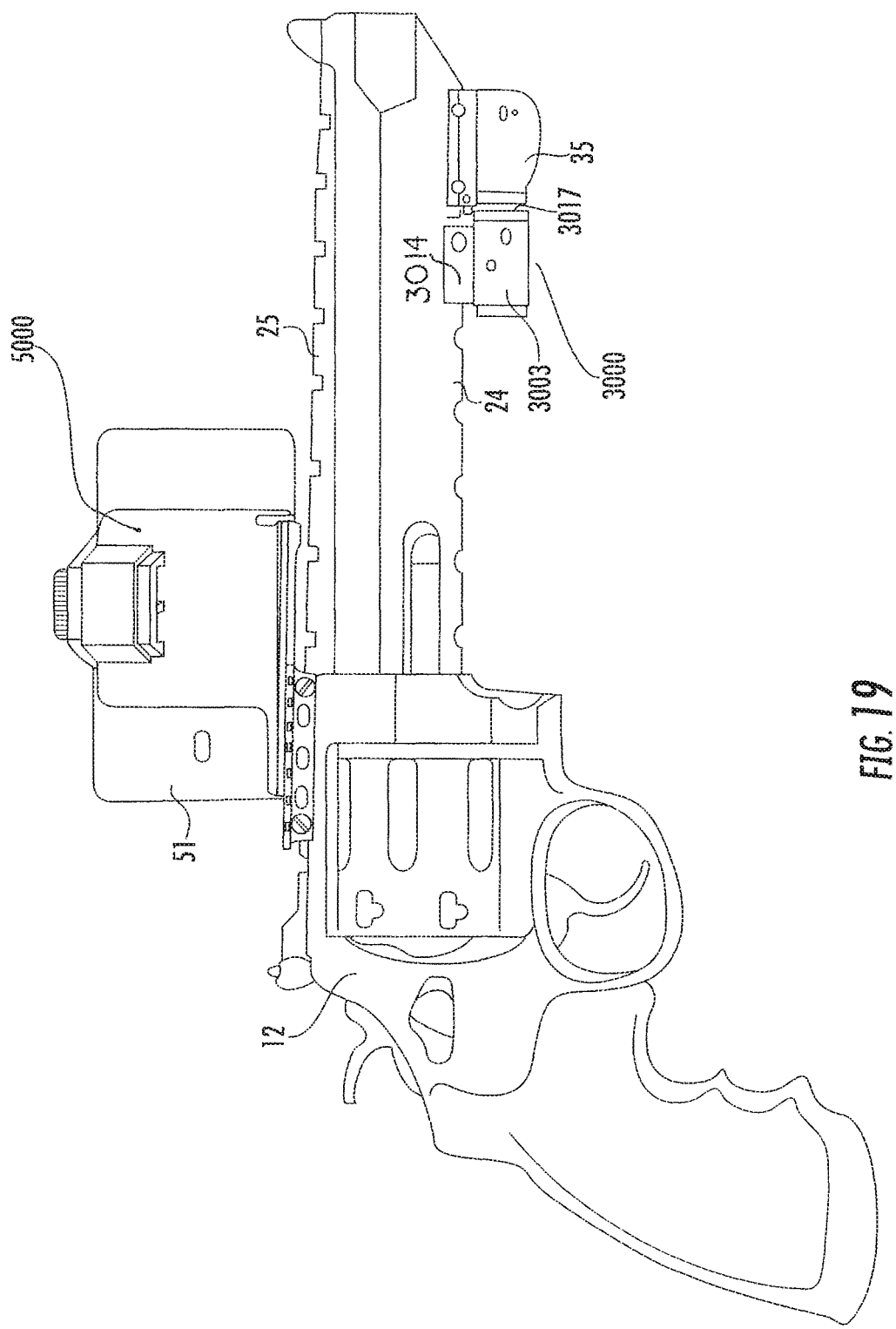
FIG. 19 is an illustration of a camera sight in accordance with the principles of the present embodiment.

Referring to FIG. 19, a target viewing device 3000 is mounted on a bottom rail of pistol 12, with target viewing device 3000 mounted on lower rail 24 of pistol 12 with target viewing device 3000 mounted on lower rail 24 of pistol 12, and viewing target and surround area of image provided by red dot type sight 35, that target viewing device 3000 is working in conjunction with the pistol 12, in this illustration an upper mounting rail 25 where rotatable smart phone mount 5000 is mounted with smart phone 51 which would be used as sight screen for target viewing device 3000 with smart phone mount 5000 rotated around and locked into viewing position of approximately 90 degrees to left side of pistol 12, as if user was locating and/or firing on targets after positioning himself behind a wall or other bullet proof structure from off to the left side of firearm. Rail mount 3014 attaches target viewing device 30000 to lower rail 24 of firearm. Forward window 3017 where image of target surrounding area enters target viewing device 3000. Housing 3003 of the target viewing device 3000 is integral to an upper section of rail mount that houses components of target viewing device 3000, such as camera, Wi-Fi transmitting module, batteries, all switches, etc. The weapon 12 optionally includes an upper rail 24 and lower rail 25.

Figure 20:
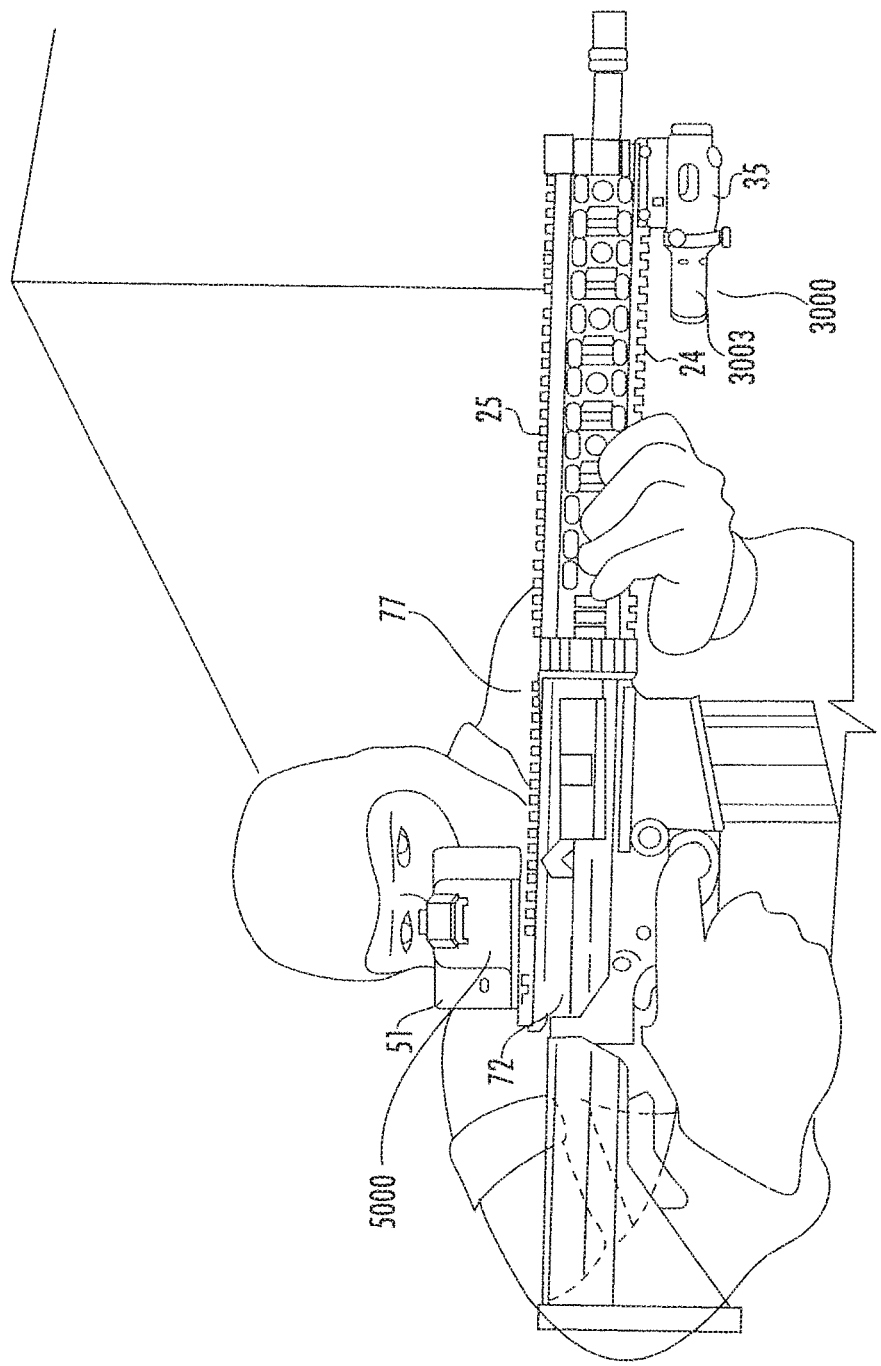
FIG. 20 is an illustration of a camera sight in accordance with the principles of the present embodiment.

FIG. 20 is an illustration of user 77, using an embodiment of target viewing device 3000, mechanically fastened to the back of red dot sight 35 to view image of target and surrounding area supplied to target viewing device 3000 by red dot type sight 35 to accurately pinpoint and fire on targets from safe, secure position such as from behind wall or building with target viewing device 3000 mounted on lower rail 24 of riffle 72, user 77 viewing image of targets and surrounding area transmitted from target viewing device 3000 to smart phone 51, which is mounted in rotating rail mount 5000 and rotated and locked into position approximately 90 degrees to firearm, and smart phone 51 being used as sight screen with image of target and surrounding area provided by target viewing device 3000. The rotatable smart phone mount 5000 attaches to an upper rail 25. The target viewing device mechanically fastened to red dot type sight 35. Target viewing device housing 3003 houses internal components including a camera, Wi-Fi transmitting module, batteries, switch, indicator light, etc.

Figure 21:
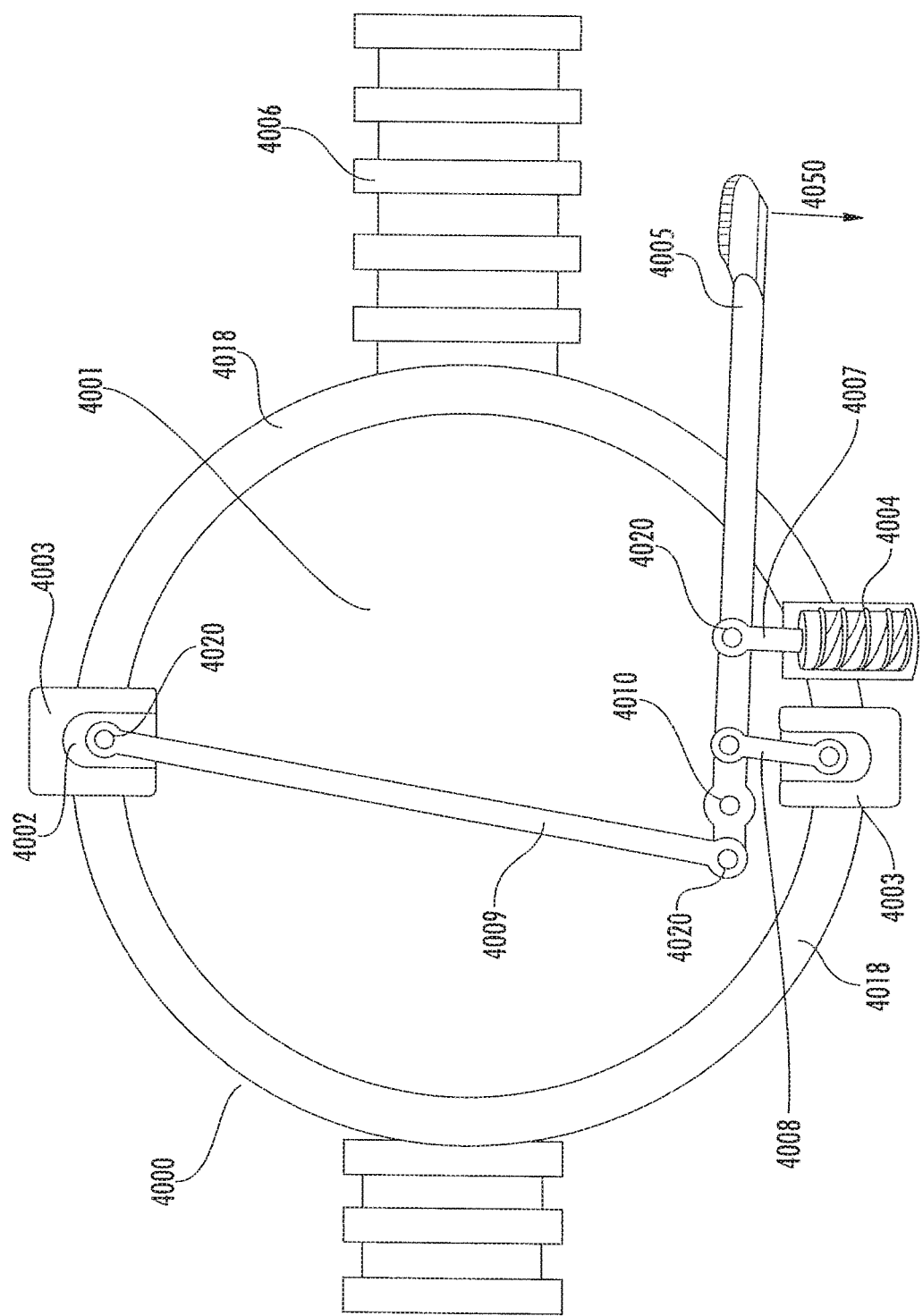
FIG. 21 is an overhead view of a rotatable rail mount in accordance with the principles of the present embodiment.

FIG. 21 is an illustration an overhead view of sight adjustable and rotatable rail mount 4000 includes a top disc or plate 4001 of rail mount 4000. The top plate 4001 is a rotatable platform for camera sights as an integral part of a camera sight. The bottom surface of this top plate or disc 4001 is rotatably coupled to the top surface plate 4014 seen in FIG. 22 by means of a post or mechanical fastener, the post would extend from bottom center of top plate 4001 through the center of bottom plate 4014 secured by means of a spring washer, C clip, or the like. Top disc 4001 would be top disc's point of rotation between sight adjustable rail mount and camera sight as an integral part of top plate 4001.

The plates 4001 would be made as an integral part of camera sight housing and lower plate 4014 formed as part of the sight adjustable rail mount 4013. The two plates 4001, 4014 lock solidly together, both in positions with camera sight parallel to the weapon's rail on firearm, where camera sight would be in sighted-in position on firearm, as well as being locked into various angles up to 360 degrees of rotation on a horizontal plane, the camera sight can be rotated back and solidly locked back into its original sighted-in position parallel to weapons rail on firearm.

Figure 28:
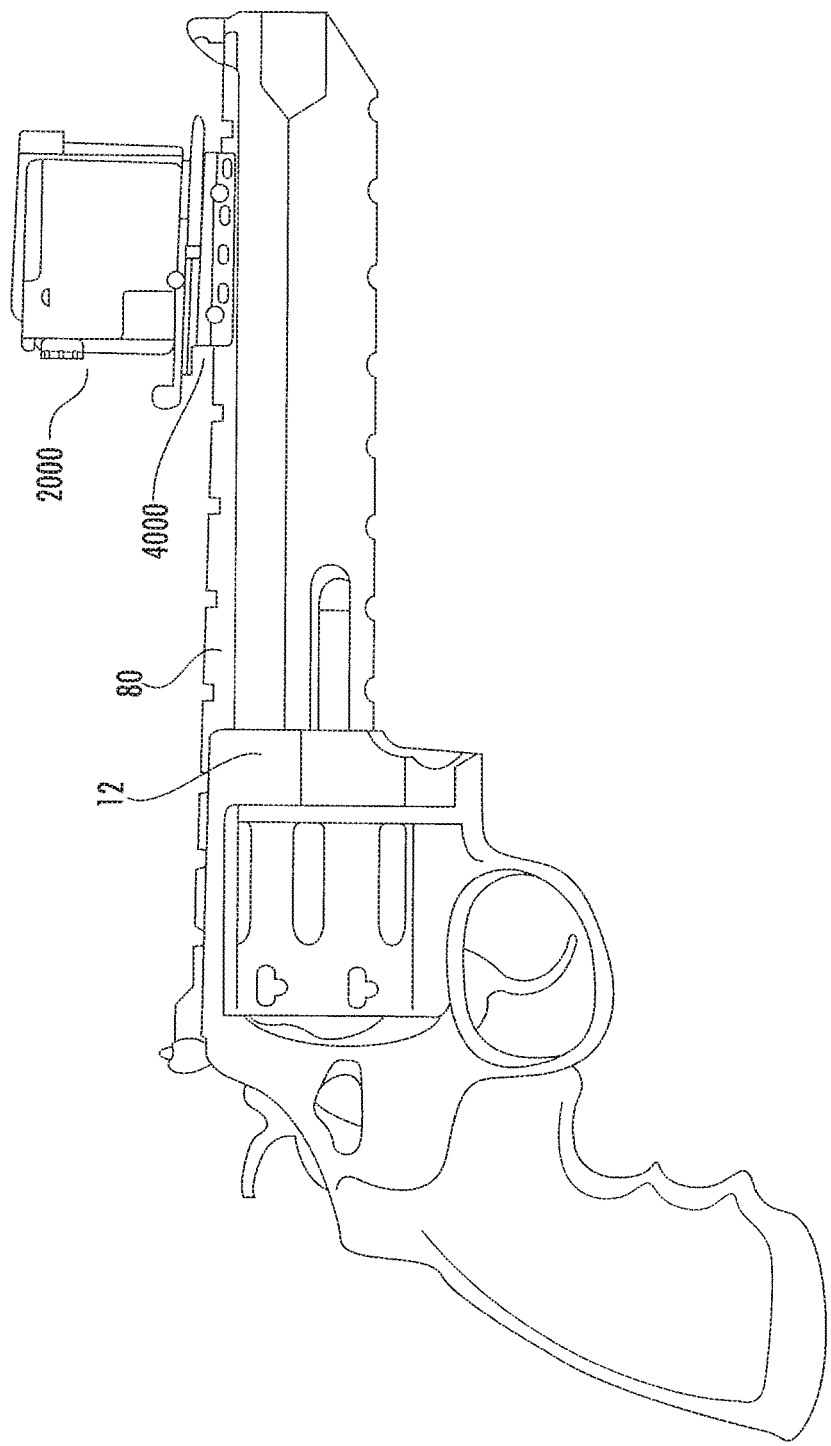
FIG. 28 is a sight adjustable and rotatable rail mount in accordance with the principles of the present embodiment.

As exemplified by the combination of FIGS. 28 and 29, as well as FIGS. 30 and 31, the two plates 4001, 4014 are solidly and precisely locked together by means of a spring tension sliding jaws 4002. The two clamps (or jaws) slide in and out of a clamped and unclamped positions inside housing 4003, as an integral part of 4001, which locks upper disc 4001, and further explained by the descriptions and FIGS. 23-25.

Referring back to FIG. 21, a mechanism for engaging and releasing spring loaded clamps such that the camera sight (not shown in this illustration) would be made an integral part of top rotatable plate 4001, which can be rotated and locked in various angles or positions of use of 360 degrees on a horizontal plane. Tension to these sliding clamps are released by applying pressure to a handle portion of lever 4005 in direction of arrow 4050 such that when lever 4005 is pushed, the lever 4005 completes three actions. The actions include first compression of the spring in spring housing 4004 such that the spring maintains pressure to clamps 4002 and connecting rods 4008, the action further includes opening the clamp beside spring housing 4004 and connecting rod 4009, which opens sliding clamp on an opposite side of rotatable rail mount. The connecting rod 4009 passes through a channel underneath camera sight housing (not shown).

The action allows a camera sight (not shown), as an integral part of top plate 4001 to rotate so that camera sight can be set at a desired angle of use. Then when pressure is released from handle on lever 4004 tension from spring located inside spring housing 4004 re-applies tension to sliding clamps 4002, which would maintain a camera sight in a desired angle of use with the clamps applying pressure to the outside fascia part of lower disc 4014, seen in FIG. 22, but not solidly locked into various angles of use or solidly locked back into sighted-in position parallel to weapons rail until camera sight is slightly rotated clockwise or counter-clockwise until sliding clamps pop into a locked position.

Figure 23:
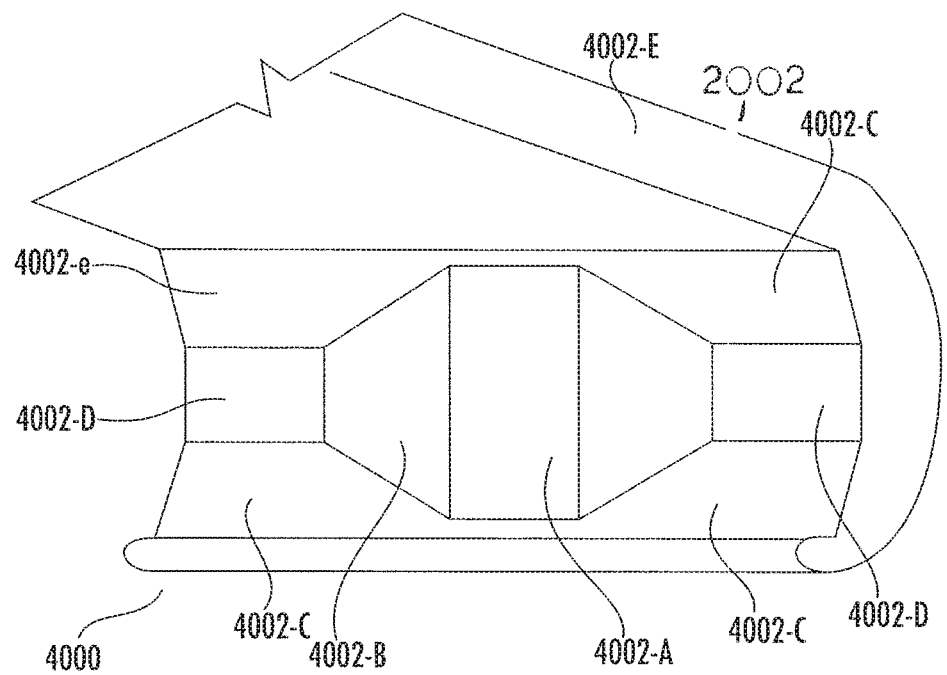
FIG. 23 is a view of an inside configuration of one of the sliding jaws in accordance with the principles of the present embodiment.
Figure 24:
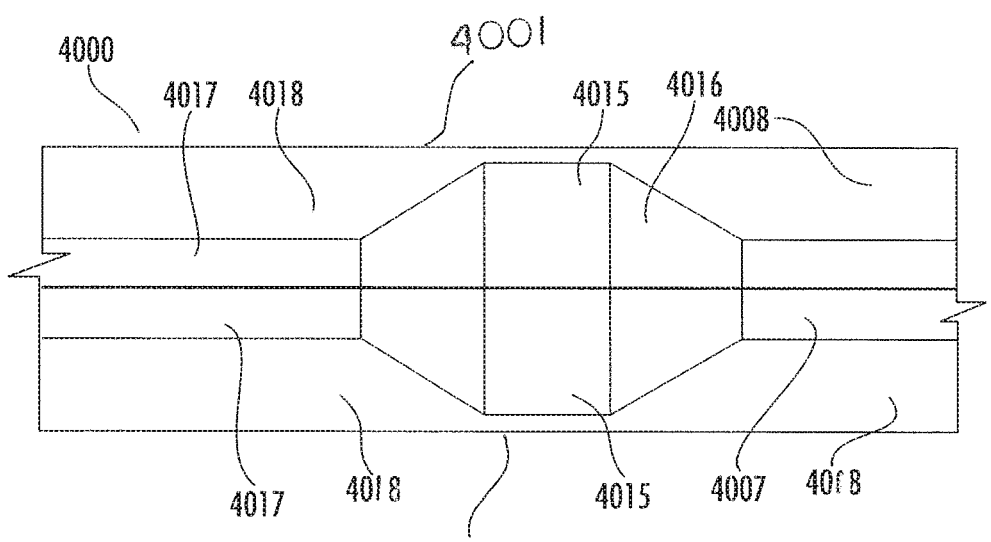
FIG. 24 is an inside view two plates rotatably coupled for locking together with a sliding jaw in accordance with the principles of the present embodiment.

This embodiment will be further understood as far as this mechanism and its operation when looked at in conjunction with FIGS. 23-25.

Figure 22:
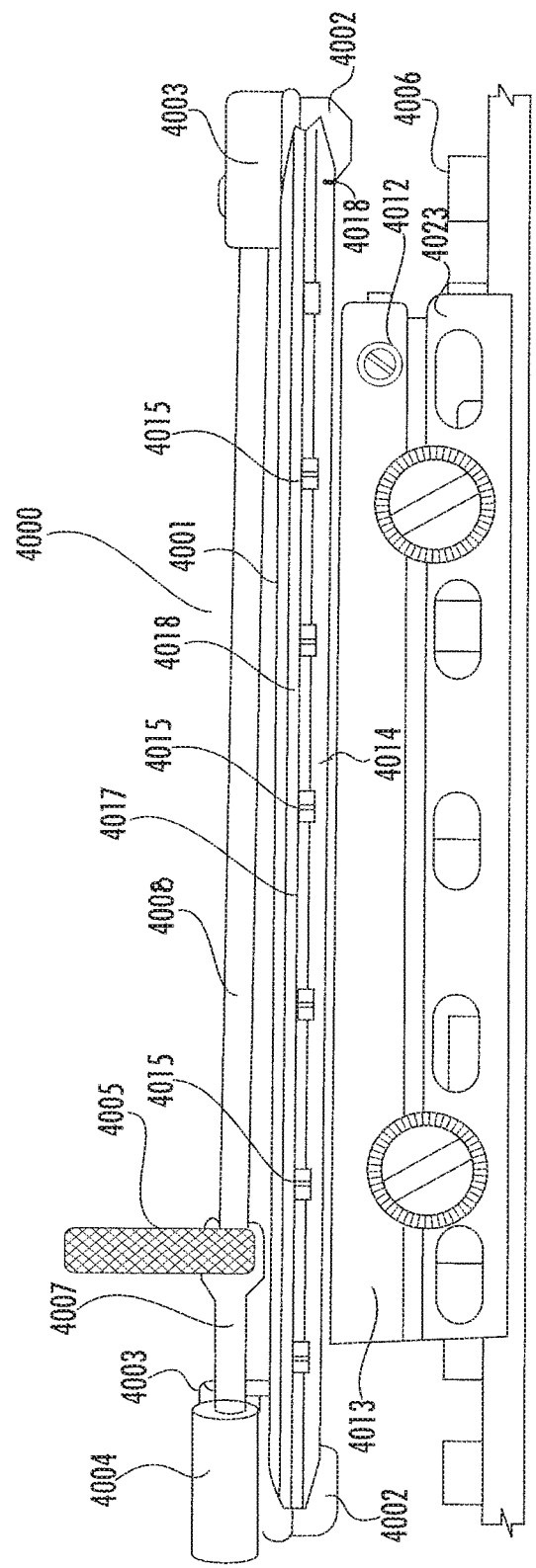
FIG. 22 is a side view of a sight adjustable rotatable rail mount in accordance with the principles of the present embodiment.

FIG. 22 illustrates a side view of sight adjustable and rotatable rail mount, cut out portions 4014 in the fascia section on outer perimeter of lower plate 4014. The cut out sections lineup two other cut out sections that are located one under each other of sliding jaws 4002, the cut out portions 4014 of two plates 4015 line up together, the raised section makes up a male shape locking the plates 4015 together when pressure is applied to the jaws with one or more springs located in housing 4004, thereby locking the two plates 4015 in a position from rotation, further illustrated and explained in FIGS. 24-26.

A mitered with bottom outside perimeter 4018 of bottom pate 4014 and a top mitered outside perimeter of plate 4001 made as an integral part of the camera sight housing. The mitered outside edges of both top and bottom plates are tightly compressed together as mitered inside surface of sliding jaw is pulled tightly into them with pressure applied by a spring in spring loaded housing 4004, as further illustrated by FIGS. 23-25.

Vertical and lateral sight adjustment member 4012 on the sight adjustable rotatable rail mount for adjustment. The vertical and lateral sight adjustments are made by turning the members 4012 in either of clock-wise or counter-clockwise fashion.

The upper section 4013 of the sight adjustable rail mount made as an integral part of lower plate 4014 that upper plate 4001 would rotate and lock into various angles of use.

The lower section 4023 of rotating sight adjustable rail mount attaches to a weapons rail 4006 and serves as the platform that upper section 4013 of rail mount 4103 makes sight adjustments off of.

FIG. 24 illustrations two of the cut out (or recessed) sections 4015 located in outer perimeters of upper and lower plates 4001 and 4014, with one half cut out of top disc 4001. There are only two of these cut out areas in the top disc 4001, with one located under each sliding clamp 4002. The other half of the cut out areas is located in lower plate that is integral to the upper section of the sight adjustable rail mount 4013, and these cut outs 4015 in lower plate 4014 are located around perimeters of plate in multiple positions to lock camera sight into various angles of use. Tampered sides in cut outs in plates and tapered sides on raised section inside sliding clamps locks plates in an exact position where rail mount was originally sighted in that every time the camera sight is rotated back into position parallel to fire arm. Tapered sliding jaw is designed in a way that locks palates solidly together to ensure plats are solidly locked together back into original sighted position. Cut out sections 4015 in fascia section of lower plate 4014, these cut out sections line up with two cut out sections 4015 and 4016, one under each of sliding jaws 2, as the cut out sections of the two plates 4015, 4016 line up together, the raised section 4002A and 4002B located on the inside of siding jaw or clamp makes up the exact male shape of these cut out sections in upper and lower plates so they lock back together when pressure is applied to jaws with springs located in housing 4, which locks the plates 4015, 4016 together in the exact position of rotation.

The mitered sides 4016 of the cut out portions inside upper and lower plates 4015, 4016 raised area on sides of raised area on sliding jaw slide and lock into when camera sight is locked into various positions or angles of rotation, as well as when locked back into sighted position parallel to weapons rail; these mitered (or tapered) sides on sliding jaw 2002 perfectly align both upper and lower plate, seen in FIG. 24, together as they slide and lock into tapered cut out areas in upper and lower plate.

Flat fascia section 4017 on outside edges of plates. The flat section 4017 on upper plate could extend out past outside edge of bottom plate and then extend down to the bottom edge of the fascia section on outside perimeter of lower plate to create a dust cover between plates, such that the mitered area on top plate need be only located under sliding jaw 2, or area inside housing of sliding jaw 3. The alternate design of upper rotating plate is illustrated in FIG. 25B.

Mitered edges of top and bottom plates 4018, the outer edges of the plates are mitered at the same angle as the mitered inside upper and lower surfaces of sliding jaw so that when the sliding jaws are pulled tight into upper and lower plates, the mitered inside surfaces of inside surfaces of sliding jaw slide over mitered sections upper and lower plates, compressing plates solidly together.

FIG. 23 illustrates an inside view of sliding jaw that locks both upper and lower plates together. Tapered areas 4002C lock upper and lower plates solidly together when spring pulls sliding jaws in tight to plates. Flat areas, 2A slide on fascia or flat area on outside perimeter of flat fascia section 4017 so that the sight is held into a position or angle of rotation between notches in lower plate 4014 where rail mount solidly locks into various angles of rotation but by rotating sight clockwise or counter clockwise, raised area on sliding jaw or clamp, area 2A and area 2B pop into next cut out area 2015, locking plates solidly together such that the camera sight remains sighted when camera sight is rotated back into position parallel to rail mount. Number 2E is the top part of sliding jaw 4002 that rides in track and housing 4003. The bottom side 4002 E rides or slides on top of top plate 4001.

Figure 25A:
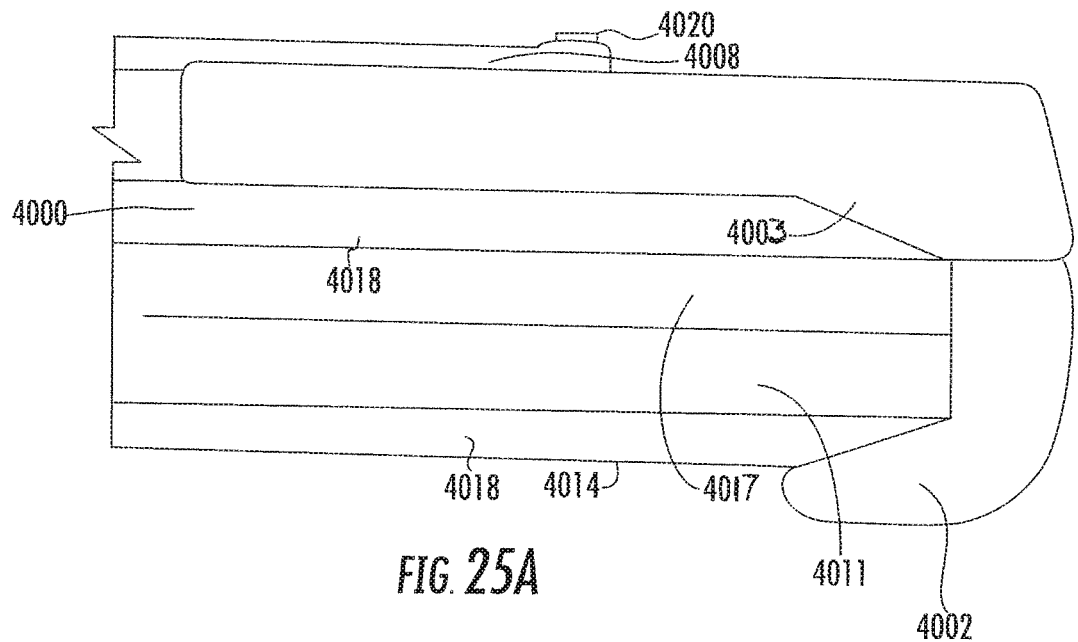
FIG. 25A is a side view of a sliding jaw in accordance with the principles of the present embodiment.
Figure 25B:
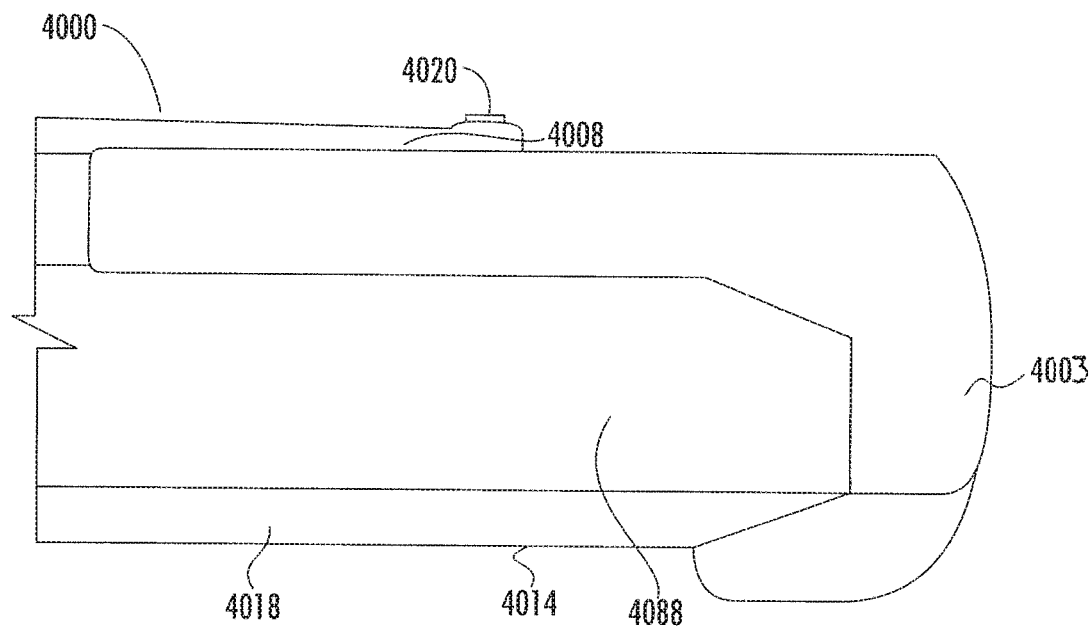
FIG. 25B is a side view of a sliding jaw in accordance with the principles of the present embodiment.

FIG. 25A is a side view of sliding jaw 4002, or clamp locking upper plate 4001 and lower plate solidly together, solidly together as mitered upper and lower inside surfaces of jaw 4001 slide tight on outer mitered edges of upper and lower plates 4001 and 4014. Number 4004 is outer housing of sliding jaw which also acts as a track for sliding jaw and track or housing, for sliding jaw or clamp as part of top plate disc 4001.

FIG. 25B is similar in design to FIG. 25A, however, the top plate 4001 and the clamp housing and track 4004 would be extended slightly out and over and down to the bottom of the fascia or outer flat edge of lower plate creating a cover over ends of upper and lower plates for keeping out moisture and debris.

Figure 26:
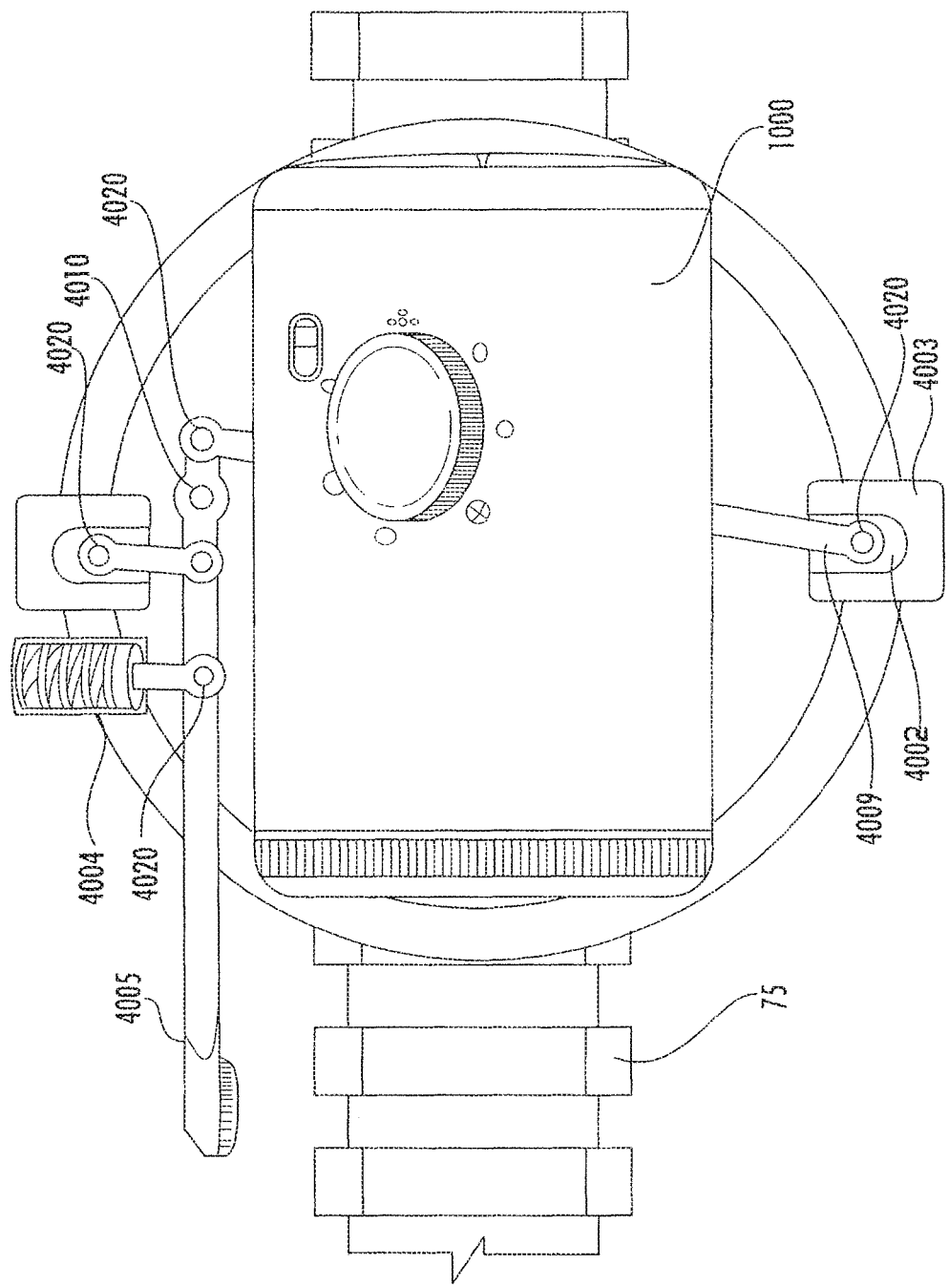
FIG. 26 is an overhead view of a sight adjustable and rotatable rail mount in accordance with the principles of the present embodiment.

FIG. 26 is an overhead view of sight adjustable and rotatable rail mount 4000 with infrared viewing camera sight 1000 as an integral part of top plate of sight adjustable and rotatable rail mount 4000 with rail mount 4000 locked into position parallel to weapons rail with infrared viewing camera sight 1000 locked into sighted position.

Figure 27:
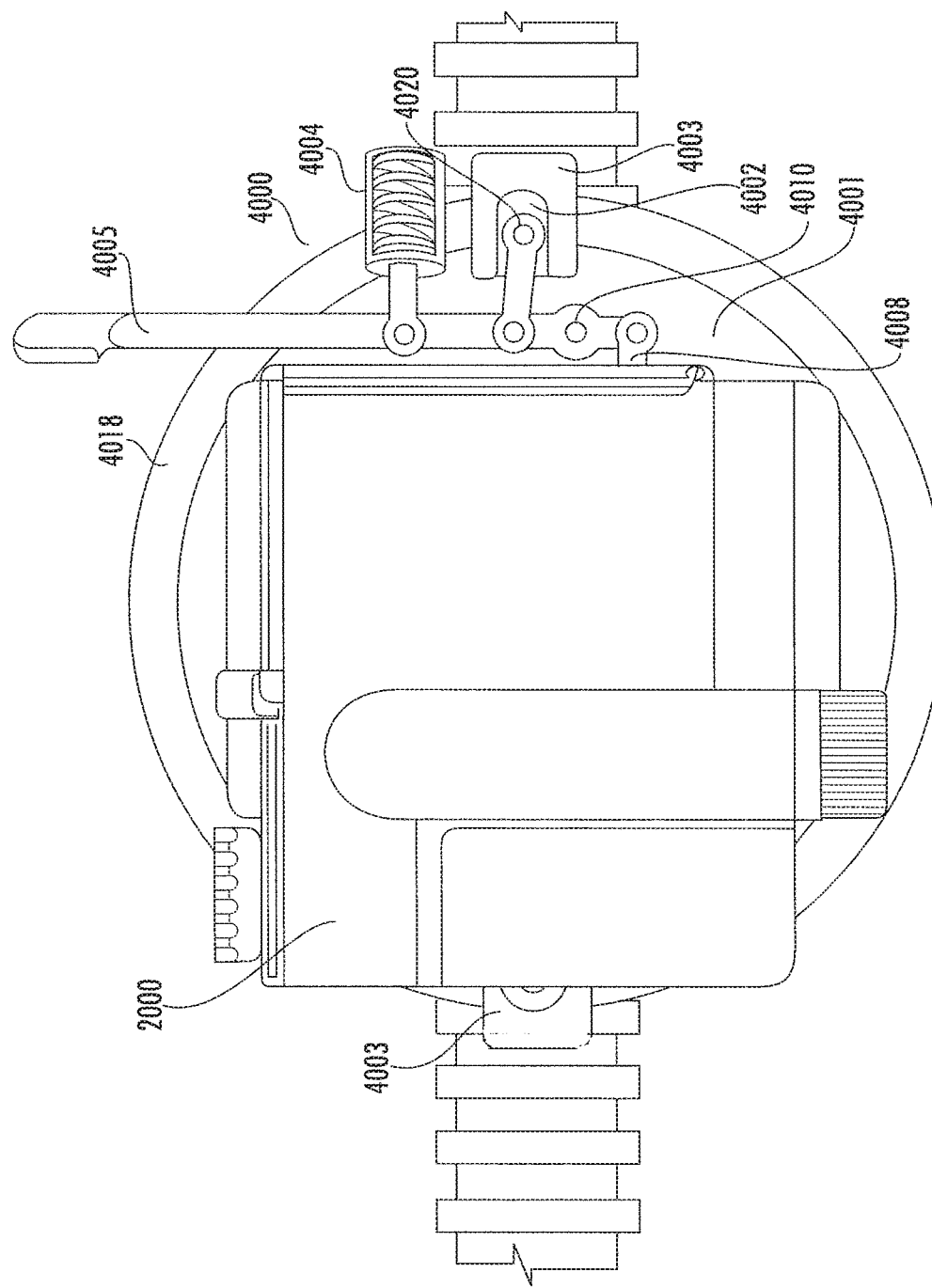
FIG. 27 is a top view of a sight adjustable and rotatable rail mount in accordance with the principles of the present embodiment.

FIG. 27 is an top view of sight adjustable and rotatable rail mount 4000 with infrared illuminator that has an internal mirror that functions both as a regular red dot type sight as well as an infrared view viewing camera sight made as an integral part of sight adjustable and rotatable rail mount 4000 with rail mount 4000 rotated and locked into a position 90 degrees to the weapon which is one of the positions that rail mount 4000 would be locking into to do surveillance work or to scan an area for hostile combatants by just extending end or forward section of forearm with rail mount 4000 with camera sight that is rotated and locked into position to acquire best vantage point of area and viewing entire area and potential targets without exposing a user to danger.

FIG. 28 is illustration showing sight adjustable and rotatable rail mount 4000 with camera sight 2000 made as an integral part of rail mount and mounted on top rail 80 of pistol 12.

FIG. 29 is an illustration of rail mount 4000 with camera sight 2000 mounted on top rail and rotated around and locked into a position to view an image of targets and surround area transmitted from camera sight 2000 on hand held smart phone or other smart device.

FIG. 30 illustrates a user 77 using rail mount 4000 with camera sight 2000 with rail mount 5000, having a phone 51 rotatably mounted on rotatable smart phone mount 5000.

Referring to FIG. 31, another embodiment of the camera sight system would be rotatable smart phone mount 5000 which consists of a rotatable smart phone mount that is designed in two designs, one that mounts on top rail of firearm and another design that is mounted on the side rail of firearm. The design of this mount that mounts on the top weapon's rail is also illustrated in two designs, the first of which rotates and locks into various positions of use up to 90 degrees to each side of firearm, or in other words, up to 180 degrees, and the other design of this smart phone mount rotates and locks into various positions of use at a full 360 degrees to allow targets to be viewed from basically any position that user would place himself in relation to firearm and both of these designs of this smart phone mount that attaches to top rail of firearm will easily be understood in the descriptions and illustrations of this smart phone mount.

This rail mount would also be made in a design that would mount to the side rail on firearm and rotate up to 90 degrees on each side of firearm. Both designs of these rail mounts work in conjunction with all of the various embodiments of these camera sights so in other words, when using any of the designs of this rotating smart phone mount in conjunction with various embodiments of these camera sights, this allows user to view targets and surrounding area using smart phone as target viewing screen from any position user would place himself in relation to firearm. So for instance after target is acquired with camera sight or camera sight on rotatable camera sight mount, camera sight is simply rotated and locked back in to sighted in position parallel to weapon rail, user simply pulls finger pull on rotating smart phone mount and rotates smart phone around to desired angle of use and simply holds firearm around corner allowing user to accurately fire on targets with targets being viewed in the center of smart phone screen behind reticle with a clear view of surrounding area and other targets of potential danger while doing so.

FIG. 31 illustrates a user 77 firing on a target using a smart phone mounted in a rotatable smart phone mount 5000 as sight screen, viewing target and surrounding area transmitted to smart phone by camera sight 1000, with rail mount 4000 rotated back around to a position of parallel to firearm and locked into sighted position on bottom rail of firearm 76. Referring now to FIG. 31, a backside view of a rotatable smart phone rail mount device 5000 for maintaining a smartphone 51 about an upper weapons rail 25 of a firearm is shown. The rail mount device 5000 releasably secures to the weapons rail 25 of a firearm via a rail mount type assemblage 5146 which acts as a platform for rotatable smart phone mount 5000. The rail mount device 5000 includes a platform 5146 and the bottom part of this platform 5146 releasably mounts to weapons rail 25. The platform 5146 includes a plurality of notches 5148. An upper base 5154 is rotatably secured about the platform 5146. A latch housing 5150 is provided about the upper base 5154 for maintaining at least a portion of the finger pull latch 5152 thereof. The finger pull latch 5152 configured to lock into any of the plurality of notches 5148 for maintaining the upper base 5154 in a rotated position about the platform 5146 operatively positioning a smartphone 51 display in a particular rotated position about a firearm. A tensioning member 5156 is disposed about the upper base 5154 for retaining a smartphone 51 about the upper base 5154. The tensioning member 5156 provided with a tensioning knob 5158 for rotatably securing the smartphone 51 about the upper base 5154 thereof.

Figure 32:
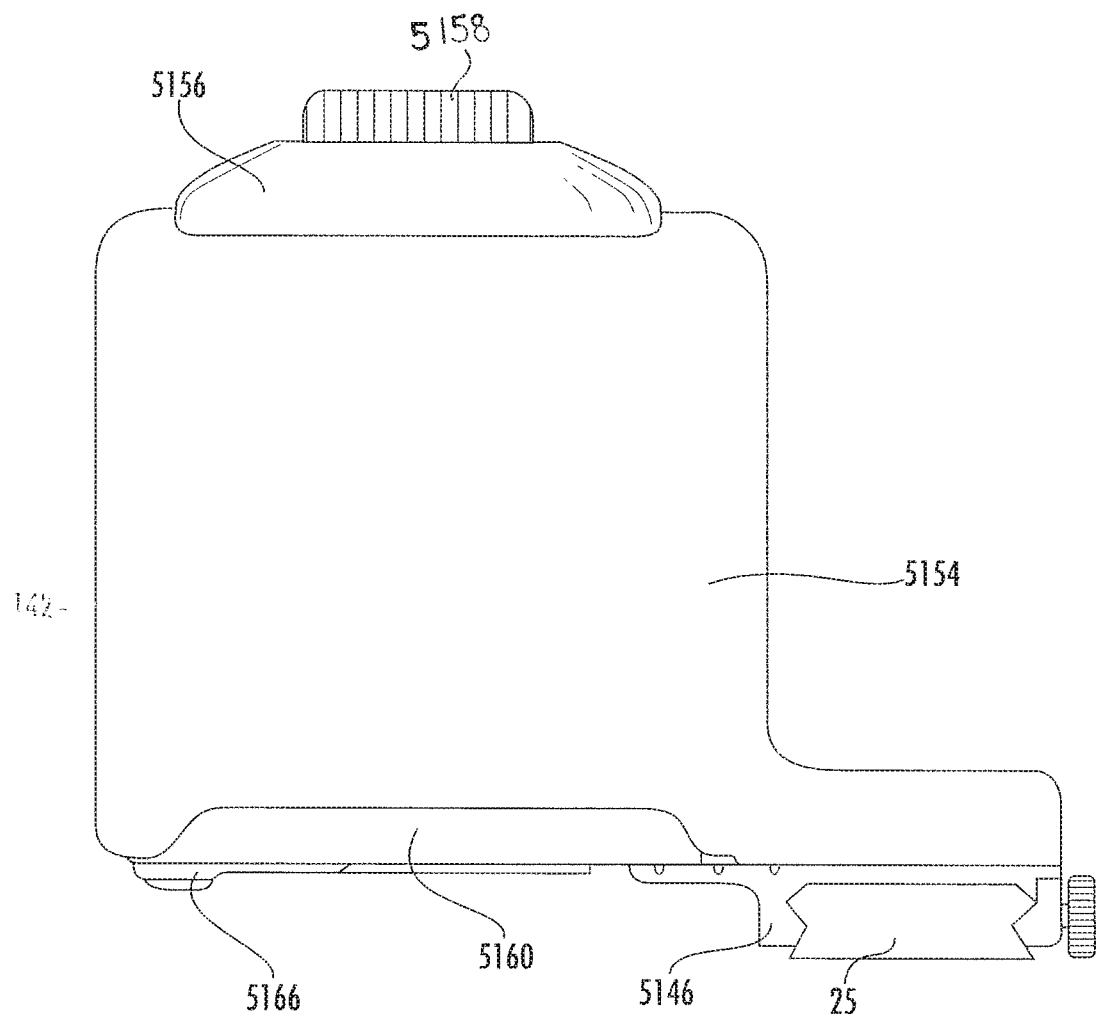
FIG. 32 is a front side view of a rotatable smart phone rail in accordance with the principles of the present embodiment.

Referring now to FIG. 32, a front side view of a rotatable smart phone rail mount device 5000 for maintaining a smartphone 51 (not shown in FIG. 32) about a rail 25 of a weapon is shown. The front side of the upper base 5154 is shown having a cradle 5160 for maintaining a smartphone 51 which would be compressably secured into cradle 5160 of upper base 5154 with tensioning member 5156 and tensioning knob 5158 that rotatably secures the smart phone 51.

Figure 33:
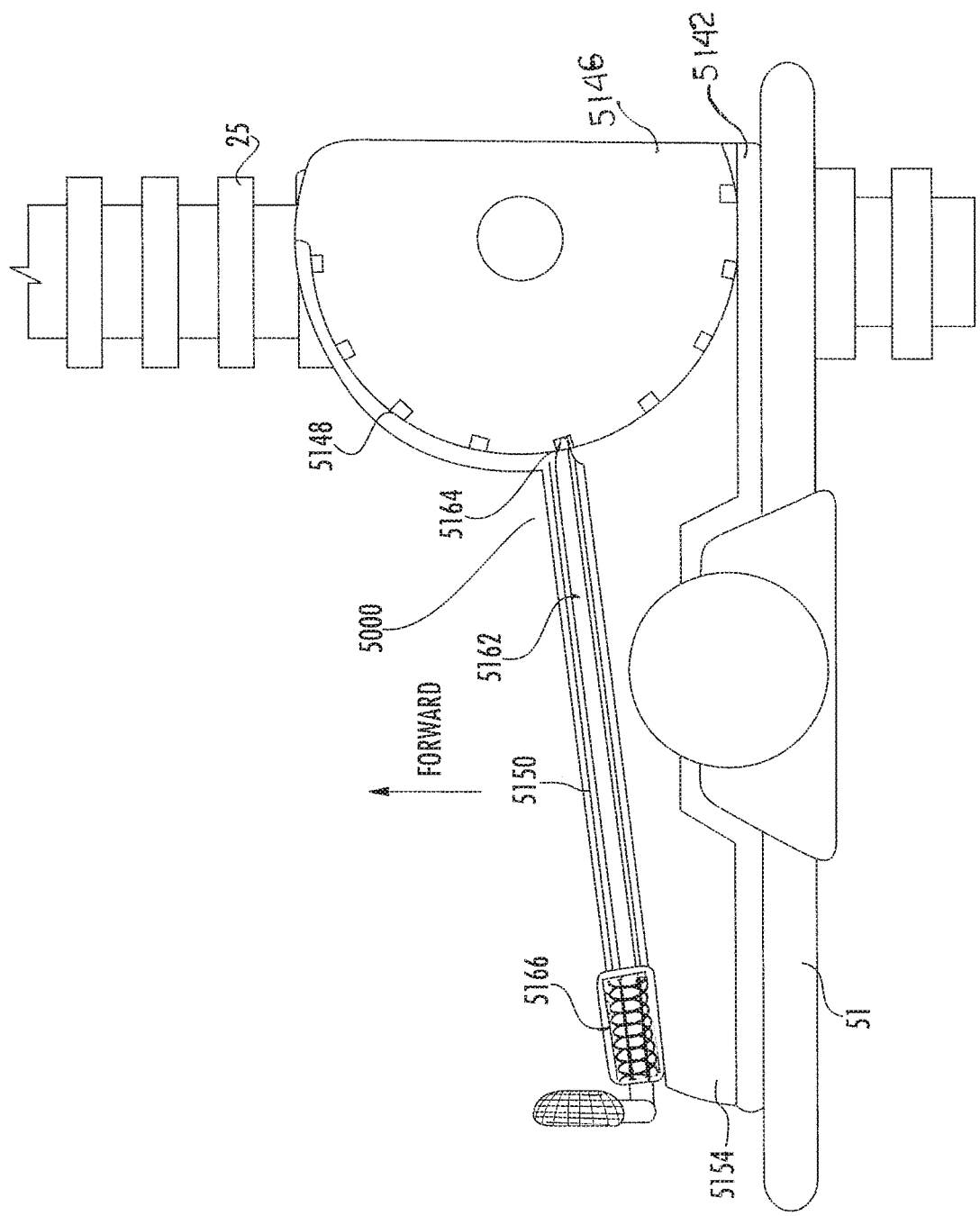
FIG. 33 is an cross-sectional overhead view of FIG. 32 in accordance with the principles of the present embodiment.

Referring now to FIG. 33, a cross-sectional overhead view taken along line C-C of FIG. 32 of a portion of the rotatable smart phone mount device 5000 in the design that rotates up to 90 degrees on each side of firearm mounted on upper weapons rail 25 and rotated and locked into position of 90 degrees to firearm with smart phone 51 screen facing aft of firearm as if user was using smart phone screen as sight screen and firing firearm in conventional manner from behind firearm. Note upper base 5154 is illustrated as being transparent so platform 5146 can be viewed which has a plurality of notches 5148 for receiving an end portion 5164 of a spring loaded pin 5162, the pin urged into the notches via spring 5166.

Figure 34:
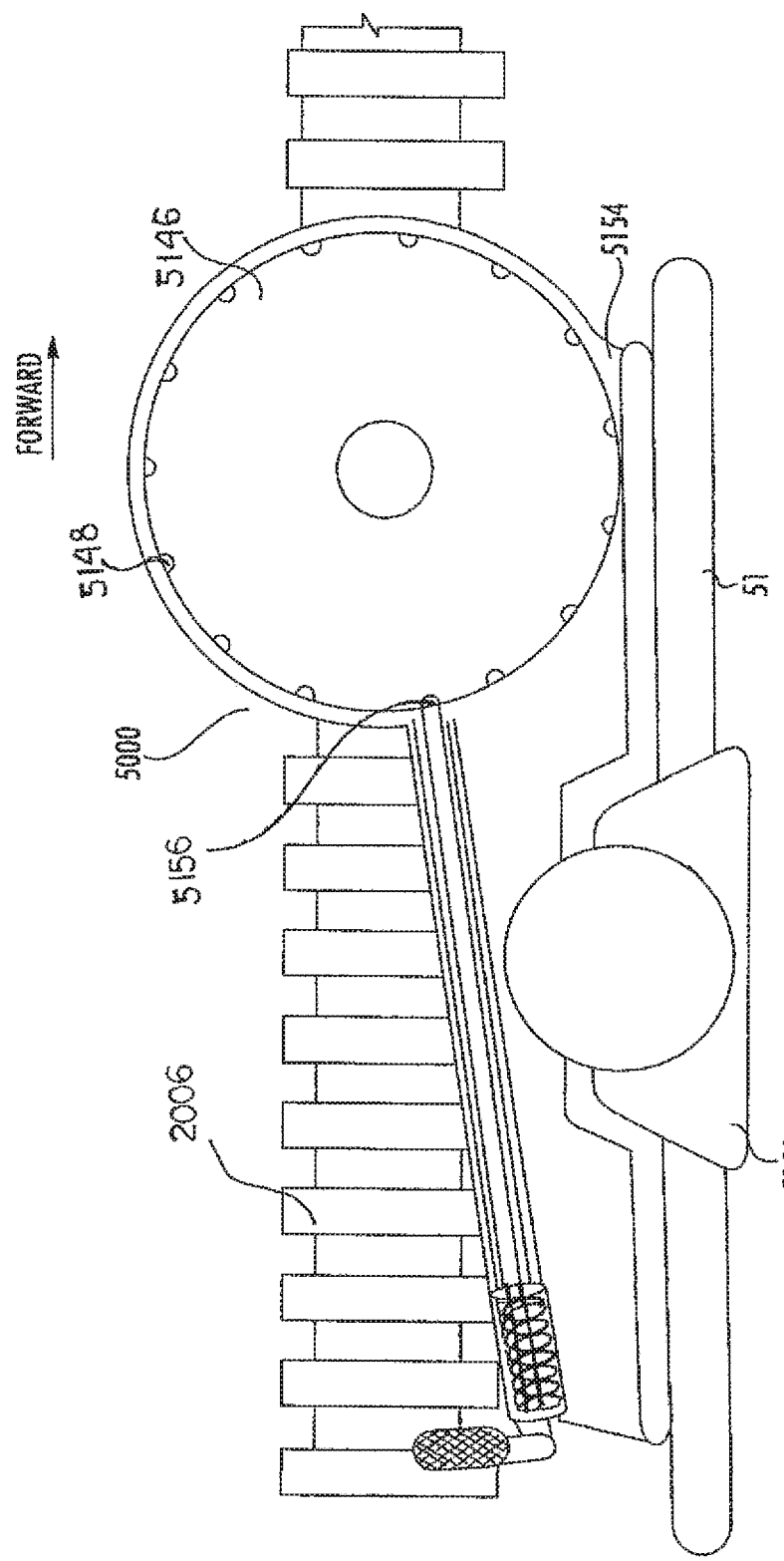
FIG. 34 is an overhead view of a rail mount device in accordance with the principles of the present embodiment.

Referring now to FIG. 34, an overhead cross-sectional view of a portion of the rail mount device 5142 where the upper base 5154 is rotated to an alternate position of 90 degrees to weapons rail 25 so user using smart phone as sight screen can view targets and surrounding area from safe, secure position such as behind wall or other from off to the left side of firearm as to locate, pinpoint, and fire on targets without exposing self as a target while doing so.

The instant embodiment depicts a fully round platform 5146 where additional notches have been implemented to allow for 360 degree rotation without departing from the spirit and scope of the instant invention. The upper base 5154 can be rotated such that the pin 5162 locks into any of the plurality notches 5148 of lower base or platform so upper base and smart phone can be rotated and locked into various positions or vantage points of 360 degrees to firearm. Note, upper platform 5154 is illustrated as being transparent so alternate design of platform 5146 and spring loaded pin assembly 5162 can be viewed.

Figure 35:
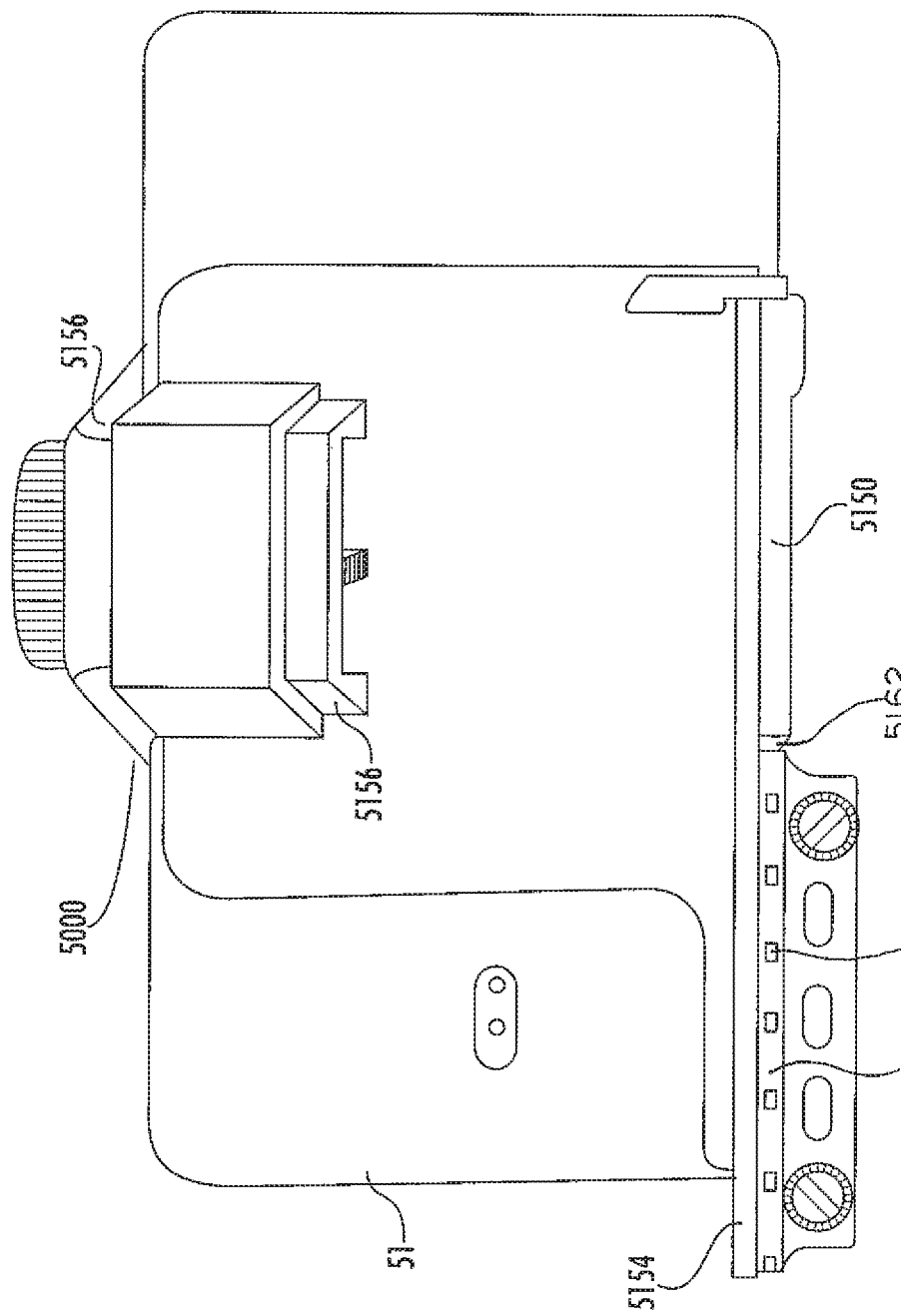
FIG. 35 is a backside view of a rotatable smart phone mount device in accordance with the principles of the present embodiment.

Referring now to FIG. 35, a backside view of a rotatable smart phone mount device 5000 for maintaining a smart phone 51 about an upper weapons rail 25 of a firearm is shown where the upper base 5154 is rotated on rail mount device 5142 to an alternate position of 90 degrees to the right side of weapons rail 25 so user using smart phone as sight screen can view targets and surrounding area from safe, secure position such as behind wall or other bullet proof structure from off to the right side of firearm as to locate, pinpoint, and fire on targets without exposing self as a target while doing so.

The instant embodiment depicts a fully round platform 5146 where additional notches have been implemented to allow for 360 degree rotation without departing from the spirit and scope of the instant invention. The upper base 5154 can be rotated such that the pin 5162 locks into any of the plurality notches 5148 of lower base or platform so upper base and smart phone can be rotated and locked into various positions or vantage points of 360 degrees to firearm. Note, upper platform 5154 is illustrated as being transparent so alternate design of platform 5146 and spring loaded pin assembly 5162 can be viewed.

Figure 36:
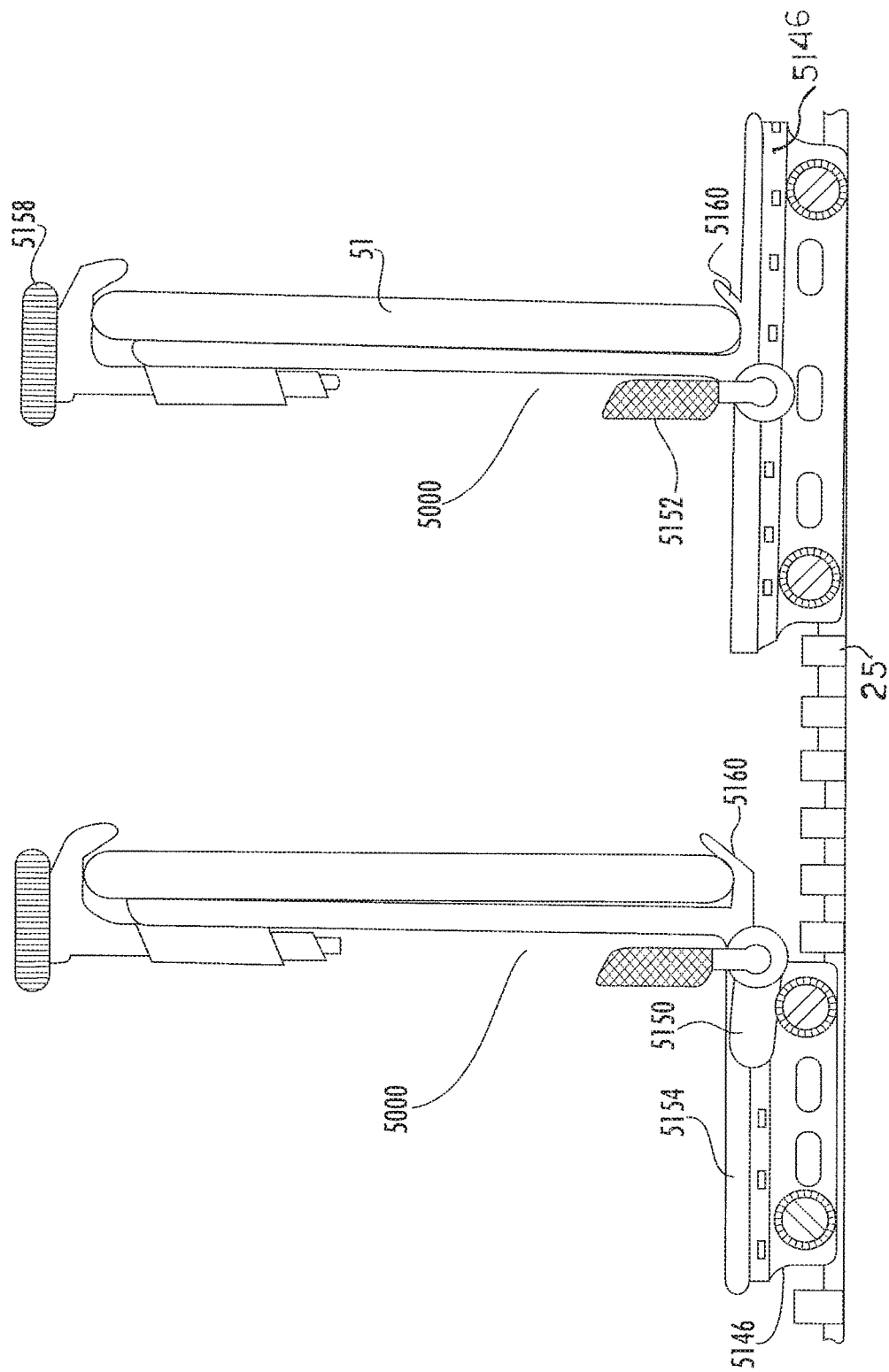
FIG. 36A is a side profile view of a rotatable smart phone rail mount device in accordance with the principles of the present embodiment.
FIG. 36B is a side profile view of a rotatable smart phone rail mount device in accordance with the principles of the present embodiment.

Referring now to FIG. 36A, is a side or profile view of a rotatable smart phone rail mount device 5000 for maintaining a smartphone 51 about an upper weapons rail 25 of a firearm is shown in its original design 36A with smart phone cradle 5160 located at outer edge of upper platform 5154 or just beyond edge of lower platform 5146.

Referring now to FIG. 36B, is a side or profile view of a rotatable smart phone rail mount device 5000 for maintaining a smartphone 51 about an upper weapons rail 25 of a firearm is shown in an alternate design 358 with smart phone cradle 5160 centrally located above lower platform 5146 without departing from the spirit and scope of the instant invention.

Figure 37:
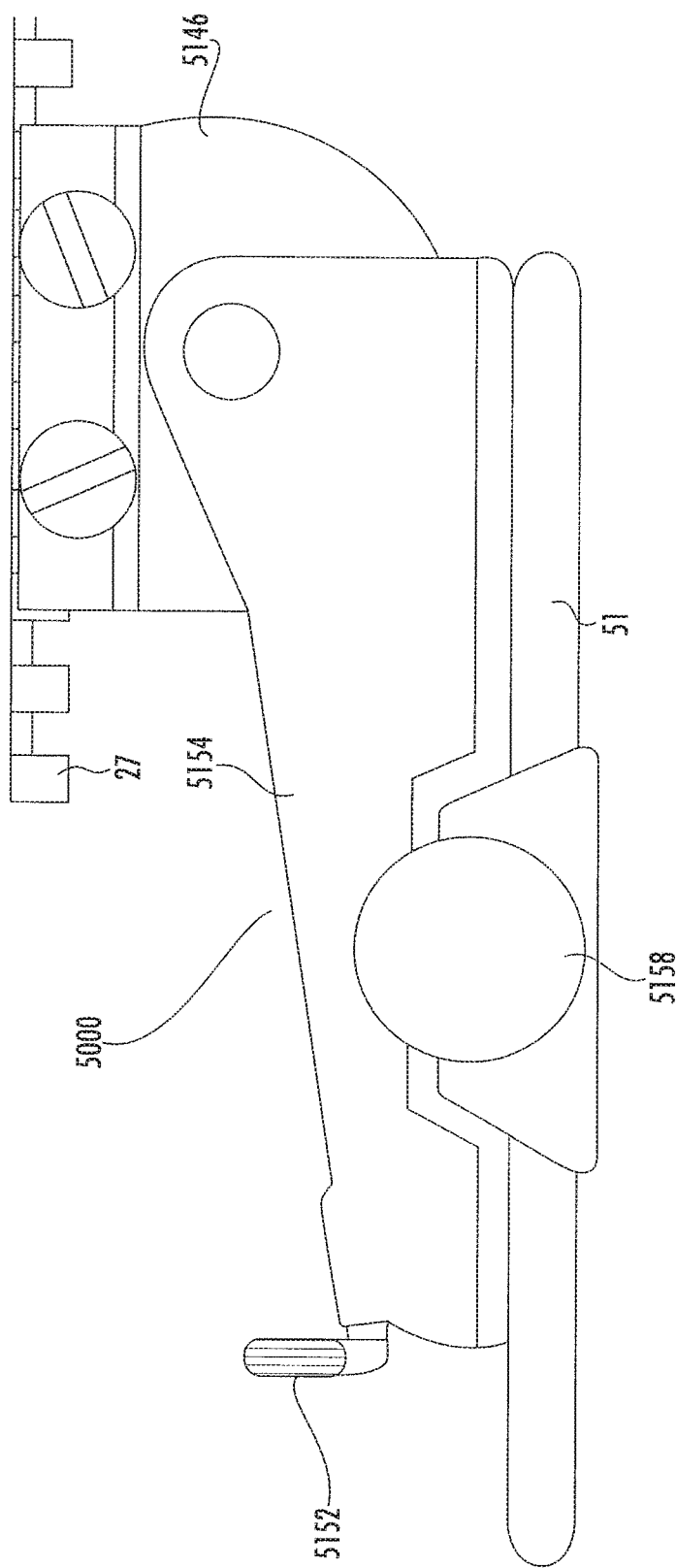
FIG. 37 is an overhead view of a rotatable smart phone rail mount device in accordance with the principles of the present embodiment.
Figure 38:
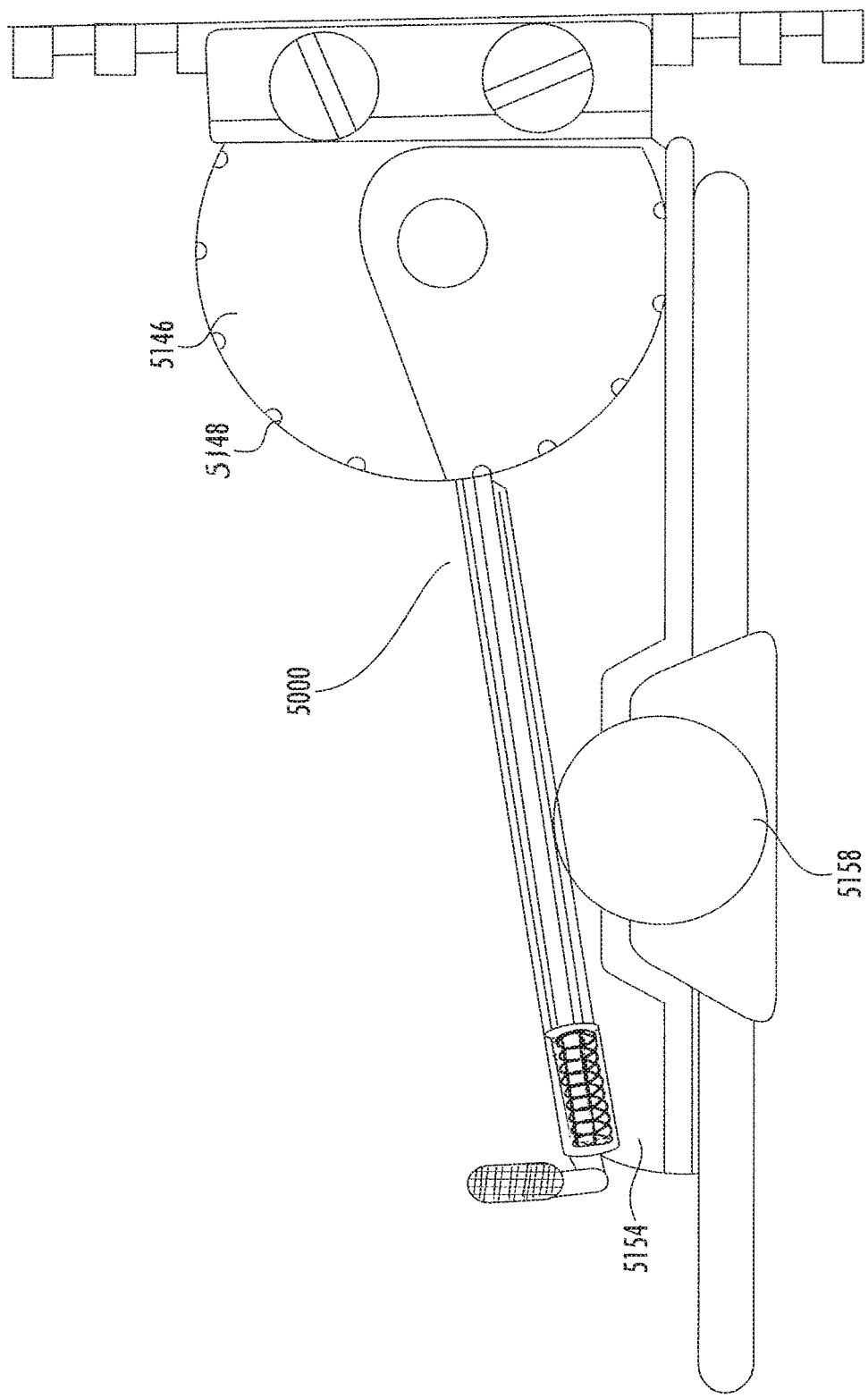
FIG. 38 is an overhead view of a rotatable smart phone rail mount device in accordance with the principles of the present embodiment.

Referring now to FIGS. 37 and 38, is an overhead view of a rotatable smart phone rail mount device 5000 in an alternate design without departing from the spirit and scope of the instant invention for maintaining a smartphone 51 about a side weapons rail 27. The rail mount device 1042 is shown with the upper base 1054 locked between position at zero degrees and ninety degrees, respectively, about the notches 1048. Note, total span of rotation of rail mount would be approximately 105 degrees so smart phone mounted on side rail mount can lay fully up against side of firearm when not in use as well as to acquire a full lineal view of image transmitted from camera sights to smart phone screen from positions farther forward of firearm than 90 degrees.

Figure 39:
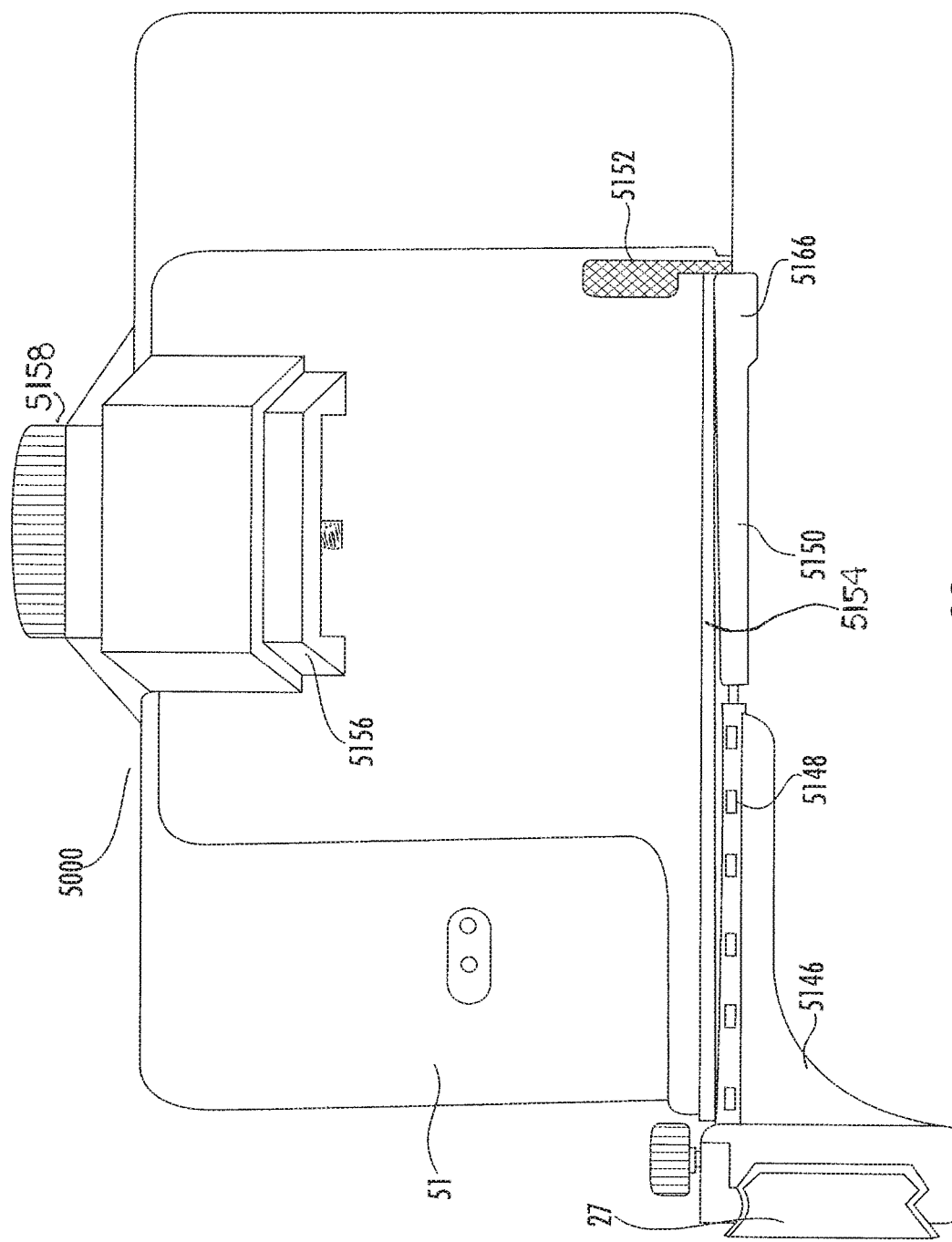
FIG. 39 is a backside view of a rotatable smart phone rail mount device in accordance with the principles of the present embodiment.

Referring now to FIG. 39, is a backside view of rotatable smart phone rail mount device 5000 in the alternate design for maintaining a smartphone 51 about a side weapons rail 27. The rail mount device 1042 is shown with the upper base 1054 locked at zero degrees about the notches 1048.

The greatest part of components as well as their mode of operation that make up rail mount device 5000 in the design that mounts to upper rail are the same basic components and mode of operation that make up smart phone rail mount device 5000 in the design that mounts to side rail of firearm. The main difference is in the configuration or angle of attachment of lower platform in rail mounting base 5148 that secures a smart phone releasably to the weapons rail 27 of a firearm via a rail mount type assemblage 5146 which acts as a platform for rotatable smart phone mount 5000. The rail mount device 5000 includes a platform 5146 and the bottom part of this platform 5146 releasably mounts to weapons rail 27. The platform 5146 includes a plurality of notches 5148. An upper base 5154 is rotatably secured about the platform 5146. A latch housing 5150 is provided about the upper base 5154 for maintaining at least a portion of the finger pull latch 5152 thereof. The finger pull latch 5152 configured to lock into any of the plurality of notches 5148 for maintaining the upper base 5154 in a rotated position about the platform 5146 operatively positioning a smartphone 51 display in a particular rotated position of between zero and 105 degrees about the side of firearm. A tensioning member 5156 is disposed about the upper base 5154 for retaining a smartphone 51 about the upper base 5154. The tensioning member 5156 provided with a tensioning knob 5158 for rotatably securing the smartphone 51 about the upper base 5154 thereof.

Another embodiment of this camera sight system would be rail mount 5500. Rail mount 5500 which consists of two basic components. The first component being a rail mount that mechanically attaches to firearm's weapon rails. This rail mount would have a square plate and arm that attaches plate to rail mount and this rail mount would be made in three basic configurations: one where square plate is parallel to the top of this rail mount with a straight arm that would be an integral part of rail mount and plate connecting both plate and rail mount together; the second would be the rail mount with square plate vertically mounted to rail mount at 90 degrees to rail mount and connected with an integral curved arm between rail mount and square plate; the third design would be the rail mount with square plate vertically mounted to rail mount at zero degrees to rail mount and connected with an integral curved arm between rail mount and square plate. The second component of rail mount 5500 would be a smart phone case with one or more square pockets or sleeves located on bottom of the back side of this smart phone case. These pockets would be integral to the smart phone case with the inside of pocket molded to the exact shape of these square plates. These pockets or sleeves would also have a latch that would have a part of latch extending through housing of sleeve that would be used to solidly attach this smart phone case to these plates on rail mount. These pockets would also have a slit or an opened section located at the center section of the bottom of these pockets extending upward to receive arm as plate is slid into pockets or sleeves. These plates would have four apertures or square holes cut into these plates and located in positions where latch would lock into these holes as pockets or sleeves are slid over these plates from any of the four sides of these plates which would allow the smart phone case to be solidly locked into one of four positions for each -,.,, one of the pockets or sleeves that would be an integral part of this smart phone case. These rail mounts are designed to be mounted on either top or side weapon's rail of firearm so user can mount smart phone at the best vantage point at either zero or 90 degrees on either the top or side weapon's rail of firearm to acquire best vantage point of smart phone which would be used as sight screen whether user is using firearm in conventional manner or using firearm to locate and fire on targets from behind wall or other bullet proof structure without exposing self as a target while doing so. These smart phone cases would not necessarily have to be made to accommodate every type of smart phone on the market in that all of these smart phones are made in only several basic exterior dimensions so that smart phone cases could simply be made in basically several different sizes, possibly with even a type of foam rubber or other material lining the inside of these phone cases to provide a better overall fit as well as a cushion for smart phone to reduce the effects of recoil.

Referring now to FIGS. 40 and 41, a view of an embodiment of a device mount 5500 is shown that attaches to weapon rails 25 and 27, the device mount 5500 includes a rail mount 5511 for attachment to the weapon rails 25 and 27, which would be upper and side rail mount of firearm. The device mount includes a plate 5514 configured to receive and lock with a smartphone case. The device mount 5500 includes an arm 2016 for securing plate 5514 to rail mount 5511. This arm in FIG. 40, holds plate that would secure smart phone at 90 degrees to weapons rail or firearm to use smart phone as sight screen to view targets and surrounding area from behind firearm or when using firearm in conventional manner. The smart phone plate 5501 includes four apertures 5518. Referring to FIG. 41, would be rail mount strictly to mount on top or bottom rail of firearm with arm holding plate parallel to weapons rail or firearm to use smart phone as sight screen to view targets from either side of firearm.

Referring now to FIG. 42, a view of an embodiment of a device mount 5500 is shown that attaches to weapon rails 27, which is side weapons rail, the device mount 5500 includes a rail mount 5511 for attachment to the weapon rails 27, which would be side rail mount of firearm. The device mount includes a plate 5514 configured to receive and lock with a smartphone case. The device mount 5500 includes an arm 2016 for securing plate 5514 to rail mount 5511. This arm in FIG. 42, holds plate that would secure smart phone parallel to the side of firearm to use smart phone as sight screen to view targets and surrounding area from the side of firearm that rail mount is mounted or when using smart phone as sight screen to view targets and surrounding area from side of firearm such as to locate, pinpoint, and fire on targets from safe, secure position from behind wall, tree, armored vehicle or other, without exposing self as target while doing so.

Figure 45:
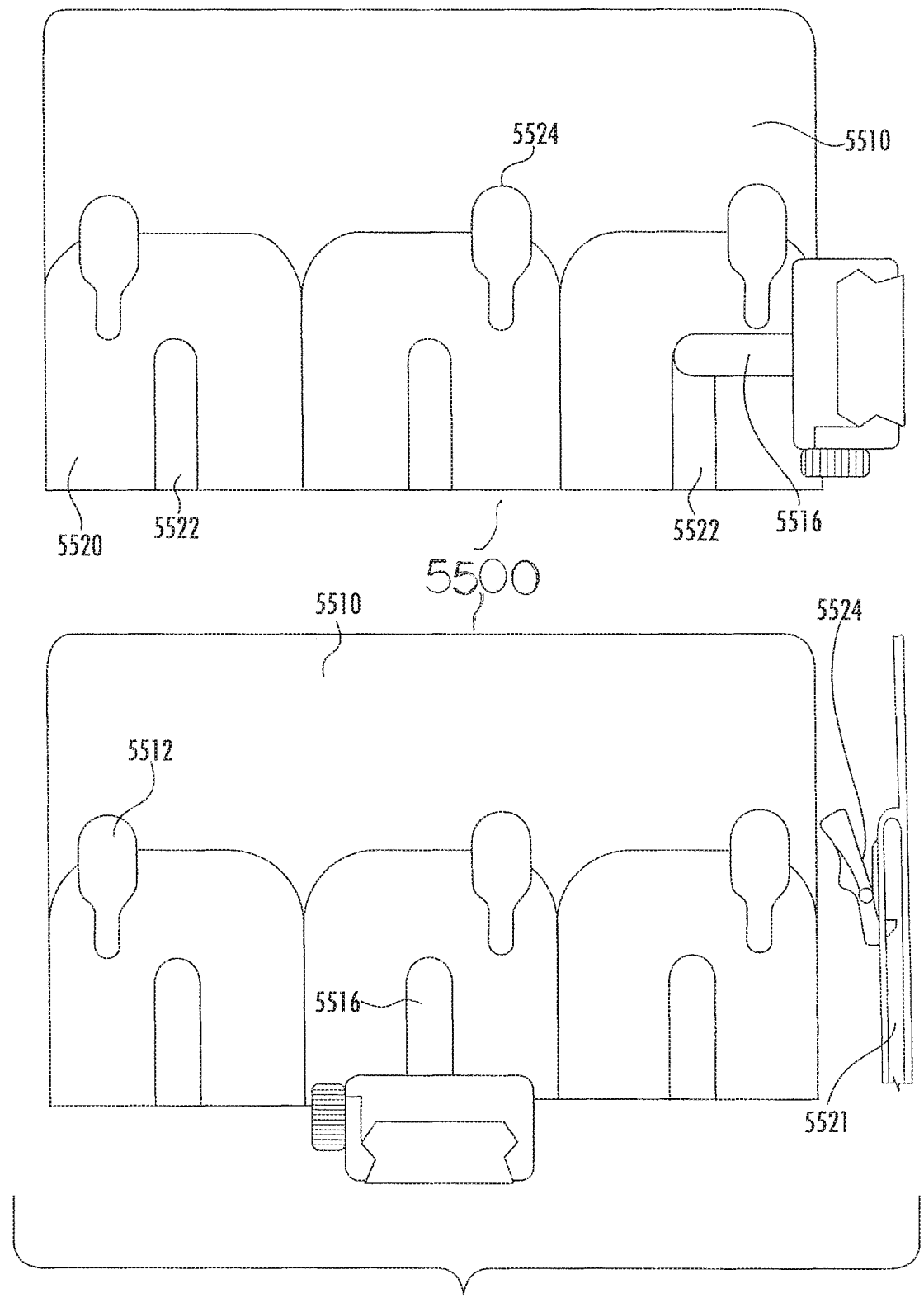

Referring now to FIGS. 43-45, a smartphone case 5500 is shown. In FIG. 43, the front of the smartphone case is shown having a smartphone 5512 with a smartphone screen 5514 projecting outward is shown and commonly understood. In FIG. 44, a side view of the smartphone case 5500 is shown. The smartphone case 5500 includes a perimeter protective wall 5516 with a downward projecting receiving portion 5518. The receiving portion 5518 includes a wall structure 5520 and a void space 5521 for receiving a smartphone mounting plate, such as mounting plate on all configurations of rail mounts 5500, seen in previous FIGS. 41, 41, and 41. In FIG. 45, a back view of the smartphone case 5500 is shown having three wall structures 5520, final design of smart phone case will have one or more of these wall structures 5520. These wall structures 5520 have a central slit 5522, the central slit 5522 facilitates connection with the smartphone plate that allows passage of an arm, such as arm 5516. The smartphone case 5510 includes a latch 5524 that allows a user to manipulate the switch between a locked and unlocked position for securing and unsecuring the smartphone case 5510 with the smartphone plate. The proposed three pockets in the back of smart phone cases and the four apertures located in plates that are an integral part of rail mounts seen in FIGS. 40, 41, and 42, allow user to attach smart phone case to plate on mounting rails, either horizontally or vertically and at three different positions to acquire best vantage point for sight screen.

As used herein, when the term "and/or" is used, it shall include all combinations of one or more of the associated described items.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure. It is contemplated and intended that any feature of one embodiment disclosed herein can be combined with any other feature of the same or other embodiments disclosed herein.

What is claimed is:

1. A tactical surveillance sight device for a firearm, comprising:
    a housing having a first opening;
    a rail mount attached to the housing, the rail mount adapted for mating with a cooperating rail on the firearm;
    at least one battery disposed within the housing;
    at least one window substantially covering said first opening;
    a light source powered by the at least one battery, the light source disposed within the housing and adapted to project a reticle onto the at least one window;
    a digital image sensor powered by the at least one battery, the digital image sensor disposed within the housing behind the at least one window and adapted to capture an image entering through the window of the first opening and the projected reticle; and
    a transmitter powered by the at least one battery, the transmitter adapted to transmit the image and projected reticle captured by the digital image sensor.

2. The tactical surveillance sight device of claim 1, wherein the projected reticle may appear as any one of, a dot, a plurality of dots, a crosshair, and combinations thereof.

3. The tactical surveillance sight device of claim 1, further comprising a reticle selector positioned about the exterior surface of the housing, and adapted to modify the brightness of the projected reticle and/or to select different types or sizes of the projected reticle.

4. The tactical surveillance sight device of claim 1, wherein the image sensor is an infrared image sensor.

5. The tactical surveillance sight device of claim 1, wherein the at least one battery is removable and rechargeable.

6. The tactical surveillance sight device of claim 1, further comprising a port positioned about the exterior surface of the housing in electrical communication with the at least one battery and adapted to provide power to the battery for recharging.

7. The tactical surveillance sight device of claim 1, further comprising an infrared or LED illuminator.

8. The tactical surveillance sight device of claim 7, further comprising an illuminator selector positioned about the exterior surface of the housing, and adapted to modify the brightness, and/or beam angle, of the infrared or LED illuminator.

9. The tactical surveillance sight device of claim 1, wherein the housing further comprises a second opening, the first opening and second opening permitting a user to view through the housing.

10. A tactical surveillance sight device for a firearm, comprising:
    a housing having a first opening;
    a rotatable rail mount, comprising: a substantially round top plate having an upper and lower surface; a substantially round bottom plate having an upper and lower surface; the lower surface of the top plate rotatably coupled to the upper surface of the bottom plate, wherein the top plate is rotatable relative to the bottom plate; a rail mount attached to the lower surface of the bottom plate, the rail mount adapted for mating with a cooperating rail on the weapon; one or more top plate recesses along the periphery of the top plate; one or more bottom plate recesses along the periphery of the bottom plate; a locking mechanism adapted to lock the top plate into two or more specific orientations relative to the bottom plate in increments that correspond to the angular spacing of the one or more top plate and bottom plate recesses;
    the bottom of the housing being securely engaged to the upper surface of the top plate;
    at least one battery disposed within the housing;
    at least one window substantially covering the first opening;
    a light source powered by the at least one battery, the light source disposed within the housing and adapted to project a reticle onto the at least one window;
    a digital image sensor powered by the at least one battery, the digital image sensor disposed within the housing behind the at least one window and adapted to capture an image entering through the window of the first opening and the projected reticle; and
    a transmitter powered by the at least one battery, the transmitter adapted to transmit the image and projected reticle captured by the digital image sensor.

11. The tactical surveillance sight device of claim 10, wherein the projected reticle may appear as any type or size of one or more dots.

12. The tactical surveillance sight device of claim 10, wherein the projected reticle may appear as any one of, a dot, a plurality of dots, a crosshair, and combinations thereof.

13. The tactical surveillance sight device of claim 10, further comprising a reticle selector positioned about the exterior surface of the housing, and adapted to modify the brightness of the projected reticle and/or to select different types or sizes of the projected reticle.

14. The tactical surveillance sight device of claim 10, wherein the image sensor is an infrared image sensor.

15. The tactical surveillance sight device of claim 10, wherein the at least one battery is removable and rechargeable.

16. The tactical surveillance sight device of claim 10, further comprising a port positioned about the exterior surface of the housing in electrical communication with the at least one battery and adapted to provide power to the battery for recharging.

17. The tactical surveillance sight device of claim 10, further comprising an infrared or LED illuminator.

18. The tactical surveillance sight device of claim 17, further comprising a selector positioned about the exterior surface of the housing, and adapted to modify the brightness and/or beam angle of the infrared or LED illuminator.

19. The tactical surveillance sight device of claim 10, wherein the housing further comprises a second opening, the first opening and second opening permitting a user to view through the housing.

20. A tactical camera surveillance sighting device for a firearm having means for enabling soldiers to surveil their surroundings and take control of battles and other military operations without forfeiting protective cover, comprising:
    a housing with a means for viewing through one end and out the other;
    a rail mount with a means for attaching the housing to a cooperating rail on a firearm;
    at least one battery disposed within the housing, the at least one battery having a means for powering a light source and a digital image sensor disposed within the housing;

at least one window disposed within the housing, having a means for displaying a reticle beam projected by the light source;

the digital image having a means for capturing an image entering through the at least one window and the projected reticle beam; and a transmitter powered by the at least one battery having a means to transmit the image and projected reticle beam captured by the digital image sensor.

* * * * *